United States Patent
Sasaki et al.

(10) Patent No.: US 8,056,214 B2
(45) Date of Patent: Nov. 15, 2011

(54) METHOD OF MANUFACTURING MAGNETIC HEAD FOR PERPENDICULAR MAGNETIC RECORDING INCLUDING TWO SIDE SHIELDS

(75) Inventors: Yoshitaka Sasaki, Milpitas, CA (US); Kazuo Ishizaki, Milpitas, CA (US); Hironori Araki, Milpitas, CA (US); Hiroyuki Ito, Milpitas, CA (US); Shigeki Tanemura, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 316 days.

(21) Appl. No.: 12/461,644

(22) Filed: Aug. 19, 2009

(65) Prior Publication Data

US 2011/0041322 A1    Feb. 24, 2011

(51) Int. Cl.
*G11B 5/127* (2006.01)
*H04R 31/00* (2006.01)

(52) U.S. Cl. ............... 29/603.16; 29/603.11; 29/603.13; 29/603.14; 29/603.15; 29/603.18; 360/121; 360/122; 360/317; 451/5; 451/41; 216/62; 216/65; 216/66

(58) Field of Classification Search ............... 29/603.07, 29/603.11, 603.13–603.16, 603.18; 216/62, 216/65, 66; 360/121, 122, 317; 451/5, 41
See application file for complete search history.

(56) References Cited

U.S. PATENT DOCUMENTS

| 7,120,988 B2 * | 10/2006 | Le et al. | 29/603.07 |
| 7,441,325 B2 * | 10/2008 | Gao et al. | 29/603.16 |
| 2005/0219747 A1 | 10/2005 | Hsu et al. | |
| 2007/0177301 A1 | 8/2007 | Han et al. | |
| 2007/0211377 A1 | 9/2007 | Sasaki et al. | |
| 2008/0145524 A1 * | 6/2008 | Guthrie et al. | 427/131 |

OTHER PUBLICATIONS

U.S. Appl. No. 12/457,090, filed Jun. 1, 2009, in the name of Kazuo Ishizaki et al.

* cited by examiner

*Primary Examiner* — Paul D Kim
(74) *Attorney, Agent, or Firm* — Oliff & Berridge, PLC

(57) ABSTRACT

A magnetic head includes a pole layer, first and second side shields, and an encasing layer having a pole groove that accommodates the pole layer and first and second side shield grooves that accommodate the first and second side shields. In a manufacturing method for the magnetic head, the pole groove and first and second initial side shield grooves are formed in a nonmagnetic layer using an etching mask layer having first to third openings. In the manufacturing method, a wall face of the first initial side shield groove that is closer to the pole groove and a wall face of the second initial side shield groove that is closer to the pole groove are etched by dry etching to thereby complete the first and second side shield grooves.

12 Claims, 36 Drawing Sheets

METHOD OF MANUFACTURING MAGNETIC HEAD FOR PERPENDICULAR MAGNETIC RECORDING INCLUDING TWO SIDE SHIELDS

BACKGROUND OF THE INVENTION

1. Field of the Invention

The present invention relates to a method of manufacturing a magnetic head for perpendicular magnetic recording that is used for writing data on a recording medium by means of a perpendicular magnetic recording system.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Like magnetic heads for longitudinal magnetic recording, those for perpendicular magnetic recording typically have a structure in which a read head including a magnetoresistive element (hereinafter, also referred to as an MR element) for reading and a write head including an induction-type electromagnetic transducer for writing are stacked on a substrate. The write head includes a pole layer that produces a magnetic field in the direction perpendicular to the plane of the recording medium. The pole layer includes, for example, a track width defining portion having an end located in a medium facing surface that faces the recording medium, and a wide portion that is coupled to the other end of the track width defining portion and that is greater in width than the track width defining portion. The track width defining portion has a nearly uniform width. To achieve a higher recording density, a reduction in track width and an improvement in write characteristics, such as an overwrite property that is a parameter indicating an overwriting capability, are required of the write head of the perpendicular magnetic recording system.

As a magnetic head for perpendicular magnetic recording, there is known a magnetic head including a shield that has an end face located in the medium facing surface at a position forward of the end face of the pole layer along the direction of travel of the recording medium with a predetermined distance provided therebetween, as disclosed in U.S. Patent Application Publication No. 2005/0219747 A1, for example. A gap layer made of a nonmagnetic material is provided between the pole layer and the shield. The shield has the function of preventing a magnetic flux from reaching the recording medium, the magnetic flux being generated from the end face of the pole layer and expanding in directions except the direction perpendicular to the plane of the recording medium. A magnetic head including such a shield enables a further improvement in recording density.

A magnetic head for use in a magnetic disk drive such as a hard disk drive is typically provided in a slider. The slider has the medium facing surface mentioned above. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, the skew mentioned above often causes a phenomenon in which, when data is written on a certain track, data stored on a track adjacent thereto is erased (this phenomenon is hereinafter called adjacent track erasing). To achieve a higher recording density, it is required to suppress the adjacent track erasing.

As a technique for suppressing the adjacent track erasing resulting from the skew mentioned above, it is effective to form a tapered surface in the top surface of the pole layer near the medium facing surface such that the thickness of the pole layer near the medium facing surface decreases toward the medium facing surface, as disclosed in U.S. Patent Application Publication No. 2005/0219747 A1. This technique allows a reduction in thickness of the track width defining portion in the medium facing surface, thereby making it possible to suppress the adjacent track erasing resulting from the skew. This technique also allows guiding a magnetic flux of great magnitude to the medium facing surface through the pole layer, thereby making it possible to suppress degradation of the write characteristics (overwrite property).

As a technique for suppressing the adjacent track erasing in a write head of the perpendicular magnetic recording system, it is also effective to provide two side shields on both sides of the pole layer that are opposite to each other in the track width direction, as disclosed in U.S. Patent Application Publication No. 2007/0177301 A1. A magnetic head including such two side shields allows suppression of the adjacent track erasing because it is possible to take in a magnetic flux that is generated from the end face of the pole layer and extends in the track width direction.

In a magnetic head including two side shields, flux leakage from the pole layer to the two side shields can often occur since the two side shields are present near the pole layer. The relative locations of the pole layer and the two side shields and the shapes of the pole layer and the two side shields therefore influence the write characteristics. To achieve desired write characteristics, it is thus important to accurately align the pole layer and the two side shields with respect to each other and to control the respective shapes of the pole layer and the two side shields.

Typically, the pole layer and the two side shields are patterned using different masks. In this case, it is difficult to accurately align the pole layer and the two side shields with respect to each other.

U.S. Patent Application Publication No. 2007/0211377 A1 discloses a method of forming a groove for accommodating the pole layer and two grooves for accommodating the two side shields simultaneously in a nonmagnetic layer by etching through the use of a single mask. This method allows accurate alignment of the pole layer and the two side shields with respect to each other. According to this method, however, since the groove for accommodating the pole layer and the two grooves for accommodating the two side shields are formed simultaneously, it is difficult to control the shape of the groove for accommodating the pole layer and the shapes of the two grooves for accommodating the two side shields independently of each other. Consequently, it is difficult with this method to control the respective shapes of the pole layer and the two side shields into desired shapes. It is also impossible with this method to reduce the distance between the pole layer and each of the two side shields beyond the limit that can be defined by the mask.

OBJECT AND SUMMARY OF THE INVENTION

It is an object of the present invention to provide a method of manufacturing a magnetic head for perpendicular magnetic recording that makes it possible to accurately align the pole layer and the two side shields with respect to each other, to control the respective shapes of the pole layer and the two side shields, and to reduce the distance between the pole layer and each of the two side shields.

A magnetic head for perpendicular magnetic recording that is manufactured by a manufacturing method of the present invention includes: a medium facing surface that faces a recording medium; a coil that produces a magnetic field corresponding to data to be written on the recording medium; a pole layer that has an end face located in the medium facing surface, allows a magnetic flux corresponding to the magnetic field produced by the coil to pass and produces a write magnetic field for writing the data on the recording medium by means of a perpendicular magnetic recording system; a top shield that is made of a magnetic material and has an end face located in the medium facing surface at a position forward of the end face of the pole layer along a direction of travel of the recording medium; a gap layer that is made of a nonmagnetic material, disposed between the pole layer and the top shield and has an end face located in the medium facing surface; a first side shield and a second side shield disposed on both sides of the pole layer that are opposite to each other in a track width direction, each of the side shields being made of a magnetic material and having an end face located in the medium facing surface; and an encasing layer made of a nonmagnetic material. The encasing layer has a pole groove accommodating the pole layer, a first side shield groove accommodating the first side shield, and a second side shield groove accommodating the second side shield.

The manufacturing method for the magnetic head for perpendicular magnetic recording of the present invention includes the steps of forming a nonmagnetic layer that is to be made into the encasing layer by forming the pole groove and the first and second side shield grooves therein afterward; forming an etching mask layer on the nonmagnetic layer, the etching mask layer having a first opening, a second opening and a third opening that have shapes respectively corresponding to the pole groove, a first initial side shield groove and a second initial side shield groove to be formed afterward; forming the pole groove in the nonmagnetic layer by etching using the etching mask layer; forming the first and second initial side shield grooves in the nonmagnetic layer by etching using the etching mask layer; completing the first and second side shield grooves by etching a wall face of the first initial side shield groove that is closer to the pole groove and a wall face of the second initial side shield groove that is closer to the pole groove by employing dry etching so that the first initial side shield groove is made into the first side shield groove while the second initial side shield groove is made into the second side shield groove; forming the pole layer; forming the first and second side shields; forming the gap layer; forming the top shield; and forming the coil.

In the manufacturing method for the magnetic head for perpendicular magnetic recording of the present invention, the dry etching may be ion milling.

In the manufacturing method for the magnetic head for perpendicular magnetic recording of the present invention, the step of completing the first and second side shield grooves may be performed with the pole groove covered with a mask, after the step of forming the pole groove and before the step of forming the pole layer.

The manufacturing method for the magnetic head may further include the step of forming a magnetic layer to fill the pole groove, the magnetic layer being intended to be made into the pole layer afterward. In this case, the step of completing the first and second side shield grooves may be performed after the step of forming the magnetic layer.

In the manufacturing method for the magnetic head for perpendicular magnetic recording of the present invention, the step of completing the first and second side shield grooves may be performed with the pole layer covered with a mask, after the step of forming the pole layer.

In the manufacturing method for the magnetic head for perpendicular magnetic recording of the present invention, the step of forming the pole groove may be performed with the second and third openings covered with a first mask, and the step of forming the first and second initial side shield grooves may be performed with the first opening covered with a second mask.

In the manufacturing method for the magnetic head for perpendicular magnetic recording of the present invention, the step of forming the pole groove and the step of forming the first and second initial side shield grooves may be performed simultaneously.

The magnetic head for perpendicular magnetic recording may further include a substrate on which the coil, the encasing layer, the pole layer, the first and second side shields, the gap layer and the top shield are stacked, the substrate having a top surface. In this case, the end face of the pole layer located in the medium facing surface may decrease in width in the track width direction with decreasing distance to the top surface of the substrate. The pole layer may have a top surface including a first portion and a second portion, the first portion having a first edge located in the medium facing surface and a second edge opposite to the first edge, the second portion being located farther from the medium facing surface than is the first portion and connected to the first portion at the second edge. The distance from the top surface of the substrate to an arbitrary point on the first portion may decrease with decreasing distance from the arbitrary point to the medium facing surface. In this case, the step of forming the pole layer may include the steps of forming a magnetic layer to fill the pole groove, the magnetic layer being intended to be made into the pole layer afterward; and etching a part of the magnetic layer so that the first portion of the top surface of the pole layer is formed and the magnetic layer is thereby made into the pole layer.

In the manufacturing method for the magnetic head for perpendicular magnetic recording of the present invention, the first and second side shields and the top shield are made of the same material, and the step of forming the top shield may be performed simultaneously with the step of forming the first and second side shields.

In the manufacturing method for the magnetic head for perpendicular magnetic recording of the present invention, the step of forming the etching mask layer may include the steps of: forming a nonmagnetic metal layer made of a nonmagnetic metal material on the nonmagnetic layer, the nonmagnetic metal layer being intended to be made into the etching mask layer by forming the first to third openings therein afterward; forming a photoresist mask on the nonmagnetic metal layer, the photoresist mask being intended to be used in etching the nonmagnetic metal layer afterward; and forming the first to third openings in the nonmagnetic metal layer by etching using the photoresist mask so that the nonmagnetic metal layer is made into the etching mask layer. In this case, in the step of forming the photoresist mask, the photoresist mask may be formed by performing photolithography with optical proximity correction.

According to the manufacturing method for the magnetic head for perpendicular magnetic recording of the present invention, the pole groove, the first initial side shield groove and the second initial side shield groove are formed in the nonmagnetic layer using the etching mask layer that has the first to third openings. Then, the wall face of the first initial side shield groove that is closer to the pole groove and the wall face of the second initial side shield groove that is closer to the pole groove are etched by ion milling to thereby complete the first and second side shield grooves. Consequently, according to the present invention, it is possible to accurately align the pole layer and the two side shields with respect to each other, to control the respective shapes of the pole layer and the two side shields, and to reduce the distance between the pole layer and each of the two side shields.

Other objects, features and advantages of the present invention will become fully apparent from the following description.

DETAILED DESCRIPTION OF THE PREFERRED EMBODIMENTS

First Embodiment

Figure 1:
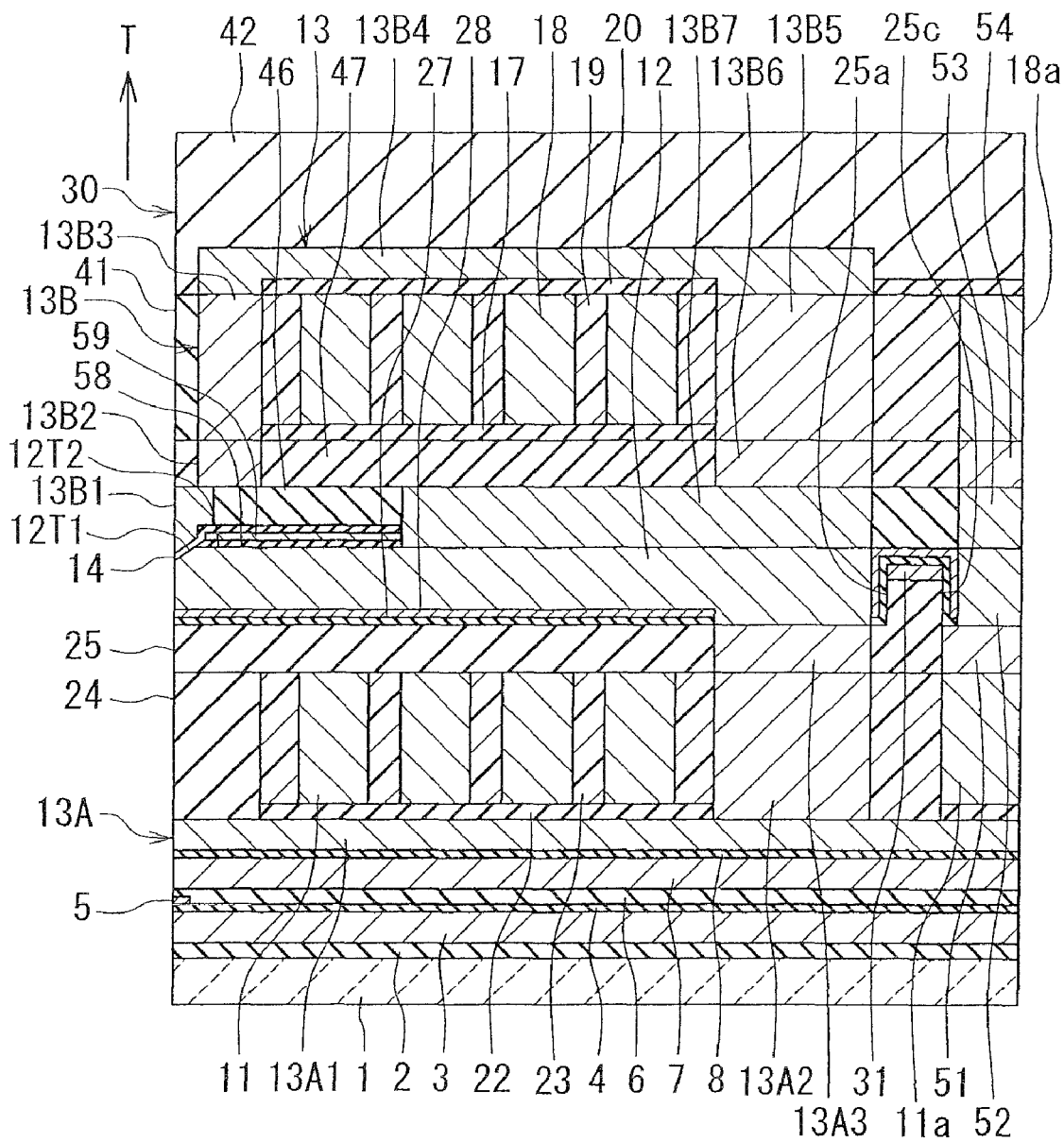
FIG. 1 is a cross-sectional view showing the configuration of a magnetic head according to a first embodiment of the invention.
Figure 2:
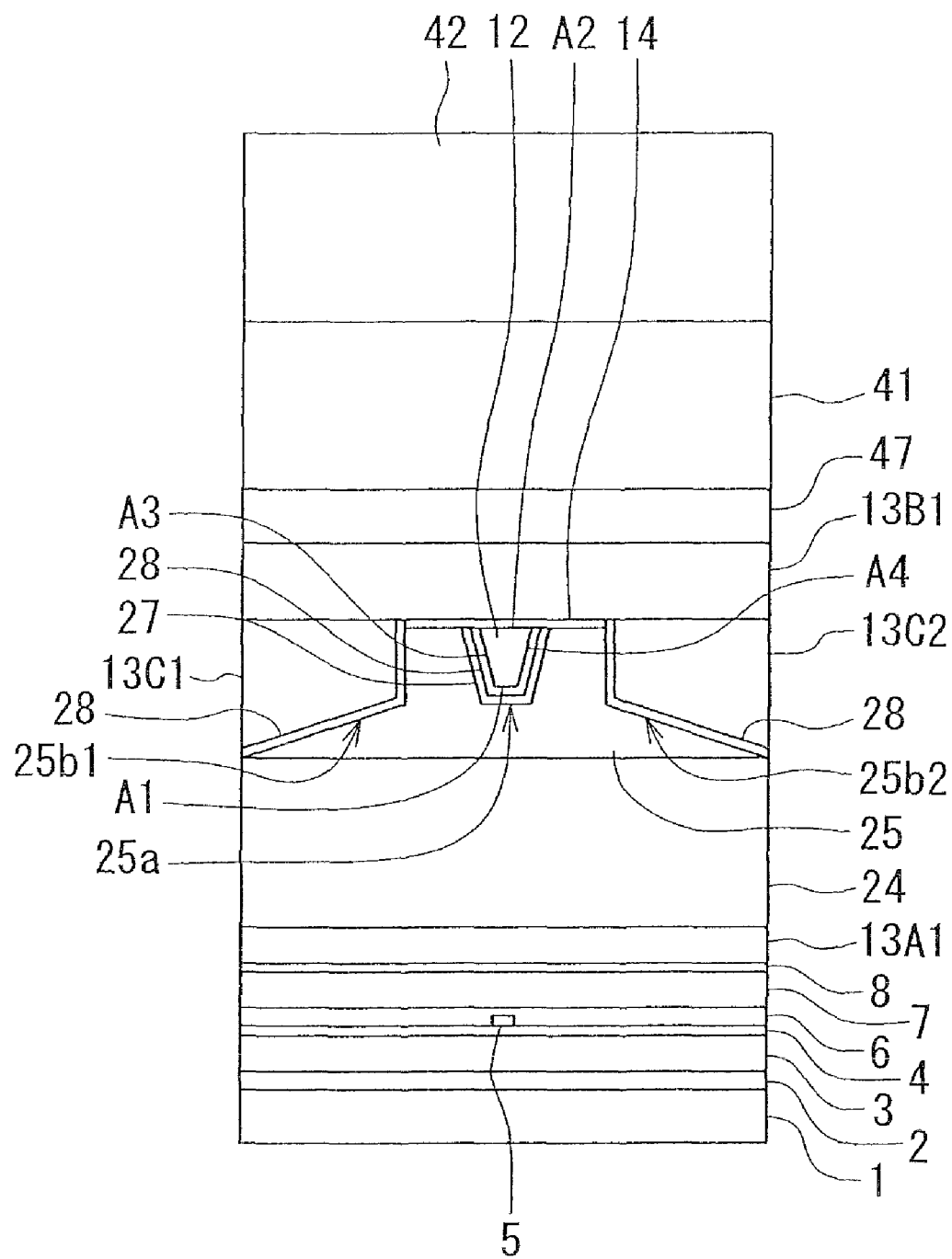
FIG. 2 is a front view showing the medium facing surface of the magnetic head according to the first embodiment of the invention.
Figure 3:
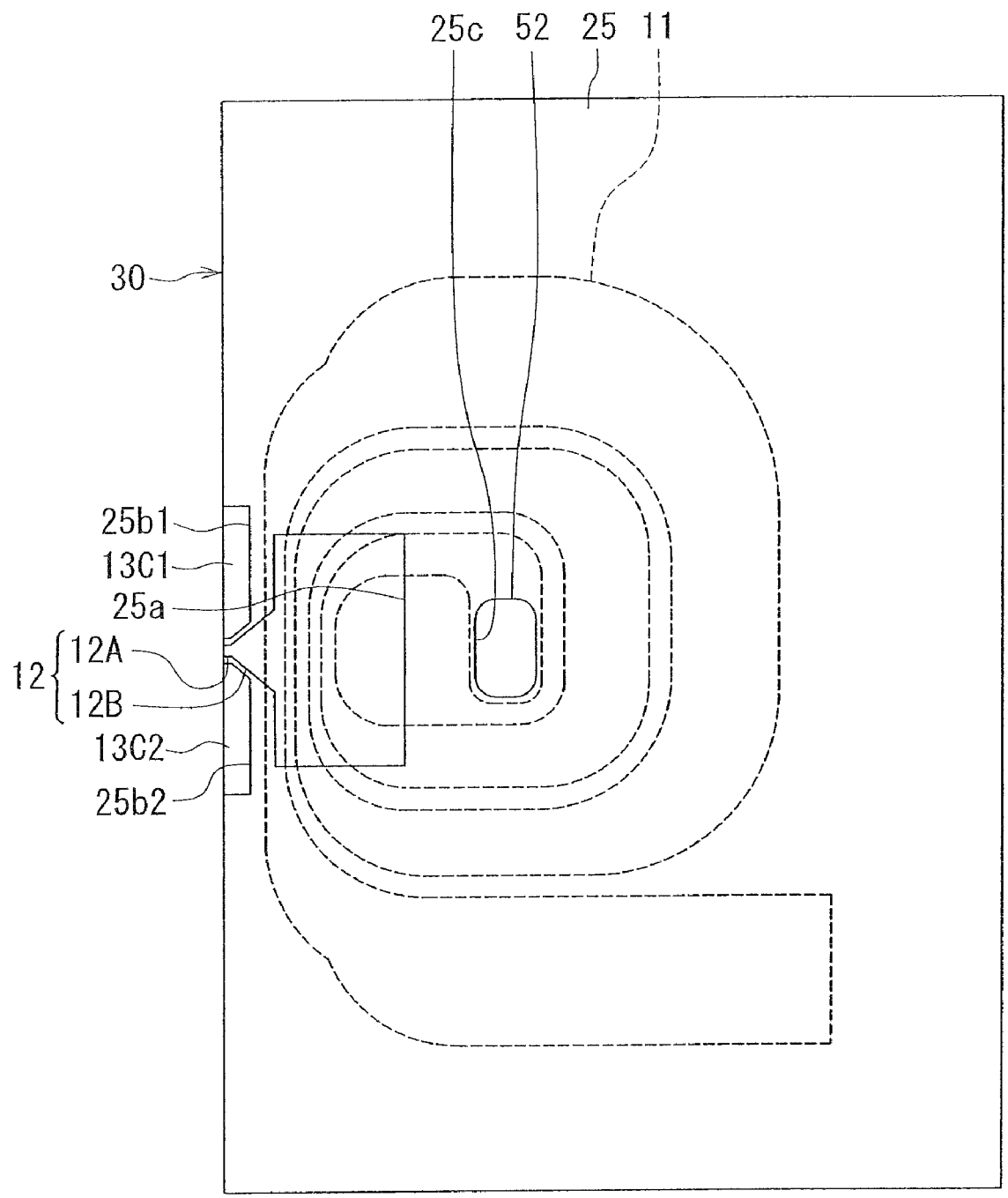
FIG. 3 is a plan view showing a pole layer and two side shields of the magnetic head according to the first embodiment of the invention.
Figure 4:
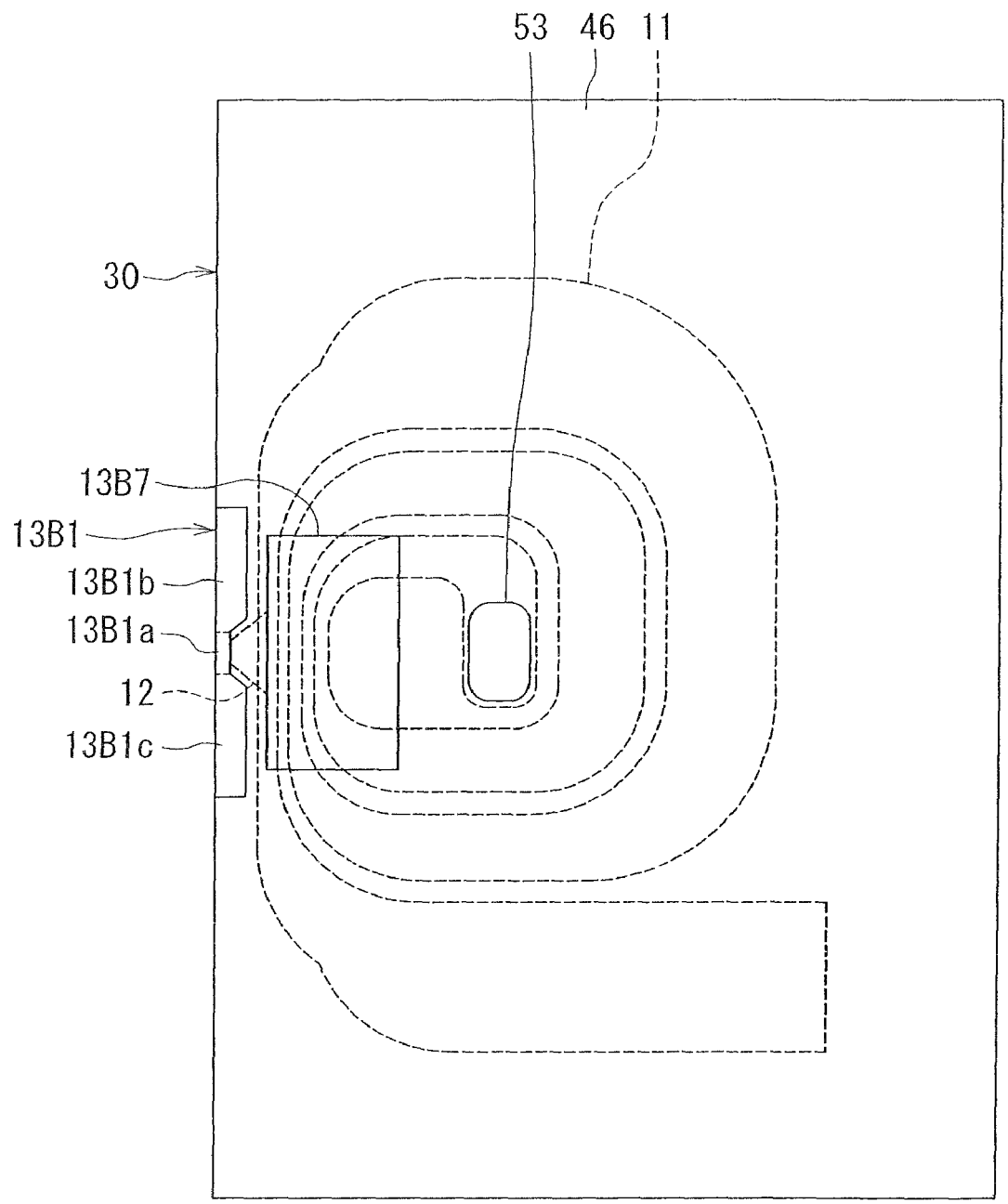
FIG. 4 is a plan view showing a top shield layer and a top yoke layer of the magnetic head according to the first embodiment of the invention.
Figure 5:
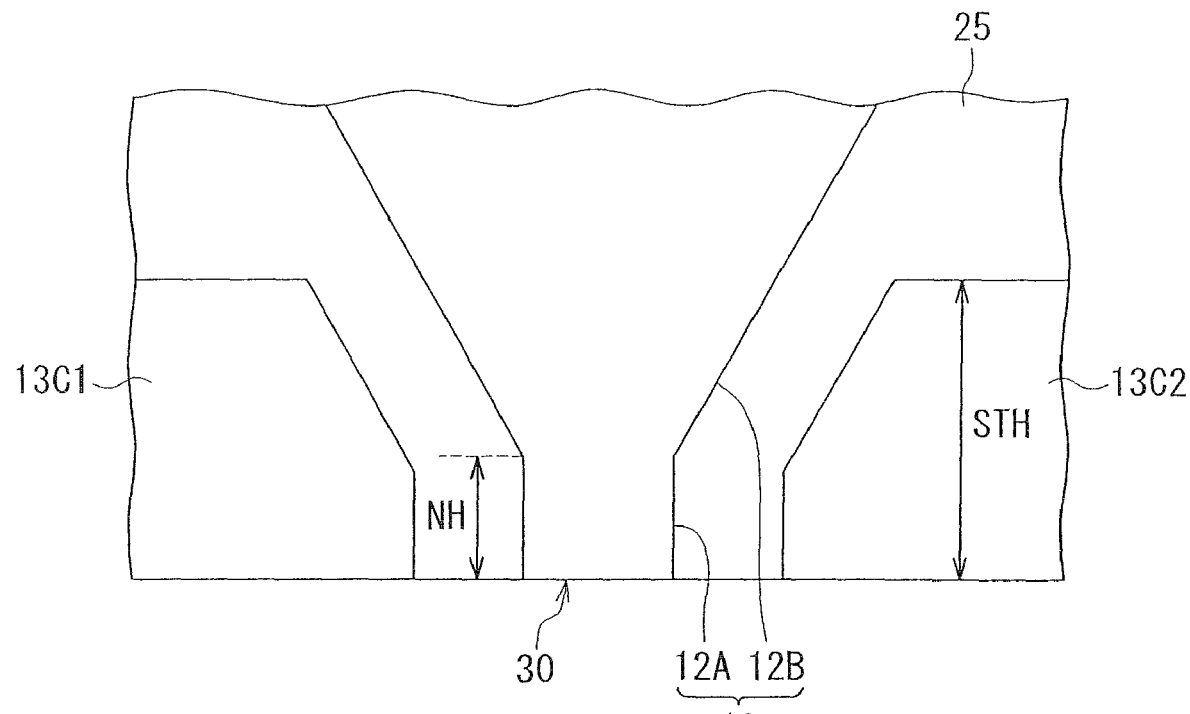
FIG. 5 is a plan view showing respective portions of the pole layer and the two side shields in the vicinity of the medium facing surface of the magnetic head according to the first embodiment of the invention.
Figure 6:
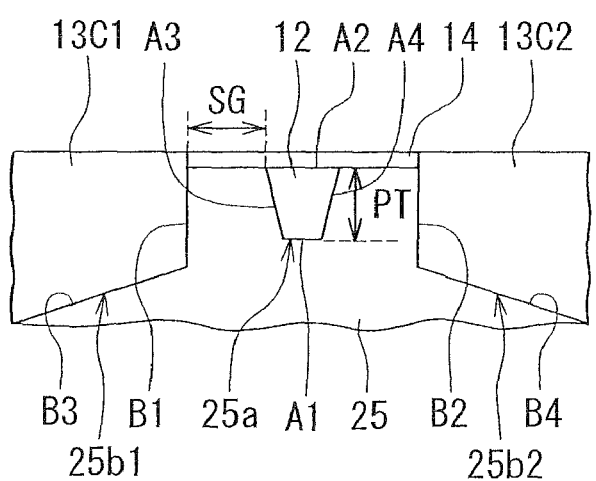
FIG. 6 is an explanatory diagram showing the shapes of the pole layer and the two side shields in the medium facing surface of the magnetic head according to the first embodiment of the invention.

A first embodiment of the present invention will now be described in detail with reference to the drawings. Reference is first made to FIG. 1 to FIG. 6 to describe the configuration of a magnetic head according to the first embodiment of the invention. The magnetic head according to the present embodiment is for use in perpendicular magnetic recording. FIG. 1 is a cross-sectional view showing the configuration of the magnetic head according to the present embodiment. FIG. 1 shows a cross section perpendicular to the medium facing surface and the top surface of the substrate. In FIG. 1 the arrow designated by the symbol T indicates the direction of travel of a recording medium. FIG. 2 is a front view showing the medium facing surface of the magnetic head according to the present embodiment. FIG. 3 is a plan view showing a pole layer and two side shields of the present embodiment. FIG. 4 is a plan view showing a top shield layer and a top yoke layer of the present embodiment. FIG. 5 is a plan view showing respective portions of the pole layer and the two side shields of the present embodiment in the vicinity of the medium facing surface. FIG. 6 is an explanatory diagram showing the shapes of the pole layer and the two side shields in the medium facing surface of the magnetic head according to the present embodiment. In FIG. 6, parts other than the pole layer and the two side shields are drawn in a simplified manner.

As shown in FIG. 1 and FIG. 2, the magnetic head according to the present embodiment includes: a substrate 1 made of a ceramic material such as aluminum oxide-titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 which is an insulating film disposed on the bottom shield layer 3; a magnetoresistive (MR) element 5 as a read element disposed on the bottom shield gap film 4; a top shield gap film 6 which is an insulating film disposed on the MR element 5; and a top shield layer 7 made of a magnetic material and disposed on the top shield gap film 6.

An end of the MR element 5 is located in the medium facing surface 30 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element.

The parts from the bottom shield layer 3 to the top shield layer 7 constitute a read head. The magnetic head further includes a nonmagnetic layer 8 made of a nonmagnetic material and disposed on the top shield layer 7, and a write head disposed on the nonmagnetic layer 8. The nonmagnetic layer 8 is made of alumina, for example. The write head includes a first coil 11, a second coil 18, a pole layer 12, a shield 13, and a gap layer 14.

Each of the first coil 11 and the second coil 18 is planar spiral-shaped. The first coil 11 and the second coil 18 are connected in series or in parallel. In FIG. 1 the reference symbol 11a indicates a connecting portion of the first coil 11 connected to the second coil 18, and the reference symbol 18a indicates a connecting portion of the second coil 18 connected to the first coil 11. The magnetic head further includes connecting layers 51, 52, 53 and 54 that are each made of a conductive material and are stacked in this order on the connecting portion 11a. The connecting portion 18a is disposed on the connecting layer 54.

The first coil 11 and the second coil 18 produce magnetic fields corresponding to data to be written on the recording medium. The pole layer 12 has an end face located in the medium facing surface 30, allows magnetic fluxes corresponding to the magnetic fields produced by the coils 11 and 18 to pass, and produces a write magnetic field for writing the data on the recording medium by means of the perpendicular magnetic recording system.

The shield 13 includes: a first portion 13A disposed backward of the pole layer 12 along the direction T of travel of the recording medium; a second portion 13B disposed forward of the pole layer 12 along the direction T of travel of the recording medium; and first and second side shields 13C1 and 13C2 disposed on both sides of the pole layer 12 that are opposite to each other in the track width direction. The first portion 13A, the second portion 13B and the side shields 13C1 and 13C2 are each made of a magnetic material. The material of them can be any of CoFeN, CoNiFe, NiFe and CoFe, for example.

The first portion 13A of the shield 13 includes a first layer 13A1, a second layer 13A2 and a third layer 13A3 that are magnetically coupled. The first layer 13A1 is disposed on the nonmagnetic layer 8. The first layer 13A1 has an end face that is located in the medium facing surface 30 at a position backward of the end face of the pole layer 12 along the direction T of travel of the recording medium. The magnetic head further includes a not-shown insulating layer that is made of an insulating material and disposed around the first layer 13A1 on the nonmagnetic layer 8, and an insulating layer 22 that is made of an insulating material and disposed on a part of the top surface the first layer 13A1. The insulating layer disposed around the first layer 13A1 and the insulating layer 22 are made of alumina, for example. The first coil 11 is disposed on the insulating layer 22.

The second layer 13A2 is disposed on a part of the first layer 13A1 away from the medium facing surface 30. The coil 11 is wound around the second layer 13A2.

The magnetic head further includes an insulating layer 23 made of an insulating material and disposed around the coil 11 and in the space between every adjacent turns of the coil 11, and an insulating layer 24 disposed around the insulating layer 23 and the second layer 13A2. The second layer 13A2, the coil 11 and the insulating layers 23 and 24 are flattened at the top. The insulating layer 23 is made of photoresist, for example. The insulating layer 24 is made of alumina, for example. The coil 11 is made of a conductive material such as copper. The third layer 13A3 is disposed on the second layer 13A2. The connecting layer 51 is disposed on the connecting portion 11a of the coil 11.

The magnetic head further includes an encasing layer 25 that is made of a nonmagnetic material and disposed around the third layer 13A3 and the connecting layer 51 over the top surfaces of the coil 11 and the insulating layers 23 and 24. The top surface of the encasing layer 25 is located at a level higher than the top surfaces of the third layer 13A3 and the connecting layer 51. The encasing layer 25 has a pole groove 25a, a first side shield groove 25b1, a second side shield groove 25b2, and a groove 25c, each of which opens in the top surface of the encasing layer 25. The groove 25a accommodates the pole layer 12. The groove 25b1 accommodates the side shield 13C1. The groove 25b2 accommodates the side shield 13C2. The groove 25c accommodates the connecting layer 52.

The bottom of the groove 25a is located at the same level as the top surface of the third layer 13A3. The grooves 25b1 and 25b2 are located near the medium facing surface 30 at positions that are symmetric with respect to the center of the groove 25a taken in the track width direction. The depths of the grooves 25b1 and 25b2 increase with increasing distance from the center of the groove 25a taken in the track width direction. The groove 25c is located farther from the medium facing surface 30 than is the groove 25a. The bottom of the groove 25c is located at the same level as the top surface of the connecting layer 51.

The material of the encasing layer 25 may be, for example, an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further includes an etching mask layer 31 that is made of a nonmagnetic metal material and disposed on the top surface of the encasing layer 25. The etching mask layer 31 has four openings that have shapes corresponding to the respective planar shapes of the grooves 25a, 25b1, 25b2 and 25c. The edges of the openings at the bottom surface of the etching mask layer 31 are located directly above the edges of the grooves 25a, 25b1, 25b2 and 25c, respectively, at the top surface of the encasing layer 25. The etching mask layer 31 is formed of a Ru layer, or a layered film consisting of a Ru layer and a NiCr layer.

The magnetic head further includes a nonmagnetic layer 27 that is made of a nonmagnetic material and has portions disposed in the grooves 25a and 25c of the encasing layer 25. The nonmagnetic layer 27 lies along the top surface of the etching mask layer 31, the wall faces of the openings of the etching mask layer 31 and the wall faces of the grooves 25a and 25c. The nonmagnetic layer 27 has an opening for exposing the top surface of the third layer 13A3 and an opening for exposing the top surface of the connecting layer 51. The material of the nonmagnetic layer 27 may be alumina, for example.

The magnetic head further includes a nonmagnetic metal layer 28 having portions disposed in the grooves 25a, 25b1, 25b2 and 25c. The nonmagnetic metal layer 28 lies along the surface of the nonmagnetic layer 27, the wall faces of the grooves 25b1 and 25b2 and the wall faces of the openings of the etching mask layer 31. The nonmagnetic metal layer 28 has an opening for exposing the top surface of the third layer 13A3 and an opening for exposing the top surface of the connecting layer 51. The nonmagnetic metal layer 28 is made of a nonmagnetic metal material. For example, the nonmagnetic metal layer 28 is formed of a layered film consisting of a Ta layer and a Ru layer. The connecting layer 52 is accommodated in the groove 25c and lies on the connecting layer 51.

The pole layer 12 is accommodated in the groove 25a of the encasing layer 25 such that the nonmagnetic layer 27 and the nonmagnetic metal layer 28A are interposed between the pole layer 12 and the wall faces of the groove 25a. The pole layer 12 has a bottom surface, and a top surface opposite to the bottom surface. The bottom surface of the pole layer 12 is in contact with the top surface of the third layer 13A3. The pole layer 12 is made of a magnetic metal material. The material of the pole layer 12 may be NiFe, CoNiFe or CoFe, for example.

The top surface of the pole layer 12 includes a first portion 12T1 and a second portion 12T2. The first portion 12T1 has a first edge located in the medium facing surface 30, and a second edge opposite to the first edge. The second portion 12T2 is located farther from the medium facing surface 30 than is the first portion 12T1, and is connected to the first portion 12T1 at the second edge. As shown in FIG. 1, the distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30.

The side shield 13C1 is accommodated in the groove 25b1 of the encasing layer 25 such that the nonmagnetic metal layer 28 is interposed between the side shield 13C1 and the wall faces of the groove 25b1. The side shield 13C2 is accommodated in the groove 25b2 of the encasing layer 25 such that the nonmagnetic metal layer 28 is interposed between the side shield 13C2 and the wall faces of the groove 25b2. The side shields 13C1 and 13C2 are located near the medium facing surface 30 at positions that are symmetric with respect to the center of the pole layer 12 taken in the track width direction. Each of the side shields 13C1 and 13C2 has an end face located in the medium facing surface 30. In the medium facing surface 30, the respective end faces of the side shields 13C1 and 13C2 are located on both sides of the end face of the pole layer 12 that are opposite to each other in the track width direction.

The magnetic material used to form the pole layer 12 preferably has a saturation flux density higher than that of the magnetic material used to form the side shields 13C1 and 13C2. For example, a magnetic material having a saturation flux density of approximately 2.4 T is used for the pole layer 12, while a magnetic material having a saturation flux density of approximately 2.2 T is used for the side shields 13C1 and 13C2.

The magnetic head further includes an insulating layer 58 made of an insulating material and disposed on a part of the second portion 12T2 of the top surface of the pole layer 12, and a nonmagnetic metal layer 59 made of a nonmagnetic metal material and disposed on the top surface of the insulating layer 58. The insulating layer 58 is made of alumina, for example. The nonmagnetic metal layer 59 is made of Ru, NiCr or NiCu, for example.

The gap layer 14 is disposed to cover the first portion 12T1 of the top surface of the pole layer 12, and also the insulating layer 58 and the nonmagnetic metal layer 59. The gap layer 14 is made of a nonmagnetic material. The material of the gap layer 14 may be an insulating material such as alumina, or a nonmagnetic conductive material such as Ru, NiCu, Ta, W, NiB or NiP.

The second portion 13B of the shield 13 includes a top shield layer 13B1, a second layer 13B2, a third layer 13B3, a fourth layer 13B4, a fifth layer 13B5, a sixth layer 13B6, and a top yoke layer 13B7 that are magnetically coupled. The top shield layer 13B1 is disposed over the side shields 13C1 and 13C2 and the gap layer 14. The top shield layer 13B1 has an end face that is located in the medium facing surface 30 at a position forward of the end face of the pole layer 12 along the direction T of travel of the recording medium. In the medium facing surface 30, a part of the end face of the top shield layer 13B1 is located at a predetermined distance from the end face of the pole layer 12, the distance being created by the thickness of the gap layer 14. The thickness of the gap layer 14 preferably falls within the range of 5 to 60 nm, such as within the range of 25 to 60 nm. The end face of the pole layer 12 has a side adjacent to the gap layer 14, and this side defines the track width. The top shield layer 13B1 corresponds to the top shield of the present invention.

The top yoke layer 13B7 is in contact with a part the top surface of the pole layer 12 away from the medium facing surface 30. The connecting layer 53 is disposed on the connecting layer 52.

The magnetic head further includes a nonmagnetic layer 46 disposed around the top shield layer 13B1, the top yoke layer 13B7 and the connecting layer 53. The nonmagnetic layer 46 is made of an inorganic insulating material, for example. The inorganic insulating material may be alumina or silicon oxide, for example. The top shield layer 13B1, the top yoke layer 13B7, the connecting layer 53 and the nonmagnetic layer 46 are flattened at the top.

The second layer 13B2 is disposed on the top shield layer 13B1. The second layer 13B2 has an end face that is closer to the medium facing surface 30, and this end face is located at a distance from the medium facing surface 30. The sixth layer 13B6 is disposed on the top yoke layer 13B7. The connecting layer 54 is disposed on the connecting layer 53.

The magnetic head further includes a nonmagnetic layer 47 disposed around the second layer 13B2, the sixth layer 13B6 and the connecting layer 54. A part of the nonmagnetic layer 47 covers the end face of the second layer 13B2 that is closer to the medium facing surface 30. The nonmagnetic layer 47 is made of an inorganic insulating material, for example. The inorganic insulating material may be alumina or silicon oxide, for example. The second layer 13B2, the sixth layer 13B6, the connecting layer 54 and the nonmagnetic layer 47 are flattened at the top.

The magnetic head further includes an insulating layer 17 made of an insulating material and disposed on a part of the top surface of the nonmagnetic layer 47. The insulating layer 17 is made of alumina, for example. The second coil 18 is disposed on the insulating layer 17.

The third layer 13B3 is disposed on the second layer 13B2. The third layer 13B3 has an end face that is closer to the medium facing surface 30, and this end face is located at a distance from the medium facing surface 30. The fifth layer 13B5 is disposed on the sixth layer 13B6. The second coil 18 is wound around the fifth layer 13B5. The connecting portion 18a of the second coil 18 is disposed on the connecting layer 54.

The magnetic head further includes: an insulating layer 19 made of an insulating material and disposed around the coil 18 and in the space between every adjacent turns of the coil 18; and an insulating layer 41 made of an insulating material and disposed around the insulating layer 19, the third layer 13B3 and the fifth layer 13B5. A part of the insulating layer 19 covers the end face of the third layer 13B3 that is closer to the medium facing surface 30. The third layer 13B3, the fifth layer 13B5, the coil 18 and the insulating layers 19 and 41 are flattened at the top. The magnetic head further includes an insulating layer 20 disposed to cover the coil 18 and the insulating layer 19. The insulating layer 19 is made of photoresist, for example. The insulating layers 20 and 41 are made of alumina, for example. The coil 18 is made of a conductive material such as copper.

The fourth layer 13B4 is disposed to couple the third layer 13B3 to the fifth layer 13B5. The fourth layer 13B4 has an end face that is closer to the medium facing surface 30, and this end face is located at a distance from the medium facing surface 30.

The magnetic head further includes a protection layer 42 made of a nonmagnetic material and disposed to cover the second portion 13B. The protection layer 42 is made of, for example, an inorganic insulating material such as alumina.

As has been described, the magnetic head according to the present embodiment includes the medium facing surface 30 that faces the recording medium, the read head, and the write head. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom shield layer 3 and the top shield layer 7 for shielding the MR element 5, the shield layers 3 and 7 having respective portions that are located near the medium facing surface 30 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head includes the first coil 11, the second coil 18, the pole layer 12, the shield 13, and the gap layer 14.

The pole layer 12 is accommodated in the groove 25a of the encasing layer 25, with the nonmagnetic layer 27 and the nonmagnetic metal layer 28 therebetween. The nonmagnetic layer 27 has a thickness within the range of 40 to 200 nm, for example. The nonmagnetic metal layer 28 has a thickness within the range of 10 to 50 nm, for example.

The shield 13 includes: the first portion 13A disposed backward of the pole layer 12 along the direction T of travel of the recording medium; the second portion 13B disposed forward of the pole layer 12 along the direction T of travel of the recording medium; and the first and second side shields 13C1 and 13C2 disposed on both sides of the pole layer 12 that are opposite to each other in the track width direction. Each of the first portion 13A and the second portion 13B is connected to a part of the pole layer 12 away from the medium facing surface 30. A part of the first coil 11 passes through the space between the pole layer 12 and the first layer 13A1 of the first portion 13A. A part of the second coil 18 passes through the space surrounded by the pole layer 12 and the second portion 13B.

The side shields 13C1 and 13C2 are located near the medium facing surface 30 at positions that are symmetric with respect to the center of the pole layer 12 taken in the track width direction. The side shields 13C1 and 13C2 are connected to the top shield layer 13B1 of the second portion 13B.

The second portion 13B includes the top shield layer 13B1. The top shield layer 13B1 has the end face that is located in the medium facing surface 30 at a position forward of the end face of the pole layer 12 along the direction T of travel of the recording medium. In the medium facing surface 30, a part of the end face of the top shield layer 13B1 is located at a predetermined distance from the end face of the pole layer 12, the distance being created by the thickness of the gap layer 14. The end face of the pole layer 12 has a side adjacent to the gap layer 14, and this side defines the track width.

A detailed description will now be given of the shapes of the pole layer 12, the top shield layer 13B1 and the side shields 13C1 and 13C2. As shown in FIG. 3 and FIG. 5, the pole layer 12 includes a track width defining portion 12A having an end face located in the medium facing surface 30, and a wide portion 12B that is located farther from the medium facing surface 30 than is the track width defining portion 12A and that is greater in width than the track width defining portion 12A. The track width defining portion 12A has a width that does not change with the distance from the medium facing surface 30. For example, the wide portion 12B is equal in width to the track width defining portion 12A at the boundary with the track width defining portion 12A, and gradually increases in width with increasing distance from the medium facing surface 30 and then maintains a specific width to the end of the wide portion 12B. In the present embodiment, the track width defining portion 12A is a portion of the pole layer 12 from the end face located in the medium facing surface 30 to the point at which the width of the pole layer 12 starts to increase. Here, as shown in FIG. 5, the length of the track width defining portion 12A in the direction perpendicular to the medium facing surface 30 will be referred to as neck height and denoted by the symbol NH. The neck height NH falls within the range of 0.05 to 0.3 µm, for example.

As shown in FIG. 2, the end face of the pole layer 12 located in the medium facing surface 30 has: a first side A1 closest to the top surface of the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The end face of the pole layer 12 located in the medium facing surface 30 decreases in width in the track width direction (the horizontal direction in FIG. 2) with decreasing distance to the top surface of the substrate 1. Each of the third side A3 and the fourth side A4 forms an angle within the range of, for example, 5 to 15 degrees, with respect to the direction perpendicular to the top surface of the substrate 1. The length of the second side A2, that is, the track width, falls within the range of 0.05 to 0.20 µm, for example.

In the present embodiment, throat height is the distance between the medium facing surface 30 and the point at which the space between the pole layer 12 and the second portion 13B of the shield 13 starts to increase as seen from the medium facing surface 30. In the present embodiment, the throat height is equal to the distance between the medium facing surface 30 and an edge of the bottom surface of the insulating layer 58 closest to the medium facing surface 30. The throat height falls within the range of 0.05 to 0.3 µm, for example.

As shown in FIG. 1, the top surface of the pole layer 12 includes the first portion 12T1 and the second portion 12T2. The first portion 12T1 has the first edge located in the medium facing surface 30, and the second edge opposite to the first edge. The second portion 12T2 is located farther from the medium facing surface 30 than is the first portion 12T1, and is connected to the first portion 12T1 at the second edge. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30. The first portion 12T1 forms an angle within the range of, for example, 10 to 45 degrees, with respect to the direction perpendicular to the medium facing surface 30.

As shown in FIG. 4, the top shield layer 13B1 includes: a middle portion 13B1a that includes a portion opposed to the pole layer 12 with the gap layer 14 therebetween; and two side portions 13B1b and 13B1c that are located on outer sides of the center portion 13B1a in the track width direction. The middle portion 13B1a has a uniform length in the direction perpendicular to the medium facing surface 30. The maximum length of each of the side portions 13B1b and 13B1c in the direction perpendicular to the medium facing surface 30 is greater than the length of the middle portion 13B1a in the direction perpendicular to the medium facing surface 30.

As shown in FIG. 6, the end face of the side shield 13C1 located in the medium facing surface 30 has a side B1 that is closer to the pole layer 12, and a side B3 that is closer to the substrate 1. The end face of the side shield 13C2 located in the medium facing surface 30 has a side B2 that is closer to the pole layer 12, and a side B4 that is closer to the substrate 1. The distance between the third side A3 of the end face of the pole layer 12 and the side B1 of the end face of the side shield 13C1 and the distance between the fourth side A4 of the end face of the pole layer 12 and the side B2 of the end face of the side shield 13C2 are preferably equal at the same positions in the direction perpendicular to the top surface of the substrate 1 (the vertical direction in FIG. 6). FIG. 6 shows an example in which the sides B1 and B2 are perpendicular to the top surface of the substrate 1. However, the sides B1 and B2 may be inclined with respect to the direction perpendicular to the top surface of the substrate 1.

The sides B3 and B4 are inclined with respect to a direction parallel to the top surface of the substrate 1 (the horizontal direction in FIG. 6) so as to get closer to the top surface of the substrate 1 with increasing distance from the center of the end face of the pole layer 12 taken in the track width direction.

As shown in FIG. 6, the minimum distance between the groove 25a and the groove 25b1 will be denoted as SG (ditto for the minimum distance between the groove 25a and the groove 25b2). SG falls within the range of 0.02 to 1.00 µm, for example, or preferably within the range of 0.05 to 0.10 µm. The dimension of the end face of the pole layer 12 located in the medium facing surface 30 taken in the direction perpendicular to the top surface of the substrate 1 will be denoted as PT. PT falls within the range of 0.05 to 1.50 µm, for example. As shown in FIG. 5, the maximum length of each of the side shields 13C1 and 13C2 in the direction perpendicular to the medium facing surface 30 will be denoted as STH. STH falls within the range of 0.05 to 1.00 µm, for example.

The operation and effects of the magnetic head according to the present embodiment will now be described. In this magnetic head, the write head writes data on a recording medium while the read head reads data written on the recording medium. In the write head, the coils 11 and 18 produce magnetic fields corresponding to data to be written on the recording medium. A magnetic flux corresponding to the magnetic field produced by the coil 11 passes through the first portion 13A of the shield 13 and the pole layer 12. A magnetic flux corresponding to the magnetic field produced by the coil 18 passes through the second portion 13B of the shield 13 and the pole layer 12. The pole layer 12 thus allows the magnetic flux corresponding to the magnetic field produced by the coil 11 and the magnetic flux corresponding to the magnetic field produced by the coil 18 to pass.

The coils 11 and 18 may be connected in series or in parallel. In either case, the coils 11 and 18 are connected such that the magnetic flux corresponding to the magnetic field produced by the coil 11 and the magnetic flux corresponding to the magnetic field produced by the coil 18 flow in the same direction through the pole layer 12.

The pole layer 12 allows the magnetic fluxes corresponding to the magnetic fields produced by the coils 11 and 18 to pass as mentioned above, and produces a write magnetic field used for writing data on the recording medium by means of the perpendicular magnetic recording system.

The shield 13 takes in a disturbance magnetic field applied to the magnetic head from outside of the magnetic head. This makes it possible to prevent erroneous writing on the recording medium induced by the disturbance magnetic field intensively taken into the pole layer 12. Furthermore, the shield 13 has the function of taking in a magnetic flux that is generated from the end face of the pole layer 12 and that expands in directions except the direction perpendicular to the plane of the recording medium, and thus preventing this magnetic flux from reaching the recording medium. The shield 13 also has the function of returning a magnetic flux that has been generated from the end face of the pole layer 12 and has magnetized the recording medium.

The shield 13 includes: the first portion 13A disposed backward of the pole layer 12 along the direction T of travel of the recording medium; the second portion 13B disposed forward of the pole layer 12 along the direction T of travel of the recording medium; and the first and second side shields 13C1 and 13C2 disposed on both sides of the pole layer 12 that are opposite to each other in the track width direction. Consequently, according to the present embodiment, in regions both backward and forward of the end face of the pole layer 12 along the direction T of travel of the recording medium and in regions on both sides of the end face of the pole layer 12 that are opposite to each other in the track width direction, it is possible to take in the magnetic flux that is generated from the end face of the pole layer 12 and that expands in directions except the direction perpendicular to the plane of the recording medium, and to thereby prevent this magnetic flux from reaching the recording medium. Thus, according to the present embodiment, it is possible to suppress the occurrence of adjacent track erasing, and it is also possible to suppress, over a wide range along the track width direction, a phenomenon of attenuation of signals written on one or more tracks adjacent to a track targeted for writing or reading. Furthermore, by virtue of the side shields 13C1 and 13C2, the present embodiment particularly allows suppression of adjacent track erasing with higher reliability, compared with a case without the side shields 13C1 and 13C2.

In the present embodiment, as shown in FIG. 2, the end face of the pole layer 12 located in the medium facing surface 30 decreases in width in the track width direction with decreasing distance to the top surface of the substrate 1. According to the present embodiment, it is thus possible to suppress the occurrence of adjacent track erasing resulting from the skew.

In the present embodiment, the top surface of the pole layer 12 includes: the first portion 12T1 having the first edge located in the medium facing surface 30 and the second edge opposite to the first edge; and the second portion 12T2 that is located farther from the medium facing surface 30 than is the first portion 12T1 and connected to the first portion 12T1 at the second edge. The distance from the top surface of the substrate 1 to an arbitrary point on the first portion 12T1 decreases with decreasing distance from the arbitrary point to the medium facing surface 30. According to the present embodiment, it is thus possible to suppress the occurrence of adjacent track erasing resulting from the skew and to guide a magnetic flux of great magnitude to the medium facing surface 30 through the pole layer 12. This contributes to improved write characteristics (overwrite property).

A manufacturing method for the magnetic head according to the present embodiment will now be described. In the manufacturing method for the magnetic head according to the present embodiment, first, as shown in FIG. 1 and FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7 and the nonmagnetic layer 8 are formed in this order on the top shield gap film 6.

Next, the first layer 13A1 of the first portion 13A of the shield 13 is formed on the nonmagnetic layer 8 by frame plating, for example. Next, a not-shown insulating layer is formed over the entire top surface of the stack. Next, the insulating layer is polished by, for example, chemical mechanical polishing (hereinafter referred to as CMP), until the first layer 13A1 is exposed. The first layer 13A1 and the insulating layer lying around the same are thereby flattened at the top.

Next, the insulating layer 22 is formed on areas of the top surfaces of the first layer 13A1 and the insulating layer around the same over which the coil 11 is to be formed afterward. Next, the coil 11 is formed on the insulating layer 22 by frame plating, for example. Next, the second layer 13A2 is formed on the first layer 13A1 by frame plating, for example. The coil 11 may be formed after forming the second layer 13A2, however.

Next, the insulating layer 23 is formed around the coil 11 and the second layer 13A2 and in the space between every adjacent turns of the coil 11. Next, the insulating layer 24 is formed over the entire top surface of the stack. Next, the insulating layer 24 is polished by, for example, CMP, until the second layer 13A2 and the coil 11 are exposed. The second layer 13A2, the coil 11 and the insulating layers 23 and 24 are thereby flattened at the top.

Reference is now made to FIG. 7A to 20A, FIG. 7B to FIG. 20B, and FIG. 15C to FIG. 20C to describe a series of steps until the formation of the top shield layer 13B1, the top yoke layer 13B7, the connecting layer 53 and the insulating layer 46 after the foregoing step. FIG. 7A to FIG. 20A, FIG. 7B to FIG. 20B, and FIG. 15C to FIG. 20C each show a stack of layers formed in the process of manufacturing the magnetic head. Each of FIG. 7A to FIG. 20A shows the top surface of part of the stack. Each of FIG. 7B to FIG. 20B shows a cross section of the stack taken at the position where the medium facing surface 30 is to be formed. Each of FIG. 15C to FIG. 20C shows a cross section of the stack perpendicular to the medium facing surface 30 and the top surface of the substrate 1. The parts closer to the substrate 1 than the insulating layer 24 are omitted in FIG. 7B to FIG. 12B. The parts closer to the substrate 1 than nonmagnetic layer 25P are omitted in FIG. 13B to FIG. 15B and FIG. 15C. The parts closer to the substrate 1 than the encasing layer 25 are omitted in FIG. 16B to FIG. 20B and FIG. 16C to FIG. 20C. In FIG. 7A to FIG. 20A and FIG. 15C to FIG. 20C, the symbol "ABS" indicates the position where the medium facing surface 30 is to be formed.

Figure 7A:
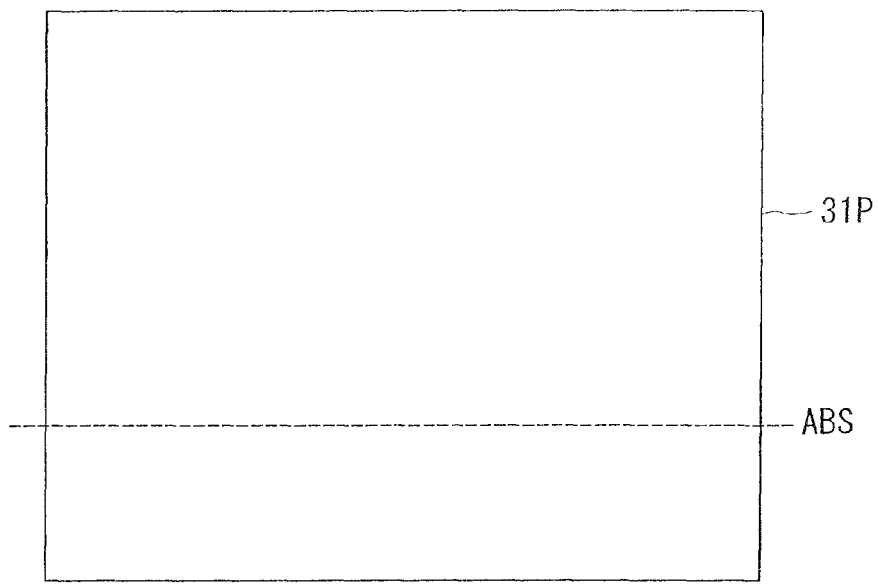
FIG. 7A and FIG. 7B are explanatory diagrams showing a step of a manufacturing method for the magnetic head according to the first embodiment of the invention.
Figure 7B:
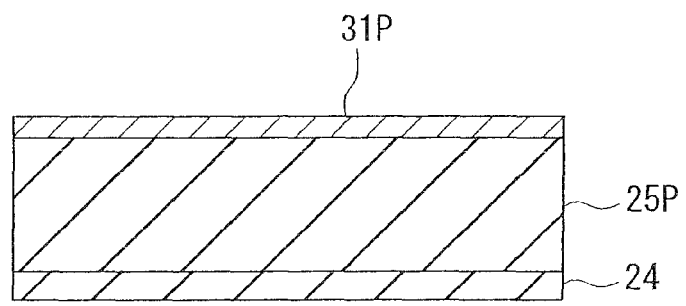

In the step shown in FIG. 7A and FIG. 7B, first, the third layer 13A3 is formed on the second layer 13A2 and the connecting layer 51 is formed on the connecting portion 11a of the coil 11, each by frame plating, for example. Next, a nonmagnetic layer 25P is formed over the entire top surface of the stack by sputtering, for example. The nonmagnetic layer 25P is to be made into the encasing layer 25 by forming the grooves 25a, 25b1, 25b2 and 25c therein afterward. The nonmagnetic layer 25P is formed such that its top surface is located at a level higher than the top surfaces of the third layer 13A3 and the connecting layer 51. The nonmagnetic layer 25P has a thickness of 0.2 µm or greater, for example. Next, a nonmagnetic metal layer 31P made of a nonmagnetic metal material is formed over the entire top surface of the stack by sputtering, for example. The nonmagnetic metal layer 31P is formed of, for example, a Ru layer or a layered film consisting of a Ru layer and a NiCr layer. The nonmagnetic metal layer 31P has a thickness within the range of 20 to 50 nm, for example.

Figure 8A:
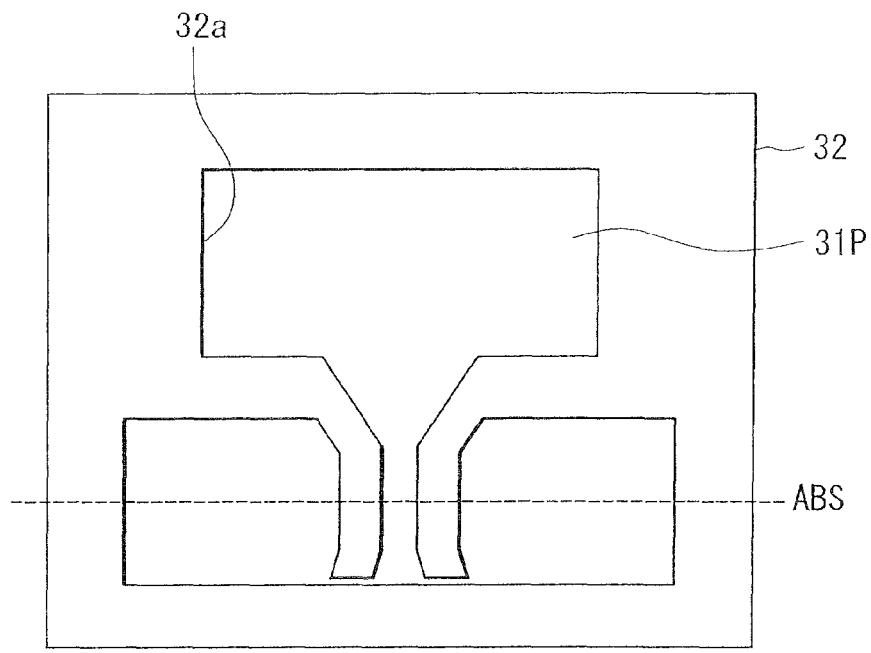
FIG. 8A and FIG. 8B are explanatory diagrams showing a step that follows the step of FIG. 7A and FIG. 7B.
Figure 8B:
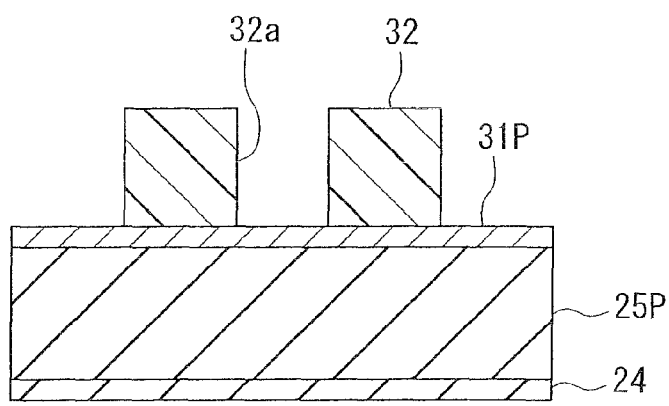

FIG. 8A and FIG. 8B show the next step. In this step, a photoresist layer is formed on the nonmagnetic metal layer 31P and it is patterned by photolithography to thereby form a photoresist mask 32 that is to be used in etching the nonmagnetic metal layer 31P afterward. More specifically, in this step, the photoresist layer is initially formed on the nonmagnetic metal layer 31P. Next, the photoresist layer is selectively exposed using a photomask. Next, the photoresist layer thus exposed is developed. The photoresist layer remaining after the development makes the photoresist mask 32.

The photoresist mask 32 has an opening 32a including three portions that have shapes corresponding to the respective planar shapes (shapes as seen from above) of grooves 25a, 25b1P and 25b2P to be formed in the nonmagnetic layer 25P afterward, and a not-shown opening that has a shape corresponding to the planar shape of the groove 25c to be formed afterward. The grooves 25b1P and 25b2P are to be etched afterward to make the grooves 25b1 and 25b2, respectively. When patterning the photoresist layer by photolithography, optical proximity correction (hereinafter referred to as OPC) may be employed to form the photoresist mask 32 into a shape closer to a desired one. The OPC will be described in detail later.

Figure 9A:
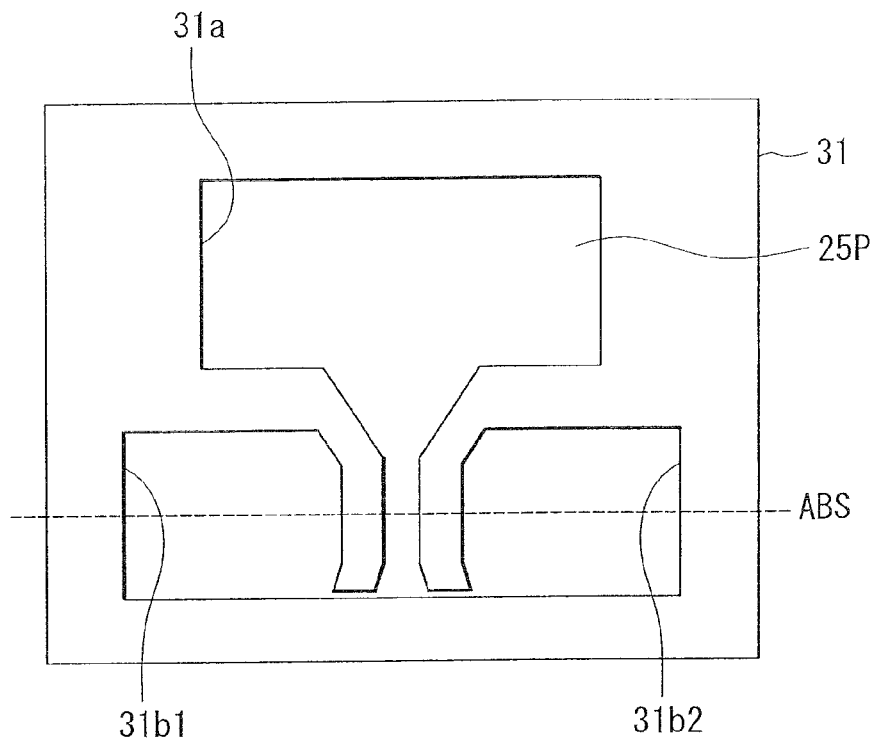
FIG. 9A and FIG. 9B are explanatory diagrams showing a step that follows the step of FIG. 8A and FIG. 8B.
Figure 9B:
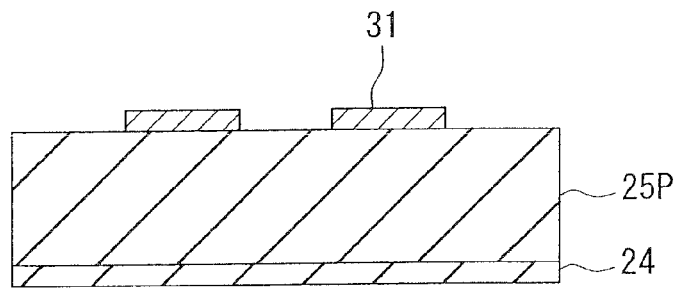

FIG. 9A and FIG. 9B show the next step. In this step, first, the nonmagnetic metal layer 31P is subjected to etching, particularly dry etching such as ion milling, using the photoresist mask 32 to thereby form in the nonmagnetic metal layer 31P openings 31a, 31b1 and 31b2 that have shapes corresponding to the respective planar shapes of the grooves 25a, 25b1P and 25b2P to be formed afterward, and a not-shown opening that has a shape corresponding to the planar shape of the groove 25c to be formed afterward. The nonmagnetic metal layer 31P remaining after the etching makes an etching mask layer 31 made of the nonmagnetic metal material. The openings 31a, 31b1 and 31b2 correspond to the first to third openings of the present invention.

When forming the etching mask layer 31 by etching the nonmagnetic metal layer 31P through ion milling using the photoresist mask 32, a three-step etching as described below may be performed. In the first step, etching is performed such that the direction of travel of the ion beams forms zero degree with respect to the direction perpendicular to the top surface of the substrate 1. In the next step, etching is performed such that the direction of travel of the ion beams forms an angle of 45 to 75 degrees with respect to the direction perpendicular to the top surface of the substrate 1 and rotates as seen in the direction perpendicular to the top surface of the substrate 1. In the final step, etching is performed such that the direction of travel of the ion beams forms zero degree with respect to the direction perpendicular to the top surface of the substrate 1. The final step has the function of removing a deposition film formed by substances that separated from the nonmagnetic metal layer 31P due to the etching and that have adhered to the sidewalls of the openings of the photoresist mask 32 and the etching mask layer 31. The three-step etching described above allows accurate formation of the etching mask layer 31 and, in particular, makes it possible to reduce and accurately define the width of the portion of the etching mask layer 31 that defines SG shown in FIG. 6.

Figure 10A:
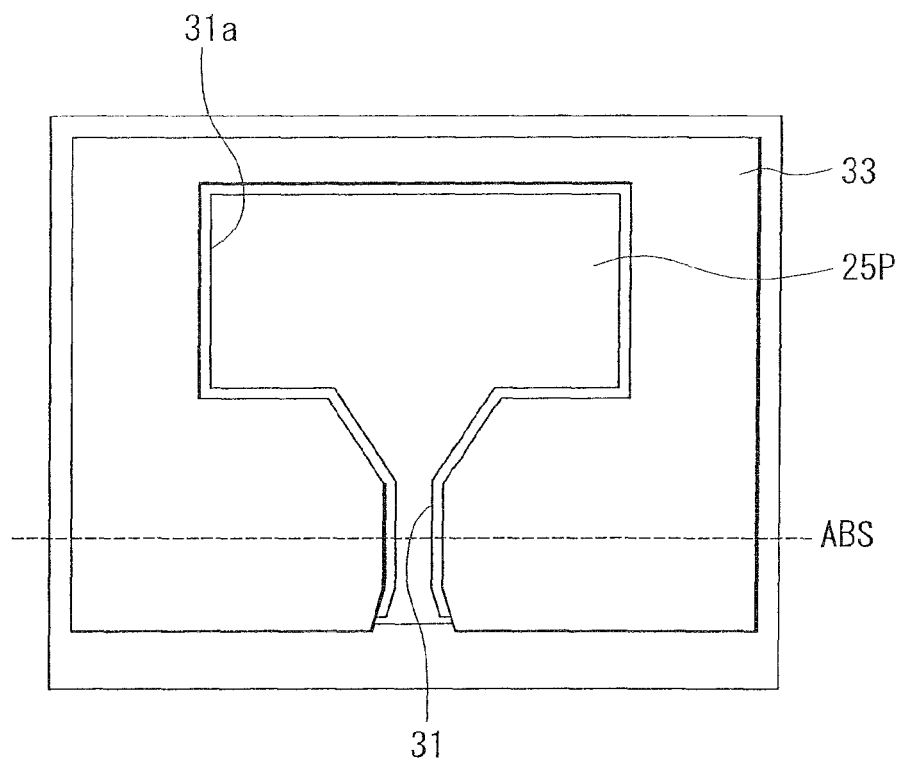
FIG. 10A and FIG. 10B are explanatory diagrams showing a step that follows the step of FIG. 9A and FIG. 9B.
Figure 10B:
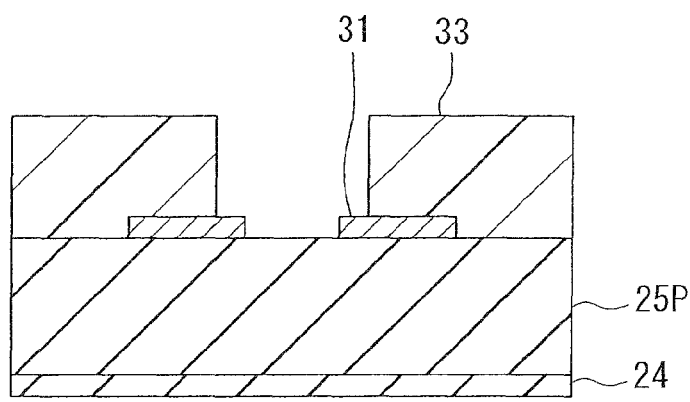

FIG. 10A and FIG. 10B show the next step. In this step, a photoresist layer is formed over the entire top surface of the stack and it is patterned to thereby form a photoresist mask 33. Of the etching mask layer 31, the openings 31b1 and 31b2 are covered with the photoresist mask 33 but the opening 31a and the not-shown opening that corresponds to the groove 25c are not covered with the photoresist mask 33. The photoresist mask 33 corresponds to the first mask of the present invention. Hereinafter, the photoresist mask 33 will also be referred to as the first mask 33.

Figure 11A:
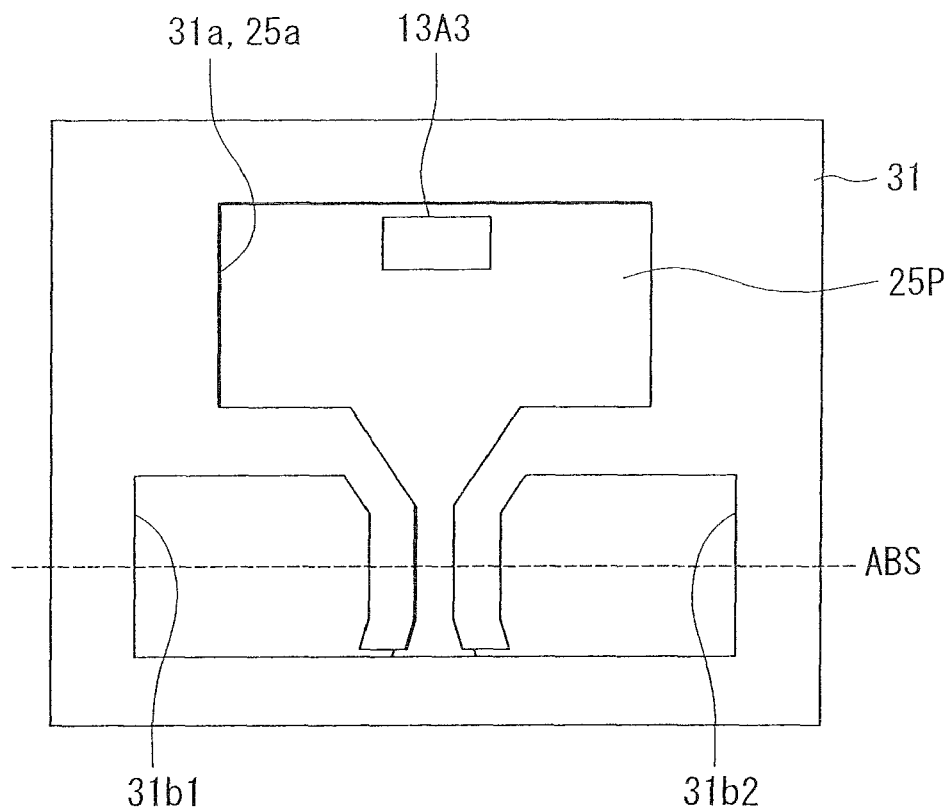
FIG. 11A and FIG. 11B are explanatory diagrams showing a step that follows the step of FIG. 10A and FIG. 10B.
Figure 11B:
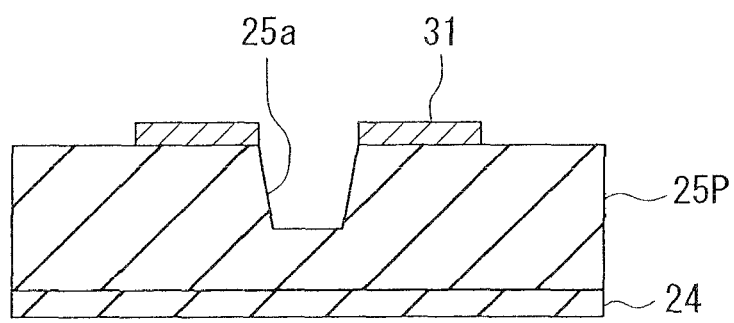

FIG. 11A and FIG. 11B show the next step. In this step, first, the nonmagnetic layer 25P is selectively etched by dry etching such as reactive ion etching (hereinafter referred to as RIE) using the opening 31a of the etching mask layer 31 and the not-shown opening of the etching mask layer 31 that corresponds to the groove 25c, with the openings 31b1 and 31b2 of the etching mask layer 31 covered with the photoresist mask 33. The grooves 25a and 25c are thereby formed in the nonmagnetic layer 25P. Here, the etching is performed so that the wall faces of the groove 25a corresponding to both sides of the track width defining portion 12A of the pole layer 12 each form an angle of, for example, 5 to 15 degrees with respect to the direction perpendicular to the top surface of the substrate 1. A gas containing $Cl_2$ and $BCl_3$ is used as an etching gas when etching the nonmagnetic layer 25P by RIE. In the etching gas, the proportion of the flow rate of $BCl_3$ in the entire flow rate is 50% to 90%, for example. The temperature of the stack when etching the nonmagnetic layer 25P by RIE is preferably 100° C. or lower. Next, the photoresist mask 33 is removed.

Figure 12A:
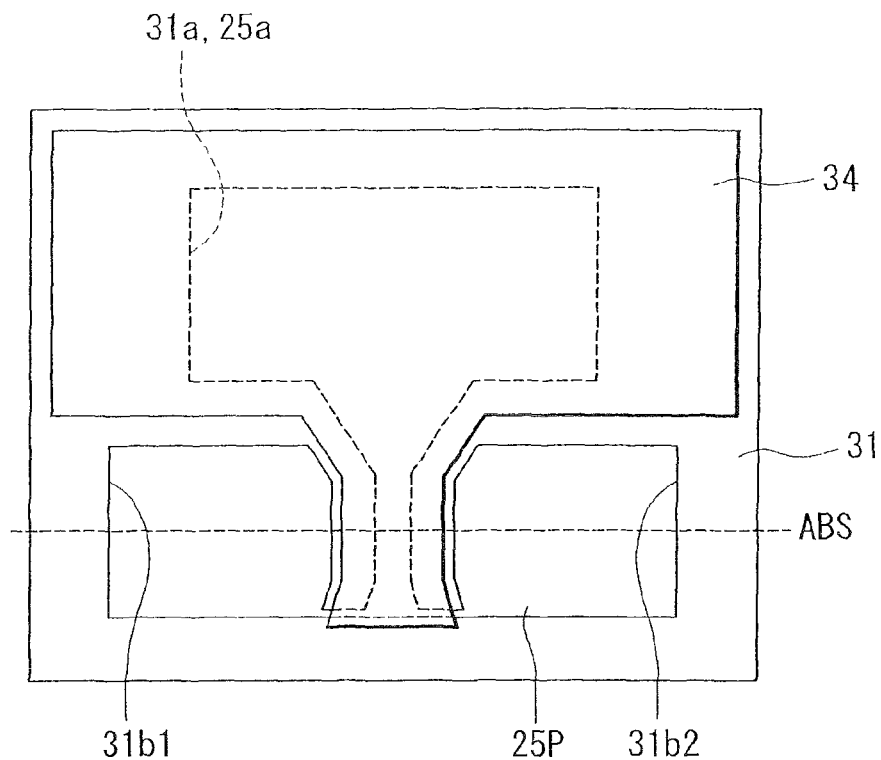
FIG. 12A and FIG. 12B are explanatory diagrams showing a step that follows the step of FIG. 11A and FIG. 11B.
Figure 12B:
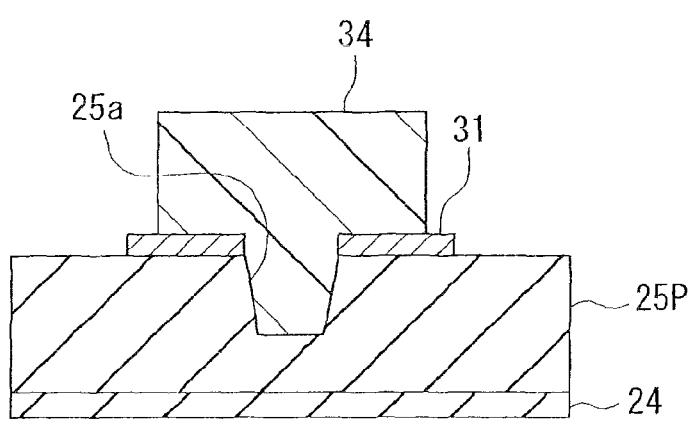

FIG. 12A and FIG. 12B show the next step. In this step, first, a photoresist layer is formed over the entire top surface of the stack and it is patterned to thereby form a photoresist mask 34. Of the etching mask layer 31, the opening 31a and the not-shown opening that corresponds to the groove 25c are covered with the photoresist mask 34 but the openings 31b1 and 31b2 are not covered with the photoresist mask 34. The photoresist mask 34 corresponds to the second mask of the present invention. Hereinafter, the photoresist mask 34 will also be referred to as the second mask 34.

Figure 13A:
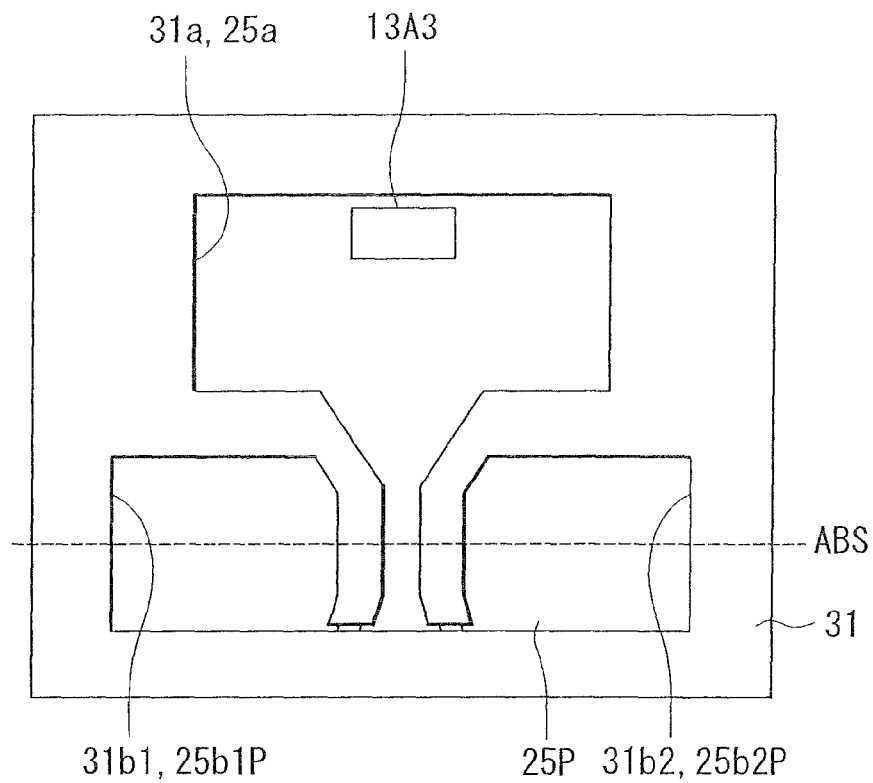
FIG. 13A and FIG. 13B are explanatory diagrams showing a step that follows the step of FIG. 12A and FIG. 12B.
Figure 13B:
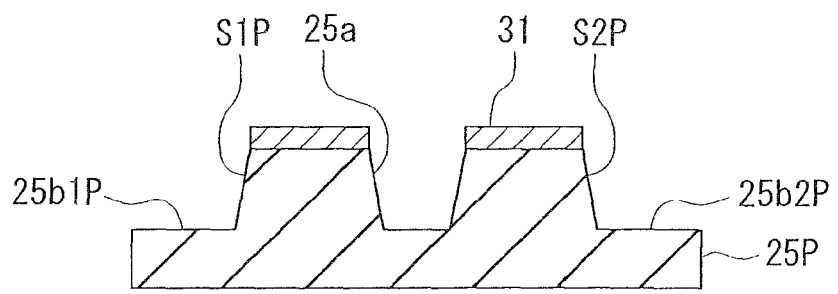

FIG. 13A and FIG. 13B show the next step. In this step, first, the nonmagnetic layer 25P is selectively etched by dry etching such as RIE using the openings 31b1 and 31b2 of the etching mask layer 31, with the opening 31a of the etching mask layer 31 and the not-shown opening of the etching mask layer 31 that corresponds to the groove 25c covered with the photoresist mask 34. A first initial side shield groove 25b1P and a second initial side shield groove 25b2P are thereby formed in the nonmagnetic layer 25P. Here, the wall face of the groove 25b1P that is closer to the groove 25a will be denoted by the symbol S1P, and the wall face of the groove 25b2P that is closer to the groove 25a will be denoted by the symbol S2P. The photoresist mask 34 is then removed.

Figure 14A:
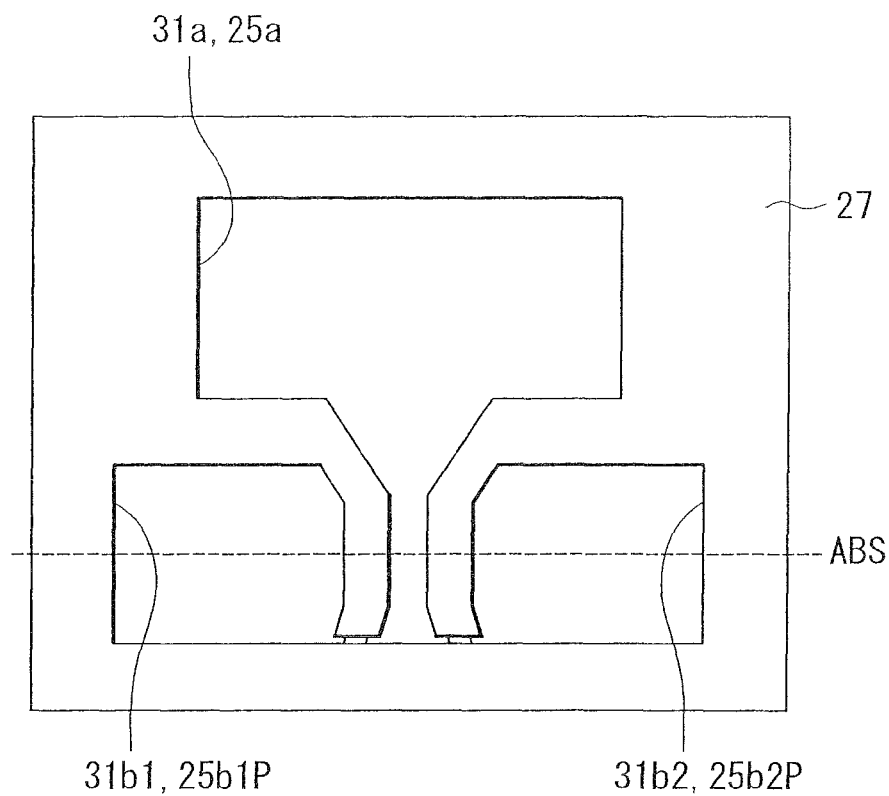
FIG. 14A and FIG. 14B are explanatory diagrams showing a step that follows the step of FIG. 13A and FIG. 13B.
Figure 14B:
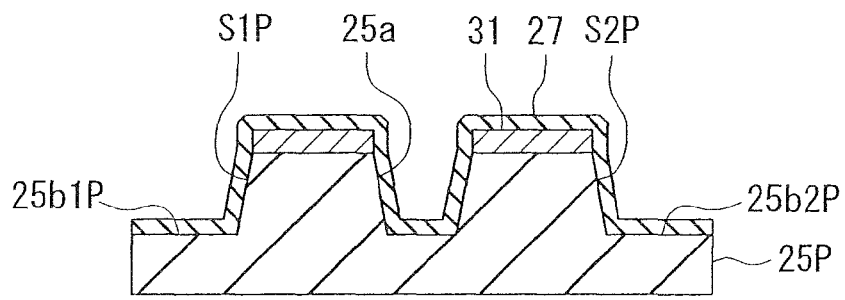

FIG. 14A and FIG. 14B show the next step. In this step, the nonmagnetic layer 27 is formed over the entire top surface of the stack. The nonmagnetic layer 27 is formed also in the grooves 25a, 25b1P, 25b2P and 25c. The nonmagnetic layer 27 is formed by sputtering, chemical vapor deposition (CVD) or atomic layer deposition (ALD), for example.

Figure 15A:
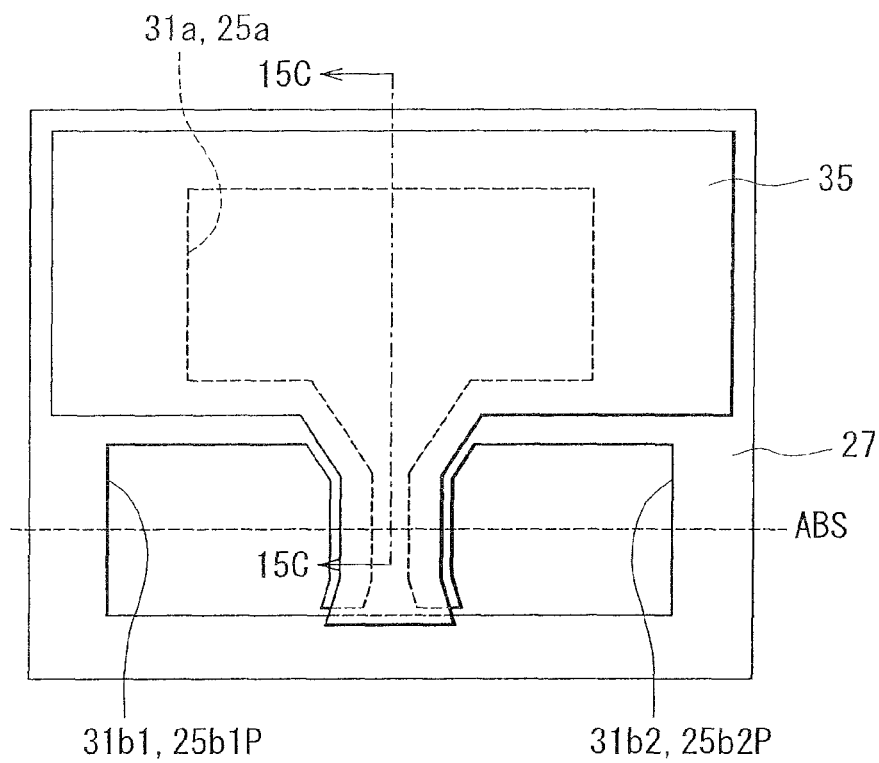
FIG. 15A to FIG. 15C are explanatory diagrams showing a step that follows the step of FIG. 14A and FIG. 14B.
Figure 15B:
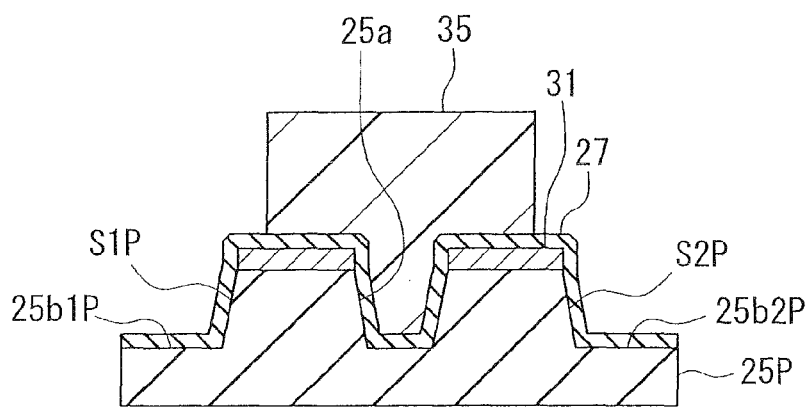
Figure 15C:
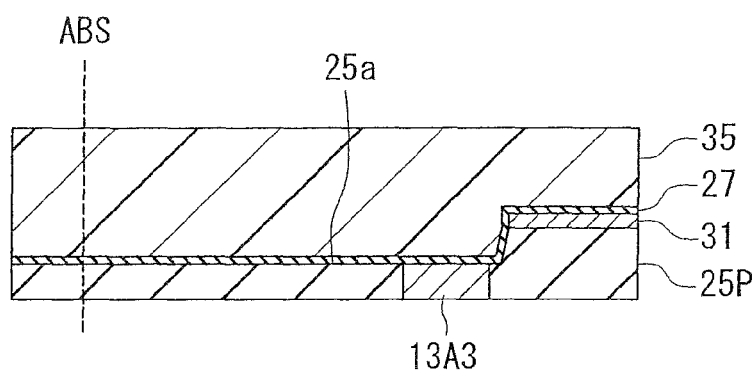

FIG. 15A to FIG. 15C show the next step. FIG. 15C shows a cross section of the stack taken along line 15C-15C of FIG. 15A. In this step, a photoresist layer is formed over the entire top surface of the stack and it is patterned to thereby form a photoresist mask 35. The photoresist mask 35 covers the grooves 25a and 25c, and does not cover the grooves 25b1P and 25b2P.

Figure 16A:
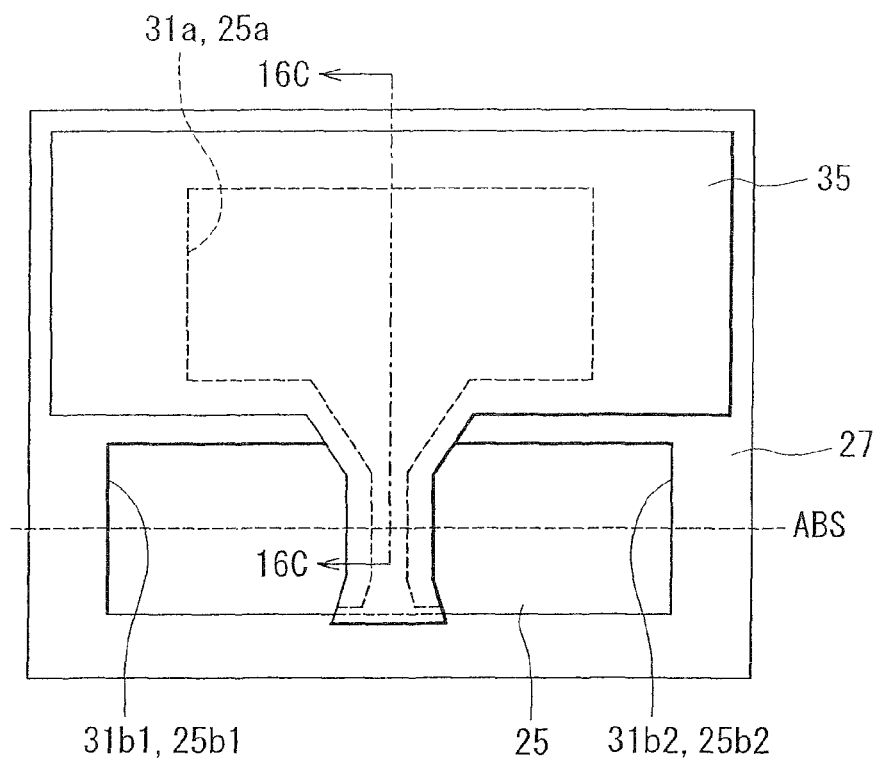
FIG. 16A to FIG. 16C are explanatory diagrams showing a step that follows the step of FIG. 15A to FIG. 15C.
Figure 16B:
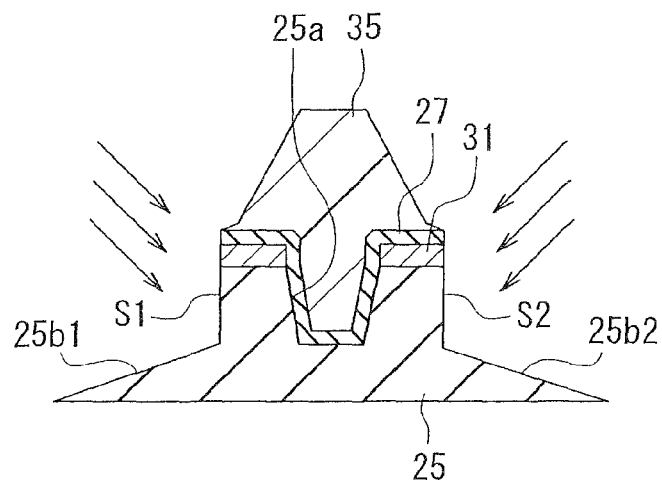
Figure 16C:
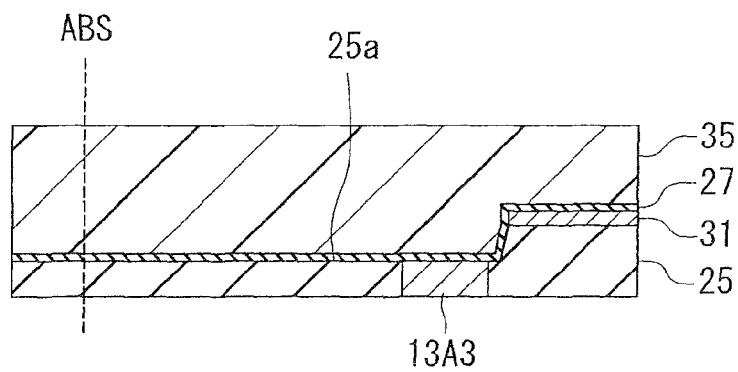

FIG. 16A to FIG. 16C show the next step. FIG. 16C shows a cross section of the stack taken along line 16C-16C of FIG. 16A. In this step, the wall face S1P of the groove 25b1P and the wall face S2P of the groove 25b2P are etched by dry etching such as ion milling with the grooves 25a and 25c covered with the photoresist mask 35, so that the groove 25b1P is made into the groove 25b1 while the groove 25b2P is made into the groove 25b2. Specifically, the nonmagnetic layer 25P, the nonmagnetic layer 27, the etching mask layer 31 and the photoresist mask 35 are partially removed by, for example, ion milling, so that the portions of the nonmagnetic layer 27 located in the grooves 25b1P and 25b2P are removed and the portions of the nonmagnetic layer 25P and the etching mask layer 31 that define SG shown in FIG. 6 become smaller in width than in FIG. 15B.

The ion milling in this step is performed such that the direction of travel of the ion beams forms an angle of 45 to 75 degrees with respect to the direction perpendicular to the top surface of the substrate 1 and rotates as seen in the direction perpendicular to the top surface of the substrate 1. Alternatively, the ion milling may be performed such that the direction of travel of the ion beams forms an angle of 45 to 75 degrees with respect to the direction perpendicular to the top surface of the substrate 1 and that the ion beams travel toward the wall face S1P from above when etching the wall face S1P and travel toward the wall face S2P from above when etching the wall face S2P. Arrows in FIG. 16B indicate the direction of travel of the ion beams.

This step makes the grooves 25b1P and 25b2P into the grooves 25b1 and 25b2, respectively. The formation of the grooves 25b1 and 25b2 in the nonmagnetic layer 25P makes the nonmagnetic layer 25P into the encasing layer 25. This step corresponds to the step of completing the first and second side shield grooves of the present invention. Here, the wall face of the groove 25b1 that is closer to the groove 25a will be denoted by the symbol S1, and the wall face of the groove 25b2 that is closer to the groove 25a will be denoted by the symbol S2. This step makes the minimum distance between the wall face S1 and the groove 25a and the minimum distance between the wall face S2 and the groove 25a smaller than the minimum distance between the wall face S1 and the groove 25a and the minimum distance between the wall face S2P and the groove 25a, respectively, by 0.1 μm each, for example.

Figure 17A:
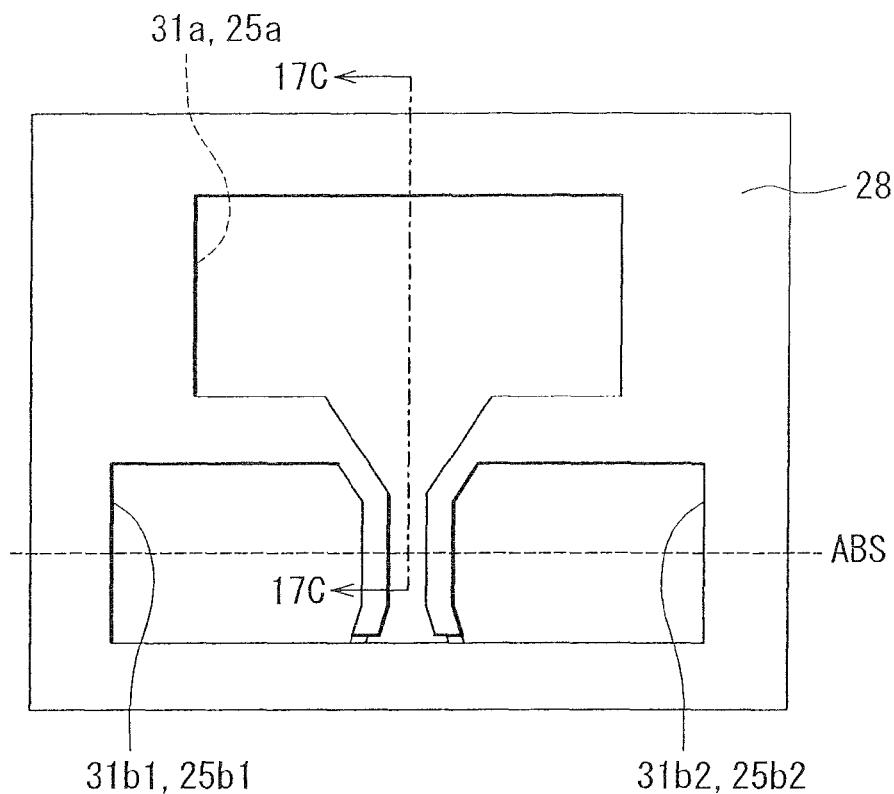
FIG. 17A to FIG. 17C are explanatory diagrams showing a step that follows the step of FIG. 16A to FIG. 16C.
Figure 17B:
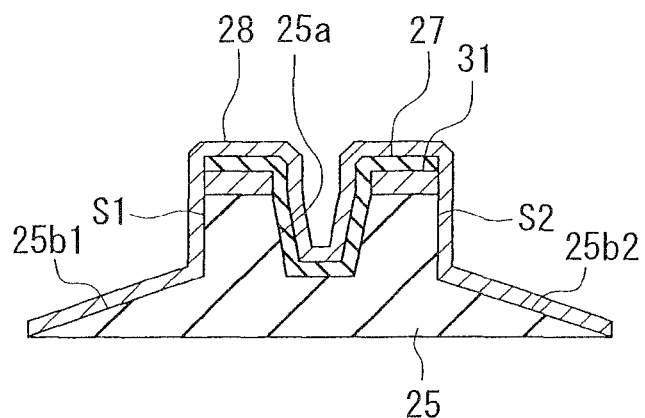
Figure 17C:
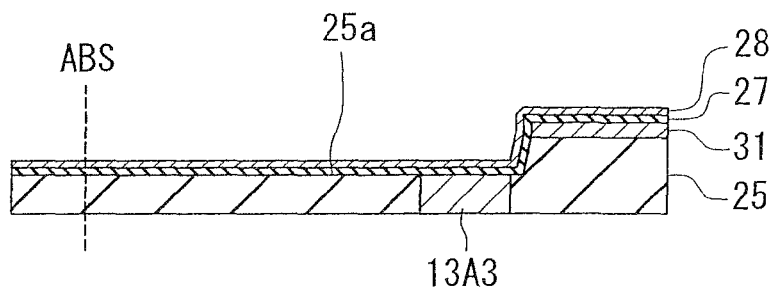

FIG. 17A to FIG. 17C show the next step. FIG. 17C shows a cross section of the stack taken along line 17C-17C of FIG. 17A. In this step, first, the photoresist mask 35 is removed. Next, the nonmagnetic metal layer 28 is formed over the entire top surface of the stack by sputtering or ion beam deposition, for example. The nonmagnetic metal layer 28 is formed also in the grooves 25a, 25b1, 25b2 and 25c. The nonmagnetic metal layer 28 is formed of, for example, a layered film consisting of a Ta layer and a Ru layer. The nonmagnetic metal layer 28 is used as an electrode and a seed layer when forming the pole layer 12 afterward by plating.

Figure 18A:
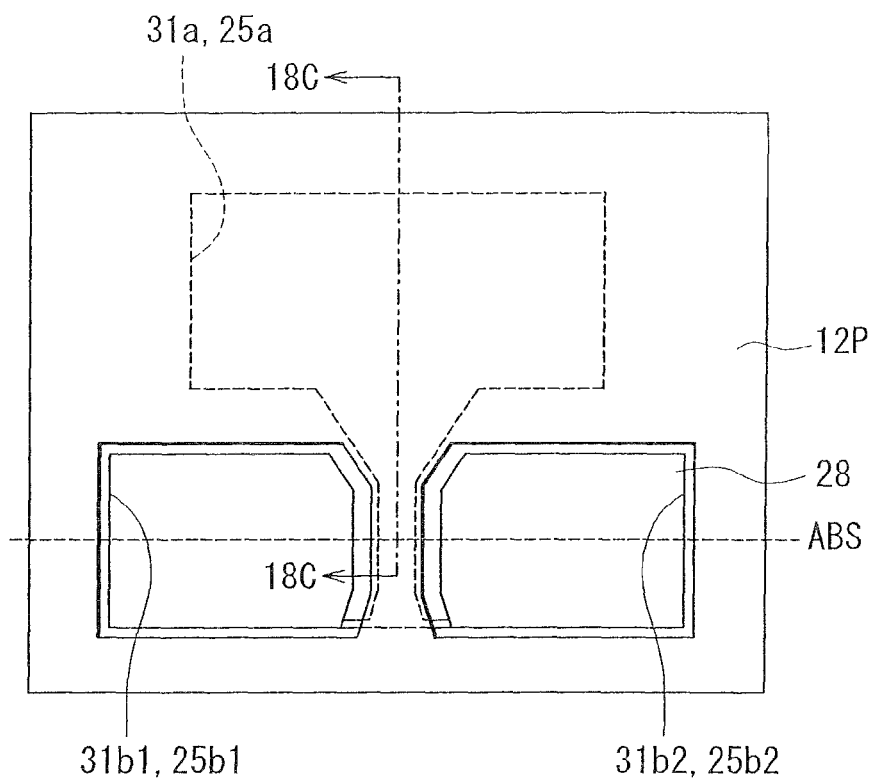
FIG. 18A to FIG. 18C are explanatory diagrams showing a step that follows the step of FIG. 17A to FIG. 17C.
Figure 18B:
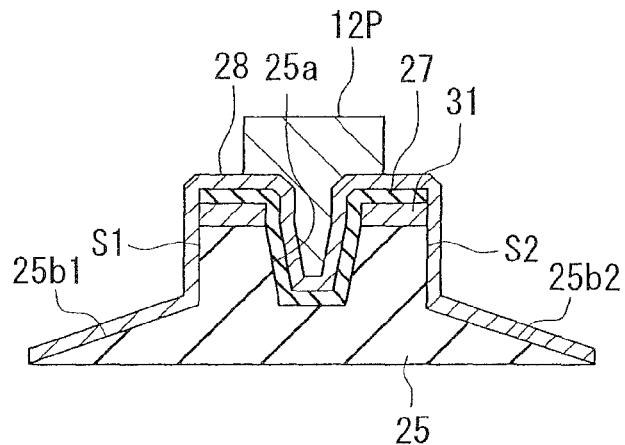
Figure 18C:
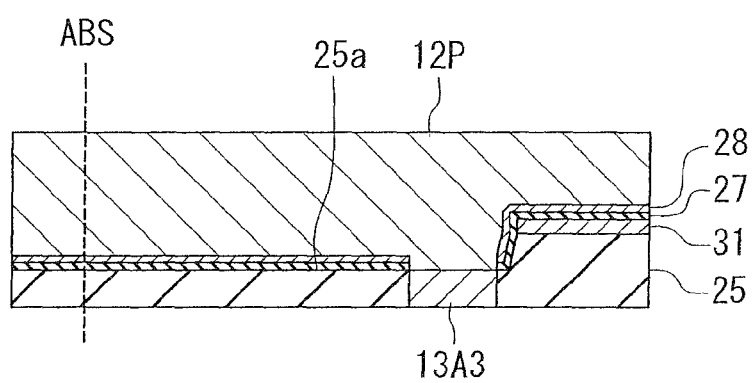

FIG. 18A to FIG. 18C show the next step. FIG. 18C shows a cross section of the stack taken along line 18C-18C of FIG. 18A. In this step, first, the nonmagnetic layer 27 and the nonmagnetic metal layer 28 are selectively etched to form therein the openings for exposing the top surface of the third layer 13A3 and the openings for exposing the top surface of the connecting layer 51. Next, a magnetic layer 12P, which is to be made into the pole layer 12 and the connecting layer 52 afterward, is formed by plating using the nonmagnetic metal layer 28 as an electrode and a seed layer. The magnetic layer 12P is formed to fill the grooves 25a and 25c and to have a top surface located at a higher level than the top surface of the portion of the nonmagnetic metal layer 28 that lies above the etching mask layer 31. The magnetic layer 12P is not formed in the grooves 25b1 and 25b2.

Figure 19A:
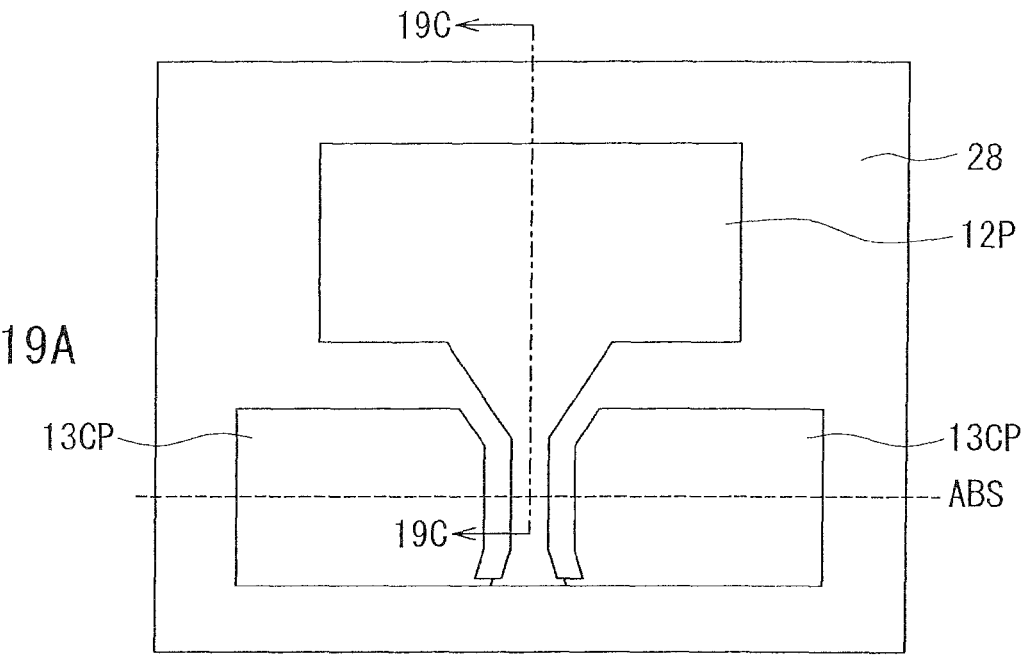
FIG. 19A to FIG. 19C are explanatory diagrams showing a step that follows the step of FIG. 18A to FIG. 18C.
Figure 19B:
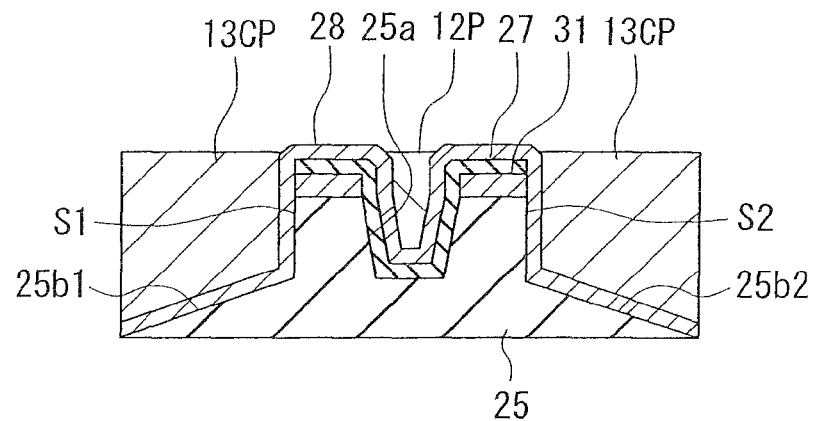
Figure 19C:
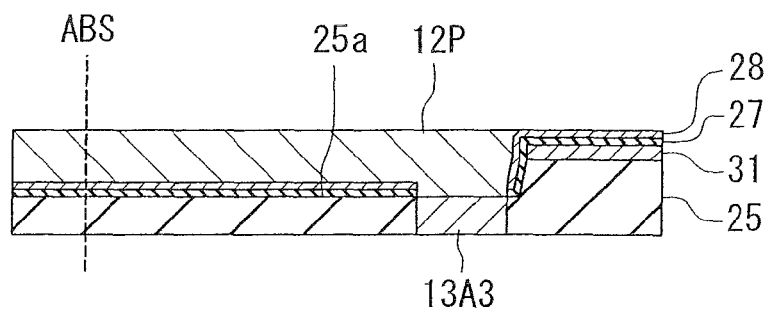

FIG. 19A to FIG. 19C show the next step. FIG. 19C shows a cross section of the stack taken along line 19C-19C of FIG. 19A. In this step, first, a magnetic layer 13CP, which is to be made into the side shields 13C1 and 13C2 afterward, is formed by plating using the nonmagnetic metal layer 28 as an electrode and a seed layer. The magnetic layer 13CP is formed to fill the grooves 25b1 and 25b2 and to have a top surface located at a higher level than the top surface of the portion of the nonmagnetic metal layer 28 that lies above the etching mask layer 31. Next, the magnetic layers 12P and 13CP are polished by, for example, CMP, until the nonmagnetic metal layer 28 is exposed. This separates the magnetic layer 12P remaining in the grooves 25a and 25c from the magnetic layer 13CP remaining in the grooves 25b1 and 25b2. It should be noted that a difference in level between the top surface of the nonmagnetic metal layer 28 and the top surfaces of the magnetic layers 12P and 13CP can develop due to a difference in polishing rate between the nonmagnetic metal layer 28 and the magnetic layers 12P and 13CP.

Figure 20A:
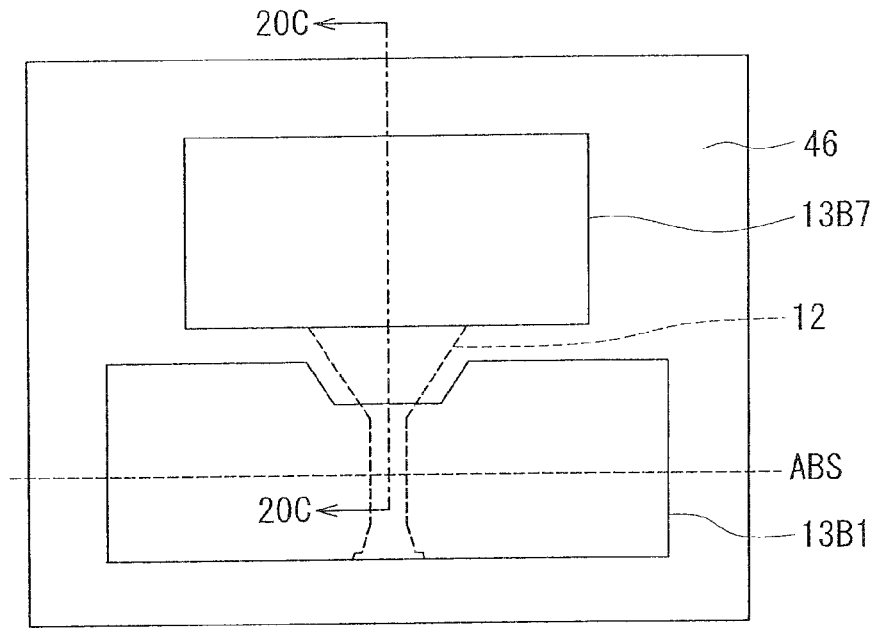
FIG. 20A to FIG. 20C are explanatory diagrams showing a step that follows the step of FIG. 19A to FIG. 19C.
Figure 20B:
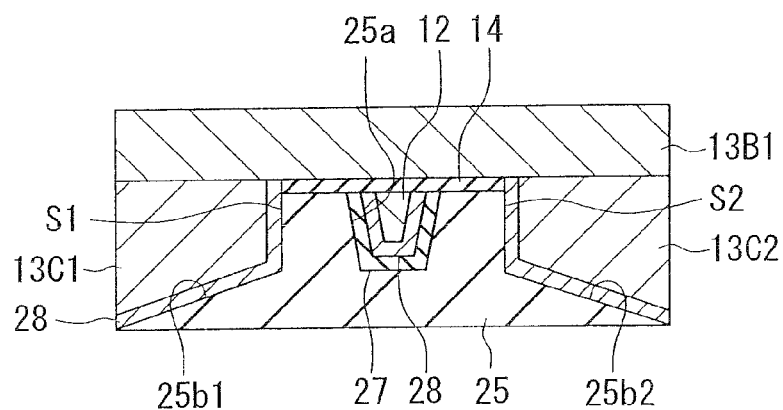
Figure 20C:
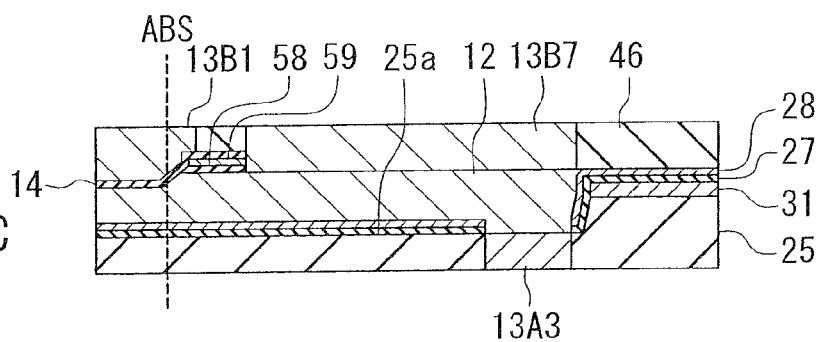

FIG. 20A to FIG. 20C show the next step. FIG. 20C shows a cross section of the stack taken along line 20C-20C of FIG. 20A. In this step, first, the magnetic layers 12P and 13CP and the nonmagnetic metal layer 28 are partially etched by ion milling, for example, so as to flatten the magnetic layers 12P and 13CP and the nonmagnetic metal layer 28 at the top.

Next, not-shown first and second mask layers that are stacked are formed on the portion of the magnetic layer 12P remaining in the groove 25a. The first mask layer is to be made into the insulating layer 58 afterward, and the second mask layer is to be made into the nonmagnetic metal layer 59 afterward. The first and second mask layers are formed by, for example, etching and thereby patterning a layered film that is formed by sputtering. The first and second mask layers cover a portion of the top surface of the magnetic layer 12P, the portion being intended to be made into the second portion 12T2 of the top surface of the pole layer 12 afterward. An edge of the first mask layer that is closer to the position ABS where the medium facing surface 30 is to be formed defines the position of the boundary between the first portion 12T1 and the second portion 12T2 of the top surface of the pole layer 12. Next, the magnetic layers 12P and 13CP, the encasing layer 25, the nonmagnetic layer 27, the nonmagnetic metal layer 28 and the etching mask layer 31 are partially etched by, for example, ion milling using the first and second mask layers. This forms the first portion 12T1 and the second portion 12T2 in the top surface of the portion of the magnetic layer 12P remaining in the groove 25a. The portion of the magnetic layer 12P remaining in the groove 25a thereby makes the pole layer 12. The portion of the magnetic layer 12P remaining in the groove 25c makes the connecting layer 52. Of the magnetic layer 13CP, the portion remaining in the groove 25b1 makes the side shield 13C1 while the portion remaining in the groove 25b2 makes the side shield 13C2.

Next, the gap layer 14 is formed over the entire top surface of the stack by sputtering or CVD, for example. Next, the gap layer 14 and the first and second mask layers are selectively etched by, for example, ion milling, so as to expose the top surface of the pole layer 12 in part and the top surfaces of the side shields 13C1 and 13C2 and the connecting layer 52. This makes the first and second mask layers into the insulating layer 58 and the nonmagnetic metal layer 59, respectively.

Next, the top shield layer 13B1 is formed over the side shields 13C1 and 13C2 and the gap layer 14, the top yoke layer 13B7 is formed on the pole layer 12, and the connecting layer 53 is formed on the connecting layer 52, each by frame plating, for example. Next, the nonmagnetic layer 46 is formed over the entire top surface of the stack. Next, the nonmagnetic layer 46 is polished by, for example, CMP, until the top shield layer 13B1, the top yoke layer 13B7 and the connecting layer 53 are exposed. The top shield layer 13B1, the top yoke layer 13B7, the connecting layer 53 and the nonmagnetic layer 46 are thereby flattened at the top.

Steps until completion of the magnetic head after the step of FIG. 20A to FIG. 20C will now be described with reference to FIG. 1 and FIG. 2. After the step of FIG. 20A to FIG. 20C, first, the second layer 13B2 is formed on the top shield layer 13B1, the sixth layer 13B6 is formed on the top yoke layer 13B7, and the connecting layer 54 is formed on the connecting layer 53, each by frame plating, for example. Next, the nonmagnetic layer 47 is formed over the entire top surface of the stack. Next, the nonmagnetic layer 47 is polished by, for example, CMP, until the second layer 13B2, the sixth layer 13B6 and the connecting layer 54 are exposed. The second layer 13B2, the sixth layer 13B6, the connecting layer 54 and the nonmagnetic layer 47 are thereby flattened at the top.

Next, the insulating layer 17 is formed on an area of the top surface of the nonmagnetic layer 47 over which the coil 18 is to be formed. Next, the coil 18 is formed on the insulating layer 17 by frame plating, for example. Next, the third layer 13B3 is formed on the second layer 13B2 and the fifth layer 13B5 is formed on the sixth layer 13B6, each by frame plating, for example. The coil 18 may be formed after forming the third layer 13B3 and the fifth layer 13B5, however.

Next, the insulating layer 19 is formed around the coil 18 and the fifth layer 13B5 and in the space between every adjacent turns of the coil 18. Next, the insulating layer 41 is formed over the entire top surface of the stack. Next, the insulating layer 41 is polished by, for example, CMP, until the third layer 13B3, the fifth layer 13B5 and the coil 18 are exposed. The third layer 13B3, the fifth layer 13B5, the coil 18 and the insulating layers 19 and 41 are thereby flattened at the top.

Next, the insulating layer 20 is formed over the entire top surface of the stack by sputtering, for example. Next, the insulating layer 20 is selectively etched to form therein an opening for exposing the top surface of the third layer 13B3 and an opening for exposing the top surface of the fifth layer 13B5. Next, the fourth layer 13B4 of the second portion 13B is formed by frame plating, for example. The shield 13 is thereby completed.

Next, the protection layer 42 is formed to cover the entire top surface of the stack. Wiring, terminals and so on are then formed on the protection layer 42, the substrate is cut into sliders, and polishing of the medium facing surface 30, fabrication of flying rails, etc. are performed to thereby complete the magnetic head.

As has been described, the manufacturing method for the magnetic head according to the present embodiment includes the steps of forming the nonmagnetic layer 25P that is to be made into the encasing layer 25 by forming the pole groove 25a and the first and second side shield grooves 25b1 and 25b2 therein afterward; forming the etching mask layer 31 on the nonmagnetic layer 25P, the etching mask layer 31 having the first to third openings 31a, 31b1 and 31b2 that have shapes corresponding to the respective planar shapes of the pole groove 25a and the first and second initial side shield grooves 25b1P and 25b2P to be formed afterward; forming the pole groove 25a in the nonmagnetic layer 25P by etching using the etching mask layer 31; and forming the first and second initial side shield grooves 25b1P and 25b2P in the nonmagnetic layer 25P by etching using the etching mask layer 31.

The manufacturing method for the magnetic head further includes the steps of completing the first and second side shield grooves 25b1 and 25b2 by etching the wall face S1P of the first initial side shield groove 25b1P that is closer to the pole groove 25a and the wall face S2P of the second initial side shield groove 25b2P that is closer to the pole groove 25a by employing dry etching, such as ion milling, so that the first initial side shield groove 25b1P is made into the first side shield groove 25b1 while the second initial side shield groove 25b2P is made into the second side shield groove 25b2; forming the pole layer 12; forming the first and second side shields 13C1 and 13C2; forming the gap layer 14; forming the top shield layer 13B1; and forming the coils 11 and 18.

The step of completing the first and second side shield grooves 25b1 and 25b2 is performed with the pole groove 25a covered with the photoresist mask 35, after the step of forming the pole groove 25a and before the step of forming the pole layer 12. The step of forming the pole layer 12 and the step of forming the first and second side shields 13C1 and 13C2 are performed after the step of completing the first and second side shield grooves 25b1 and 25b2.

The step of forming the pole groove 25a is performed with the second and third openings 31b1 and 31b2 covered with the first mask 33, and the step of forming the first and second initial side shield grooves 25b1P and 25b2P is performed with the first opening 31a covered with the second mask 34.

The step of forming the etching mask layer 31 includes the steps of forming the nonmagnetic metal layer 31P made of a nonmagnetic metal material on the nonmagnetic layer 25P, the nonmagnetic metal layer 31P being intended to be made into the etching mask layer 31 by forming the first to third openings 31a, 31b1 and 31b2 therein afterward; forming the photoresist mask 32 on the nonmagnetic metal layer 31P, the photoresist mask 32 being intended to be used in etching the nonmagnetic metal layer 31P afterward; and forming the first to third openings 31a, 31b1 and 31b2 in the nonmagnetic metal layer 31P by etching using the photoresist mask 32 so that the nonmagnetic metal layer 31P is made into the etching mask layer 31. In the step of forming the photoresist mask 32, the photoresist mask 32 may be formed by performing photolithography with OPC.

In the present embodiment, the positions of the pole layer 12 and the two side shields 13C1 and 13C2 are defined by the first to third openings 31a, 31b1 and 31b2 of the etching mask layer 31 that are patterned simultaneously. The present embodiment thus allows accurate alignment of the pole layer 12 and the two side shields 13C1 and 13C2 with respect to each other. Furthermore, since the positions of the pole layer 12 and the two side shields 13C1 and 13C2 are defined by the first to third openings 31a, 31b1 and 31b2 of the etching mask layer 31 as described above, accurate alignment is not required for the first and second masks 33 and 34.

In the present embodiment, the pole groove 25a is formed by etching the nonmagnetic layer 25P using the first opening 31a, with the second and third openings 31b1 and 31b2 covered with the first mask 33, and the first and second initial side shield grooves 25b1P and 25b2P are formed by etching the nonmagnetic layer 25P using the second and third openings 31b1 and 31b2, with the first opening 31a covered with the second mask 34. The present embodiment thus allows forming the pole groove 25a and the first and second initial side shield grooves 25b1P and 25b2P by etching under different conditions. Moreover, in the present embodiment, the wall faces S1P and S2P of the first and second initial side shield grooves 25b1P and 25b2P are etched by dry etching such as ion milling to thereby complete the first and second side shield grooves 25b1 and 25b2. According to the present embodiment, it is thus possible to control the respective shapes of the pole groove 25a and the first and second side shield grooves 25b1 and 25b2 into desired shapes.

Consequently, according to the present embodiment, it is possible to control the respective shapes of the pole layer 12 and the two side shields 13C1 and 13C2 into desired shapes in order to achieve desired write characteristics. For example, according to the present embodiment, as shown in FIG. 6, the dimension PT of the end face of the pole layer 12 located in the medium facing surface 30 taken in the direction perpendicular to the top surface of the substrate 1 can be different from the dimension of the end face of each of the side shields 13C1 and 13C2 located in the medium facing surface 30 taken in the direction perpendicular to the top surface of the substrate 1. Furthermore, according to the present embodiment, the angle formed by each of the third side A3 and the fourth side A4 of the end face of the pole layer 12 with respect to the direction perpendicular to the top surface of the substrate 1 can be different from the angle formed by each of the side B1 of the end face of the side shield 13C1 and the side B2 of the end face of the side shield 13C2 with respect to the direction perpendicular to the top surface of the substrate 1.

Here, suppose that the manufacturing method does not include the step of completing the first and second side shield grooves 25b1 and 25b2, so that the first and second initial side shield grooves 25b1P and 25b2P as they are serve as the first and second side shield grooves 25b1 and 25b2, respectively. In this case, the minimum distance between the pole groove 25a and each of the first and second side shield grooves 25b1 and 25b2 is defined by the minimum width of the photoresist mask 32 shown in FIG. 8B. It is therefore impossible in this case to reduce the distance between the pole layer 12 and each of the first and second side shields 13C1 and 13C2 beyond the limit that can be defined by the photoresist mask 32.

According to the present embodiment, in contrast, the wall faces S1P and S2P of the first and second initial side shield grooves 25b1P and 25b2P are etched by dry etching such as ion milling to thereby complete the first and second side shield grooves 25b1 and 25b2. It is thus possible to make the minimum distance between the pole groove 25a and each of the first and second side shield grooves 25b1 and 25b2 smaller than the minimum width of the photoresist mask 32 shown in FIG. 8B. Consequently, according to the present embodiment, it is possible to reduce the distance between the pole layer 12 and each of the first and second side shields 13C1 and 13C2 beyond the limit that can be defined by the photoresist mask 32.

Furthermore, according to the present embodiment, the pole layer 12 and the two side shields 13C1 and 13C2 are formed in different steps. It is thus possible to form the pole layer 12 and the two side shields 13C1 and 13C2 from different magnetic materials. The magnetic material used to form the pole layer 12 preferably has a saturation flux density higher than that of the magnetic material used to form the side shields 13C1 and 13C2.

A description will now be given of OPC that is employed in forming the photoresist mask 32 by photolithography in the step shown in FIG. 8A and FIG. 8B. Typically, when a photoresist layer is patterned by photolithography, the patterned photoresist layer often goes out of a desired shape due to the effects of, for example, reflection of light off the base layer when the photoresist layer is exposed. In OPC, the pattern of the photomask is determined so that the photoresist layer patterned by photolithography will have a shape closer to a desired one.

Figure 21A:
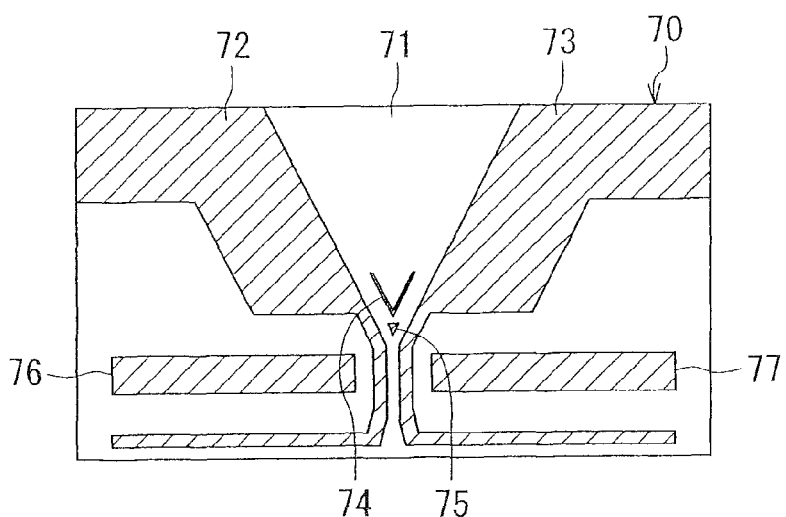
FIG. 21A to FIG. 21C are plan views showing first to third examples of the shape of a photomask used in the manufacturing method for the magnetic head according to the first embodiment of the invention.
Figure 21B:
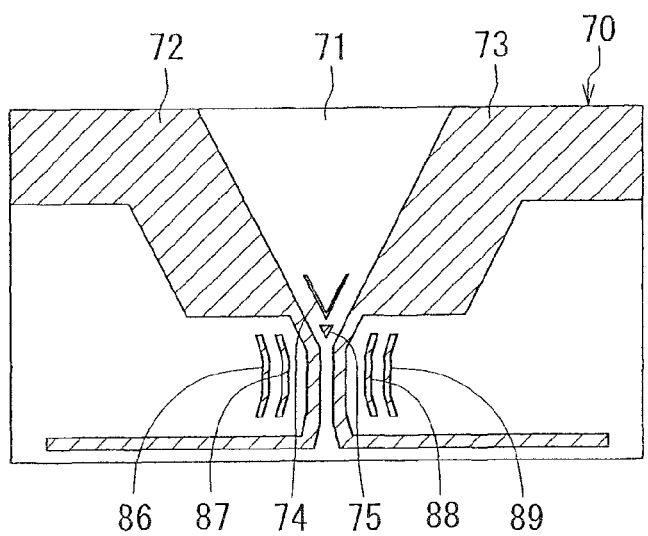
Figure 21C:
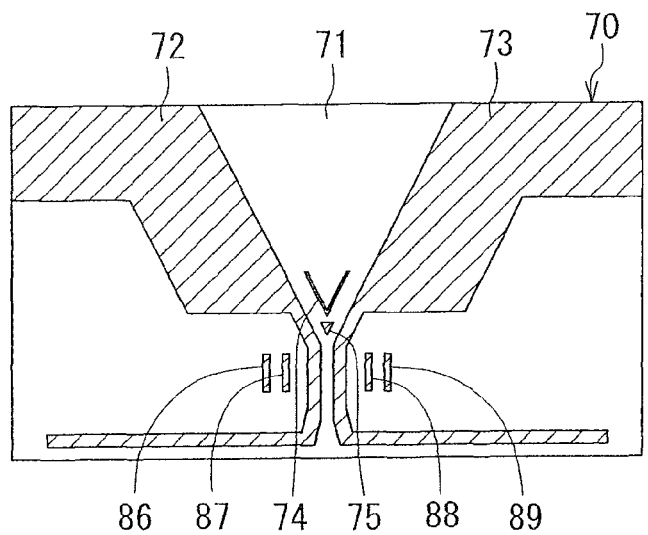

In the step shown in FIG. 8A and FIG. 8B, the photoresist layer is selectively exposed using the photomask, and then the exposed photoresist layer is developed to form the photoresist mask 32. FIG. 21A to FIG. 21C show first to third examples of the shape of the photomask in the case where OPC is employed in this step. Here, the case where the photoresist layer is positive will be described.

A photomask 70 of the first example shown in FIG. 21A has a light transmitting portion 71 that transmits light for exposure, and light blocking portions 72 to 77 that block the light for exposure. The shape of the light transmitting portion 71 generally corresponds to the shape of the portion of the photoresist layer to be removed by development. The shape of the light blocking portions 72 and 73 generally corresponds to the shape of the photoresist mask 32 to be formed. The light blocking portions 74 to 77 are the portions for controlling the pattern of the light for exposure to be applied to the photoresist layer so as to make the shape of the photoresist mask 32 closer to a desired one.

A photomask 70 of the second example shown in FIG. 21B has light blocking portions 86 to 89 instead of the light blocking portions 76 and 77 of the photomask 70 of the first example shown in FIG. 21A. In the second example, the light blocking portions 74, 75 and 86 to 89 are the portions for controlling the pattern of the light for exposure to be applied to the photoresist layer so as to make the shape of the photoresist mask 32 closer to a desired one.

In a photomask 70 of the third example shown in FIG. 21C, the light blocking portions 86 to 89 are different in shape from those of the photomask 70 of the second example shown in FIG. 21B.

Forming the photoresist mask 32 by photolithography with OPC allows the shape of the resulting photoresist mask 32 to be closer to a desired one. Consequently, it becomes possible to control the respective shapes of the pole layer 12 and the two side shields 13C1 and 13C2 more accurately.

Second Embodiment

A second embodiment of the present invention will now be described. The magnetic head according to the present embodiment has the same configuration as that of the magnetic head of the first embodiment except that the nonmagnetic metal layer 28 is not provided.

A manufacturing method for the magnetic head according to the present embodiment will now be described. The manufacturing method for the magnetic head according to the present embodiment is the same as that for the magnetic head according to the first embodiment up to the step of forming the nonmagnetic layer 27 (FIG. 14A and FIG. 14B).

Reference is now made to FIG. 22A to 26A, FIG. 22B to FIG. 26B, and FIG. 22C to FIG. 26C to describe a series of steps until the formation of the top shield layer 13B1, the top yoke layer 13B7, the connecting layer 53 and the insulating layer 46 after the foregoing step. FIG. 22A to FIG. 26A, FIG. 22B to FIG. 26B, and FIG. 22C to FIG. 26C each show a stack of layers formed in the process of manufacturing the magnetic head. Each of FIG. 22A to FIG. 26A shows the top surface of part of the stack. Each of FIG. 22B to FIG. 26B shows a cross section of the stack taken at the position where the medium facing surface 30 is to be formed. Each of FIG. 22C to FIG. 26C shows a cross section of the stack perpendicular to the medium facing surface 30 and the top surface of the substrate 1. The parts closer to the substrate 1 than the nonmagnetic layer 25P are omitted in FIG. 22B and FIG. 22C. The parts closer to the substrate 1 than the encasing layer 25 are omitted in FIG. 23B to FIG. 26B and FIG. 23C to FIG. 26C. In FIG. 22A to FIG. 26A and FIG. 22C to FIG. 26C, the symbol "ABS" indicates the position where the medium facing surface 30 is to be formed.

Figure 22A:
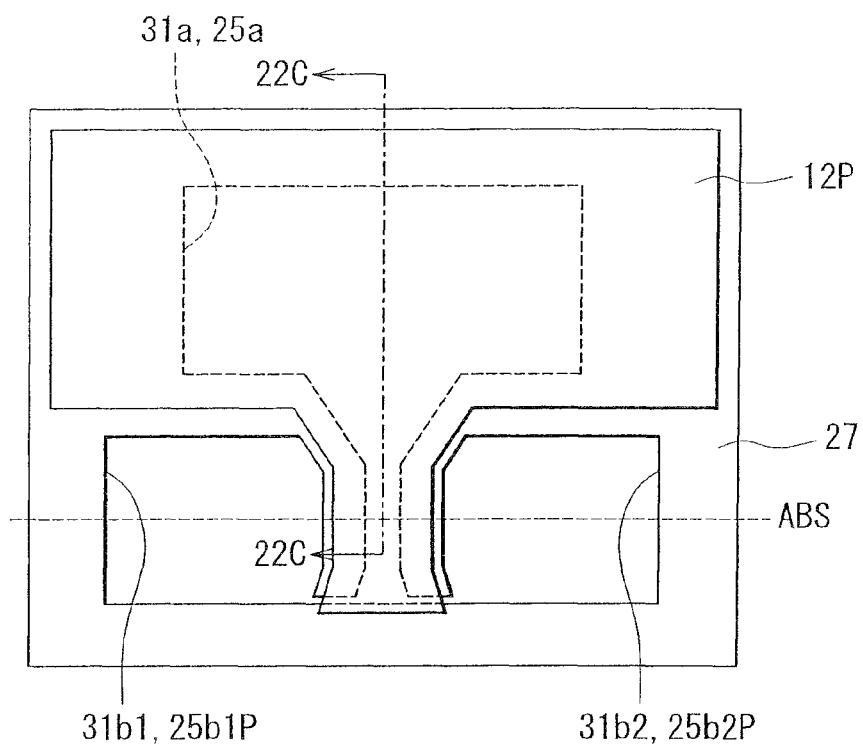
FIG. 22A to FIG. 22C are explanatory diagrams showing a step of a manufacturing method for a magnetic head according to a second embodiment of the invention.
Figure 22B:
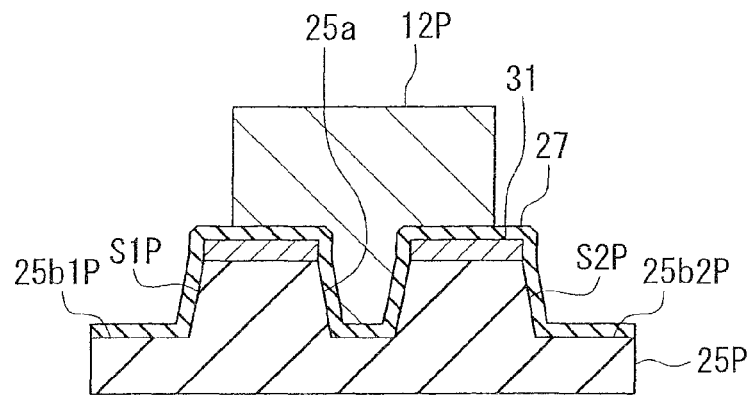
Figure 22C:
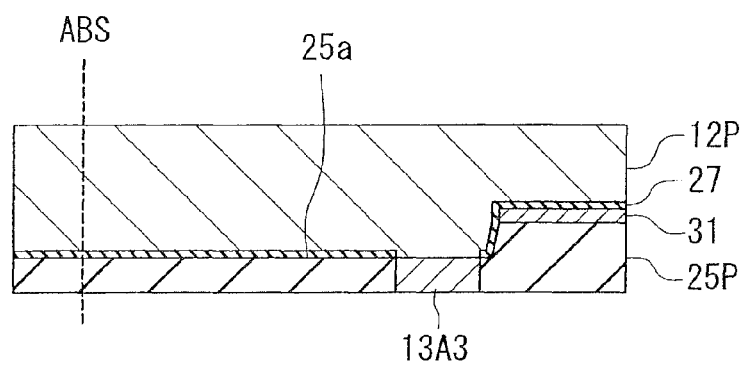

FIG. 22A to FIG. 22C show the step after the nonmagnetic layer 27 is formed. FIG. 22C shows a cross section of the stack taken along line 22C-22C of FIG. 22A. In this step, first, the nonmagnetic layer 27 is selectively etched to form therein an opening for exposing the top surface of the third layer 13A3 and an opening for exposing the top surface of the connecting layer 51. Next, a magnetic layer 12P, which is to be made into the pole layer 12 and the connecting layer 52 afterward, is formed by plating. The magnetic layer 12P is formed to fill the grooves 25a and 25c and to have a top surface located at a higher level than the top surface of the portion of the nonmagnetic layer 27 that lies above the etching mask layer 31. The magnetic layer 12P is not formed in the grooves 25b1P and 25b2P.

Figure 23A:
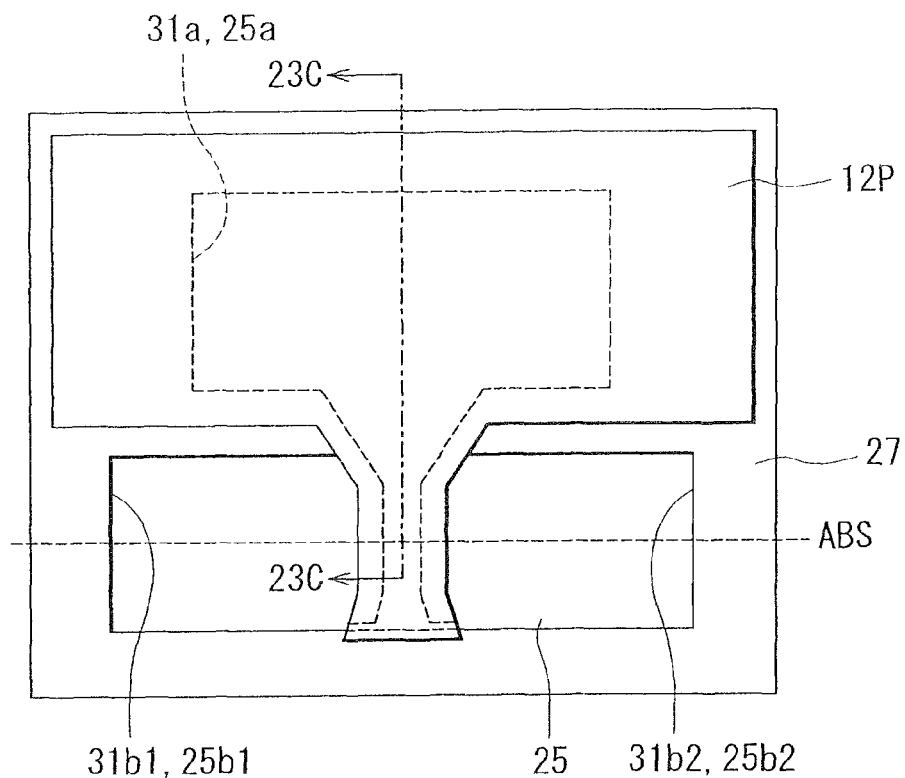
FIG. 23A to FIG. 23C are explanatory diagrams showing a step that follows the step of FIG. 22A to FIG. 22C.
Figure 23B:
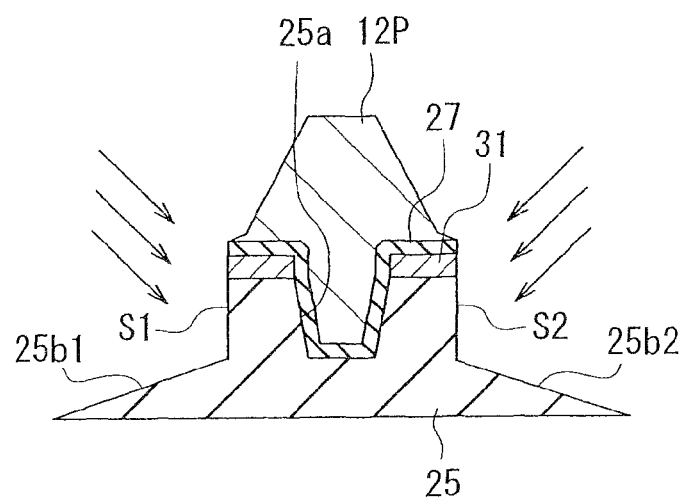
Figure 23C:
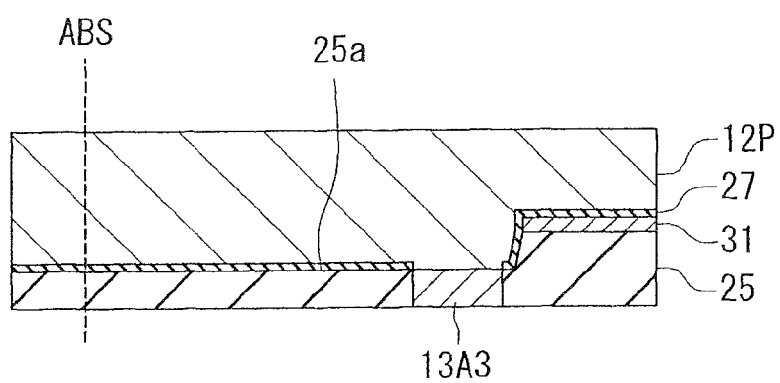

FIG. 23A to FIG. 23C show the next step. FIG. 23C shows a cross section of the stack taken along line 23C-23C of FIG. 23A. In this step, the wall face S1P of the groove 25b1P and the wall face S2P of the groove 25b2P are etched by dry etching such as ion milling with the grooves 25a and 25c filled with the magnetic layer 12P, so that the groove 25b1P is made into the groove 25b1 while the groove 25b2P is made into the groove 25b2. Specifically, the nonmagnetic layer 25P, the nonmagnetic layer 27, the etching mask layer 31 and the magnetic layer 12P are partially removed by, for example, ion milling, so that the portions of the nonmagnetic layer 27 located in the grooves 25b1P and 25b2P are removed and the portions of the nonmagnetic layer 25P and the etching mask layer 31 that define SG shown in FIG. 6 become smaller in width than in FIG. 22B. This step makes the grooves 25b1P and 25b2P into the grooves 25b1 and 25b2, respectively. The formation of the grooves 25b1 and 25b2 in the nonmagnetic layer 25P makes the nonmagnetic layer 25P into the encasing layer 25.

Figure 24A:
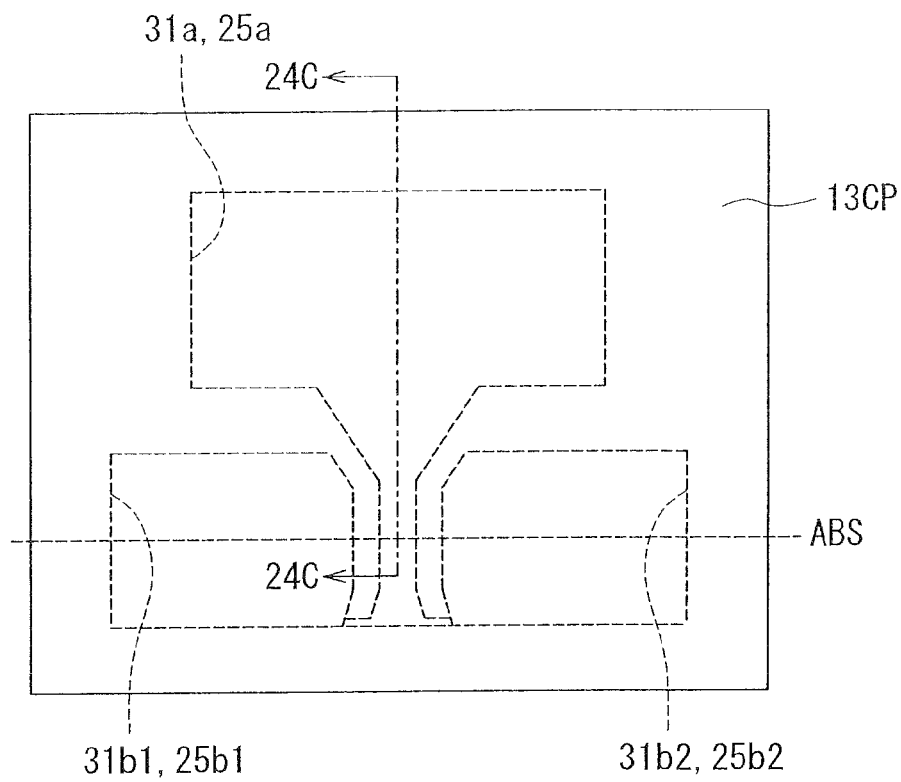
FIG. 24A to FIG. 24C are explanatory diagrams showing a step that follows the step of FIG. 23A to FIG. 23C.
Figure 24B:
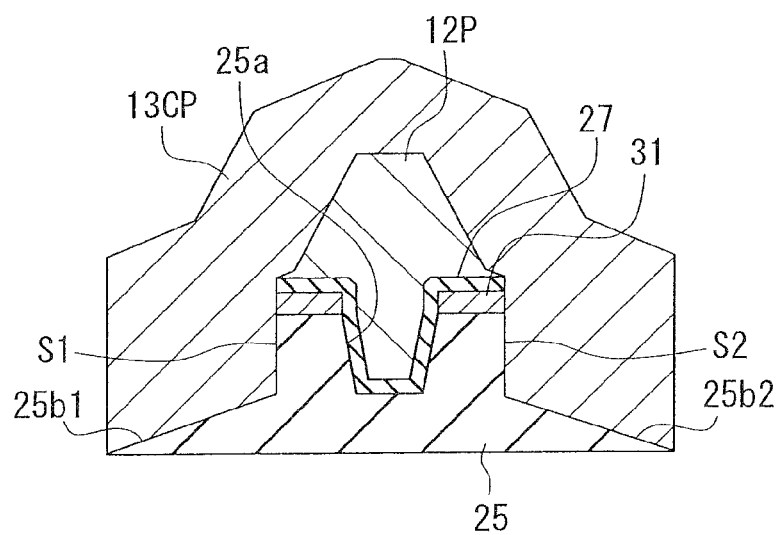
Figure 24C:
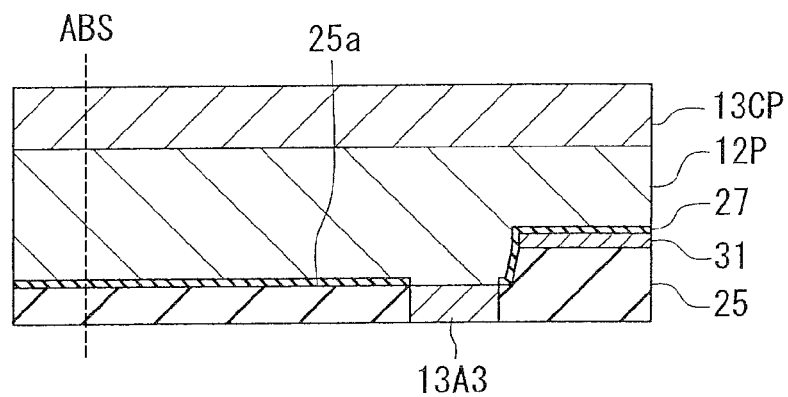

FIG. 24A to FIG. 24C show the next step. FIG. 24C shows a cross section of the stack taken along line 24C-24C of FIG. 24A. In this step, a magnetic layer 13CP, which is to be made into the side shields 13C1 and 13C2 afterward, is formed by plating. The magnetic layer 13CP is formed to fill the grooves 25b1 and 25b2 and cover the magnetic layer 12P, and such that the top surface of the magnetic layer 13CP is located at a higher level than the top surface of the portion of the nonmagnetic layer 27 that lies above the etching mask layer 31.

Figure 25A:
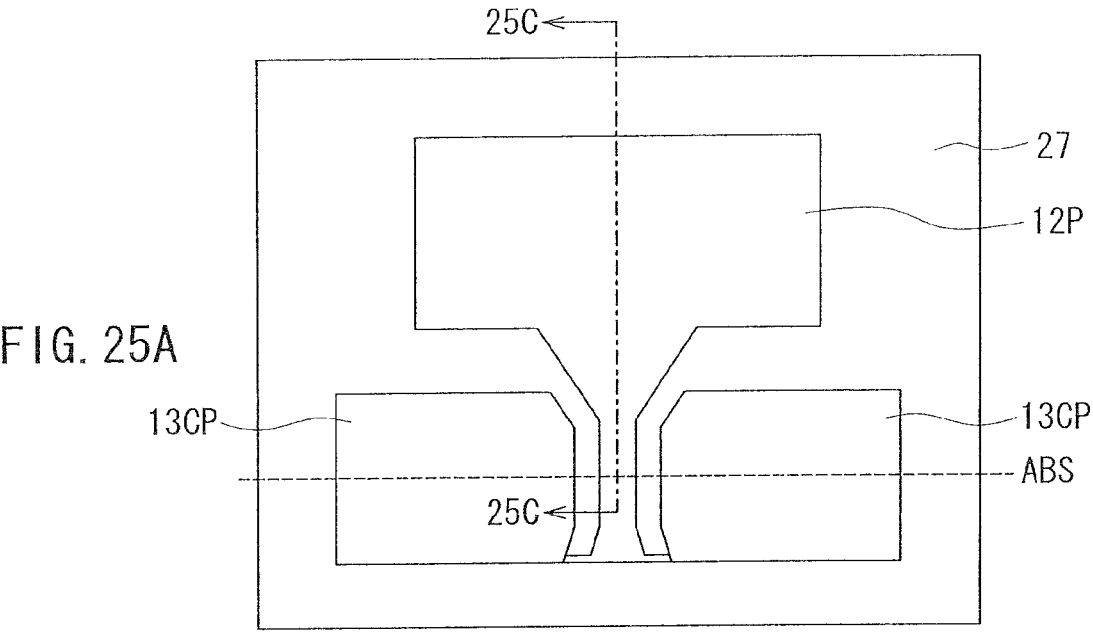
FIG. 25A to FIG. 25C are explanatory diagrams showing a step that follows the step of FIG. 24A to FIG. 24C.
Figure 25B:
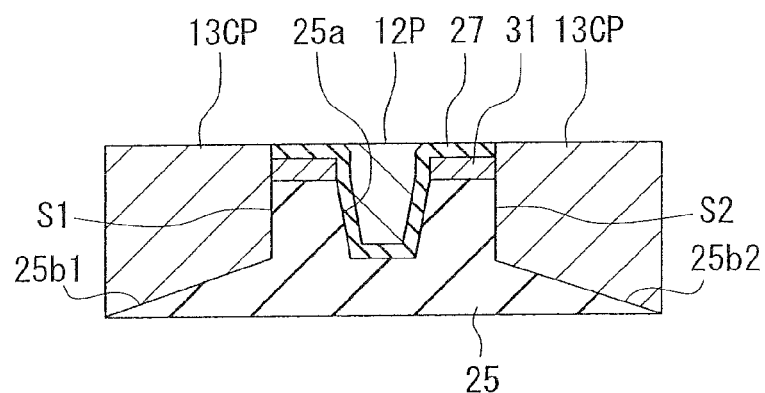
Figure 25C:
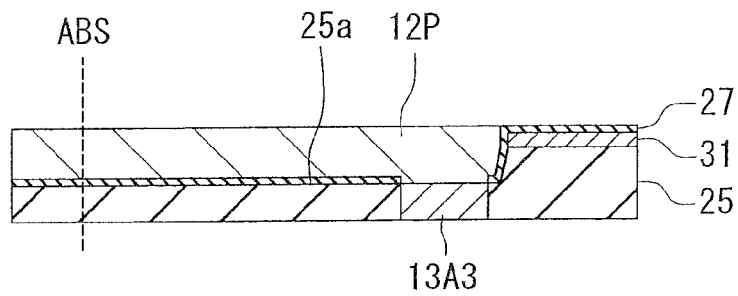

FIG. 25A to FIG. 25C show the next step. FIG. 25C shows a cross section of the stack taken along line 25C-25C of FIG. 25A. In this step, the magnetic layers 12P and 13CP are polished by, for example, CMP, until the nonmagnetic layer 27 is exposed. This separates the magnetic layer 12P remaining in the grooves 25a and 25c from the magnetic layer 13CP remaining in the grooves 25b1 and 25b2.

Figure 26A:
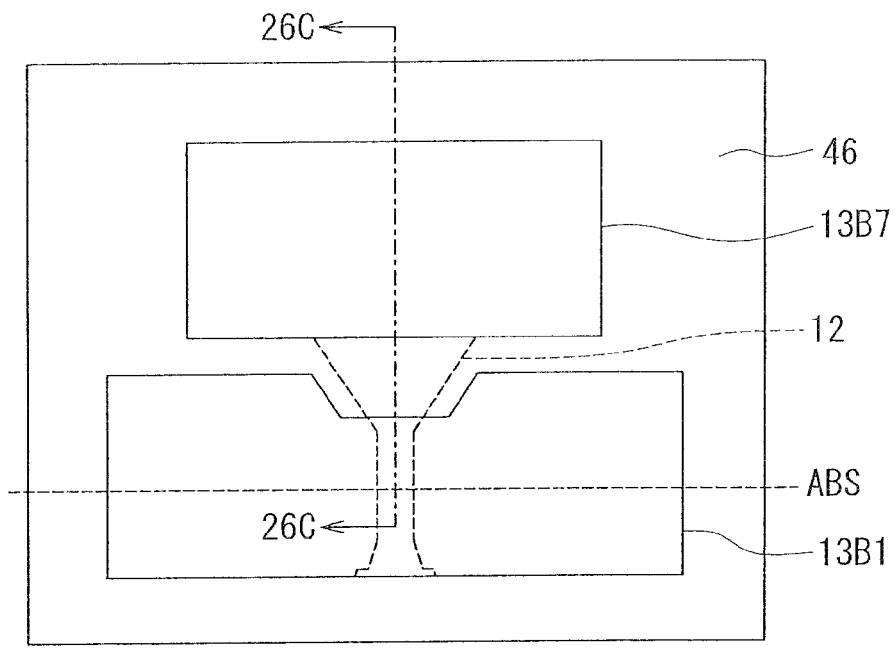
FIG. 26A to FIG. 26C are explanatory diagrams showing a step that follows the step of FIG. 25A to FIG. 25C.
Figure 26B:
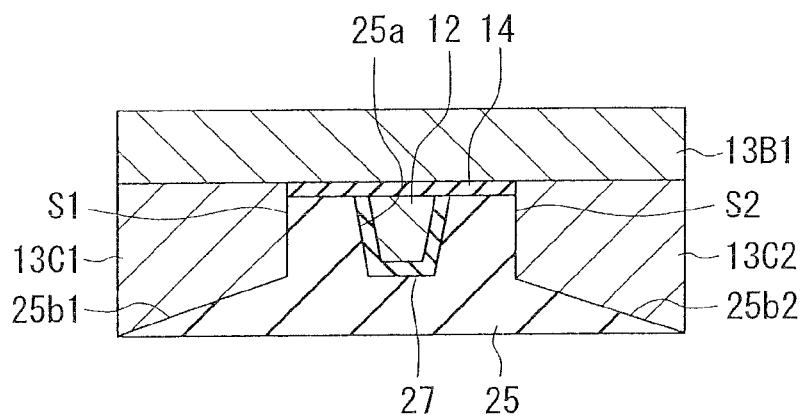
Figure 26C:
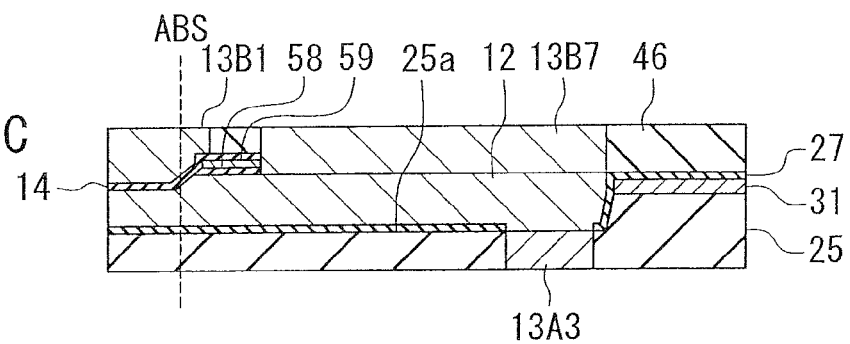

FIG. 26A to FIG. 26C show the next step. FIG. 26C shows a cross section of the stack taken along line 26C-26C of FIG. 26A. In this step, first, not-shown first and second mask layers that are stacked are formed on the portion of the magnetic layer 12P remaining in the groove 25a. Next, the magnetic layers 12P and 13CP, the encasing layer 25, the nonmagnetic layer 27 and the etching mask layer 31 are partially etched by, for example, ion milling using the first and second mask layers. This forms the first portion 12T1 and the second portion 12T2 in the top surface of the portion of the magnetic layer 12P remaining in the groove 25a. The portion of the magnetic layer 12P remaining in the groove 25a thereby makes the pole layer 12. The portion of the magnetic layer 12P remaining in the groove 25c makes the connecting layer 52. Of the magnetic layer 13CP, the portion remaining in the groove 25b1 makes the side shield 13C1 while the portion remaining in the groove 25b2 makes the side shield 13C2.

Next, the gap layer 14 is formed over the entire top surface of the stack by sputtering or CVD, for example. Next, the gap layer 14 and the first and second mask layers are selectively etched by, for example, ion milling, so as to expose the top surface of the pole layer 12 in part and the top surfaces of the side shields 13C1 and 13C2 and the connecting layer 52. This makes the first and second mask layers into the insulating layer 58 and the nonmagnetic metal layer 59, respectively.

Next, the top shield layer 13B1 is formed over the side shields 13C1 and 13C2 and the gap layer 14, the top yoke layer 13B7 is formed on the pole layer 12, and the connecting layer 53 is formed on the connecting layer 52, each by frame plating, for example. Next, the nonmagnetic layer 46 is formed over the entire top surface of the stack. Next, the nonmagnetic layer 46 is polished by, for example, CMP, until the top shield layer 13B1, the top yoke layer 13B7 and the connecting layer 53 are exposed. The top shield layer 13B1, the top yoke layer 13B7, the connecting layer 53 and the nonmagnetic layer 46 are thereby flattened at the top. The subsequent steps are the same as those of the first embodiment.

In the present embodiment, instead of forming the mask 35 in the manufacturing method for the magnetic head according to the first embodiment, the magnetic layer 12P to be made into the pole layer 12 afterward is formed to fill the pole groove 25a, and then the wall face S1P of the groove 25b1P and the wall face S2P of the groove 25b2P are etched by dry etching such as ion milling with the pole groove 25a filled with the magnetic layer 12P, so that the groove 25b1P is made into the groove 25b1 while the groove 25b2P is made into the groove 25b2. Consequently, the present embodiment obviates the need for the step of forming the mask 35 and the step of removing the mask 35, thus allowing a reduction in the number of steps as compared with the first embodiment.

The remainder of configuration, function and effects of the present embodiment are similar to those of the first embodiment.

Third Embodiment

A third embodiment of the present invention will now be described. Initially, a description will be given of the differences of the magnetic head according to the present embodiment from the magnetic head according to the second embodiment. The magnetic head according to the present embodiment is without the top shield layer 13B1 and the side shields 13C1 and 13C2 of the magnetic head according to the second embodiment. Instead, the magnetic head according to the present embodiment has a shield layer 13D.

In the present embodiment, the gap layer 14 lies along a part of the top surface of the pole layer 12, the top surface of the nonmagnetic metal layer 59, a part of the top surface of the nonmagnetic layer 27, a part of the top surface of the encasing layer 25, and the wall faces of the grooves 25b1 and 25b2.

The shield layer 13D is disposed on the gap layer 14. The shield layer 13D includes: first and second side shields 13D1 and 13D2 that correspond to the first and second side shields 13C1 and 13C2 of the second embodiment; and a top shield 13D3 that corresponds to the top shield layer 13B1 of the second embodiment. Specifically, the shield layer 13D of the present embodiment is a combination of the side shields 13D1 and 13D2 and the top shield 13D3 that are made of the same material. The side shields 13D1 and 13D2 are accommodated in the grooves 25b1 and 25b2, respectively, such that the gap layer 14 is interposed between the side shield 13D1 and the wall faces of the groove 25b1, and between the side shield 13D2 and the wall faces of the groove 25b2. The top shield 13D3 is disposed over the gap layer 14 and the side shields 13D1 and 13D2. The shield layer 13D is made of a magnetic material. The material of the shield layer 13D may be CoFeN, CoNiFe, NiFe or CoFe, for example.

A manufacturing method for the magnetic head according to the present embodiment will now be described. The manufacturing method for the magnetic head according to the present embodiment is the same as that for the magnetic head according to the second embodiment up to the step of completing the first and second side shield grooves 25b1 and 25b2 (FIG. 23A to FIG. 23C).

Reference is now made to FIG. 27A to 29A, FIG. 27B to FIG. 29B, and FIG. 27C to FIG. 29C to describe a series of steps until the formation of the shield layer 13D, the top yoke layer 13B7, the connecting layer 53 and the insulating layer 46 after the foregoing step. FIG. 27A to 29A, FIG. 27B to FIG. 29B, and FIG. 27C to FIG. 29C each show a stack of layers formed in the process of manufacturing the magnetic head. Each of FIG. 27A to FIG. 29A shows the top surface of part of the stack. Each of FIG. 27B to FIG. 29B shows a cross section of the stack taken at the position where the medium facing surface 30 is to be formed. Each of FIG. 27C to FIG. 29C shows a cross section of the stack perpendicular to the medium facing surface 30 and the top surface of the substrate 1. The parts closer to the substrate 1 than the encasing layer 25 are omitted in FIG. 27B to FIG. 29B and FIG. 27C to FIG. 29C. In FIG. 27A to FIG. 29A and FIG. 27C to FIG. 29C, the symbol "ABS" indicates the position where the medium facing surface 30 is to be formed.

Figure 27A:
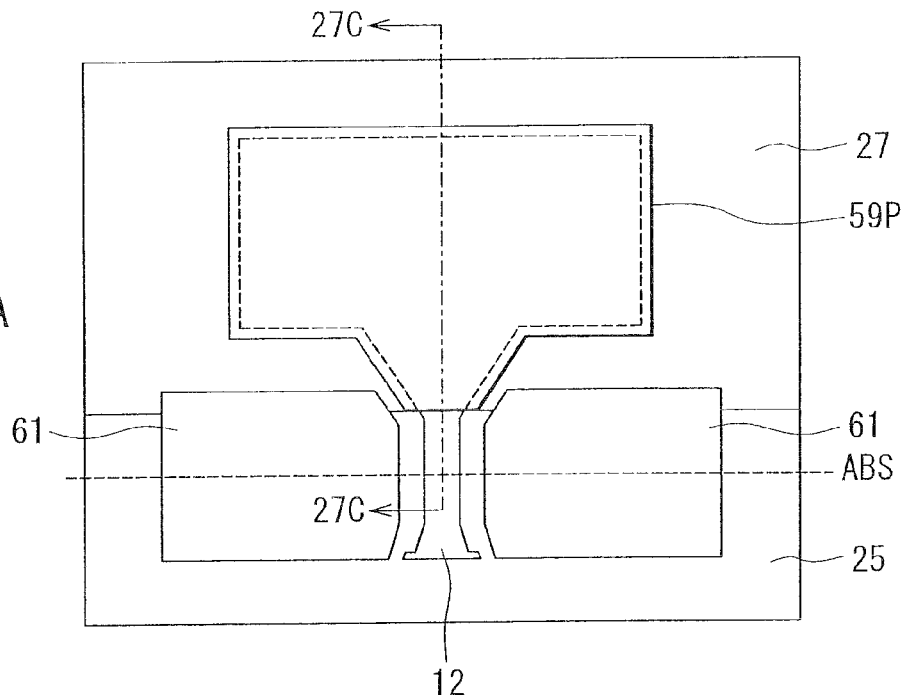
FIG. 27A to FIG. 27C are explanatory diagrams showing a step of a manufacturing method for a magnetic head according to a third embodiment of the invention.
Figure 27B:
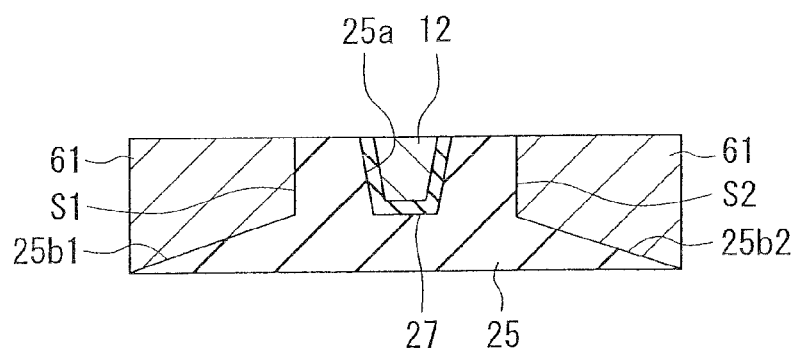
Figure 27C:
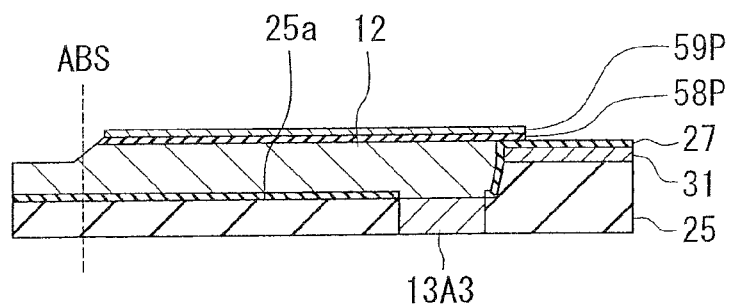

FIG. 27A to FIG. 27C show the step after the first and second side shield grooves 25b1 and 25b2 are completed. FIG. 27C shows a cross section of the stack taken along line 27C-27C of FIG. 27A. In this step, first, a magnetic layer 61 made of a magnetic material is formed by plating. The magnetic layer 61 is formed to fill the grooves 25b1 and 25b2 and cover the magnetic layer 12P, and such that the top surface of the magnetic layer 61 is located at a higher level than the top surface of the portion of the nonmagnetic layer 27 that lies above the etching mask layer 31. The material of the magnetic layer 61 may be CoFeN, CoNiFe, NiFe or CoFe, for example. Next, the magnetic layers 12P and 61 are polished by, for example, CMP, until the nonmagnetic layer 27 is exposed. This separates the magnetic layer 12P remaining in the grooves 25a and 25c from the magnetic layer 61 remaining in the grooves 25b1 and 25b2.

Next, mask layers 58P and 59P that are stacked are formed on the portion of the magnetic layer 12P remaining in the groove 25a. The mask layer 58P is to be made into the insulating layer 58 afterward, and the mask layer 59P is to be made into the nonmagnetic metal layer 59 afterward. The mask layers 58P and 59P are formed by, for example, etching and thereby patterning a layered film that is formed by sputtering. The mask layers 58P and 59P cover a portion of the top surface of the magnetic layer 12P, the portion being intended to be made into the second portion 12T2 of the top surface of the pole layer 12. An edge of the mask layer 58P that is closer to the position ABS where the medium facing surface 30 is to be formed defines the position of the boundary between the first portion 12T1 and the second portion 12T2 of the top surface of the pole layer 12. Next, the magnetic layers 12P and 61, the encasing layer 25, the nonmagnetic layer 27 and the etching mask layer 31 are partially etched by, for example, ion milling using the mask layers 58P and 59P. This forms the first portion 12T1 and the second portion 12T2 in the top surface of the portion of the magnetic layer 12P remaining in the groove 25a. The portion of the magnetic layer 12P remaining in the groove 25a thereby makes the pole layer 12. The portion of the magnetic layer 12P remaining in the groove 25c makes the connecting layer 52.

Figure 28A:
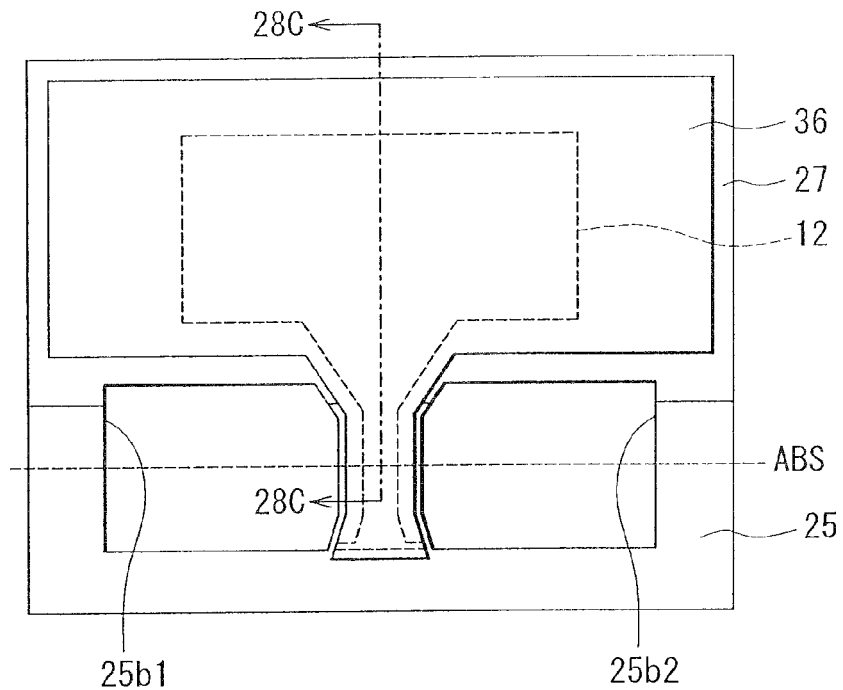
FIG. 28A to FIG. 28C are explanatory diagrams showing a step that follows the step of FIG. 27A to FIG. 27C.
Figure 28B:
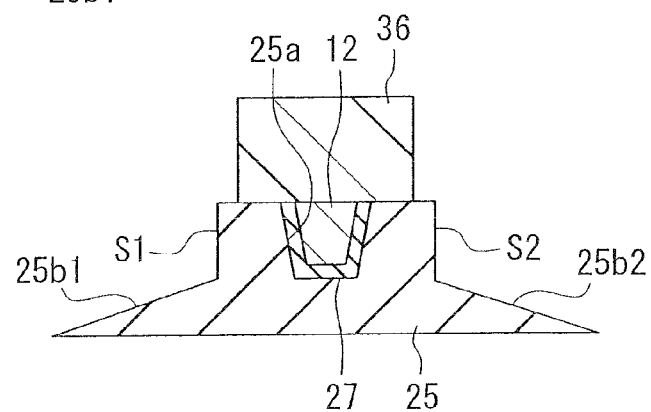
Figure 28C:
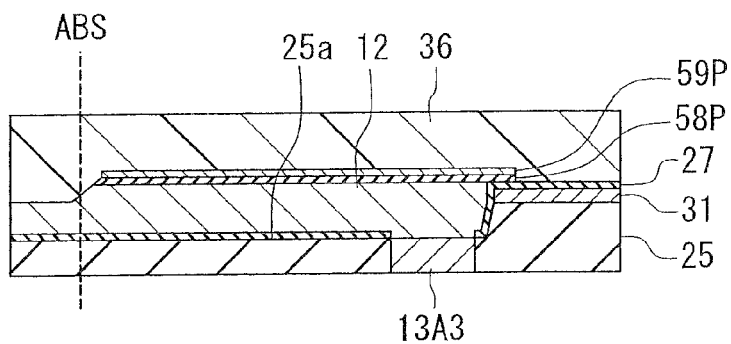

FIG. 28A to FIG. 28C show the next step. FIG. 28C shows a cross section of the stack taken along line 28C-28C of FIG. 28A. In this step, first, a photoresist layer is formed over the entire top surface of the stack and it is patterned to thereby form a photoresist mask 36. The photoresist mask 36 covers the pole layer 12, the connecting layer 52 and the mask layers 58P and 59P, and does not cover the magnetic layer 61. Next, the magnetic layer 61 is removed by wet etching, for example.

Figure 29A:
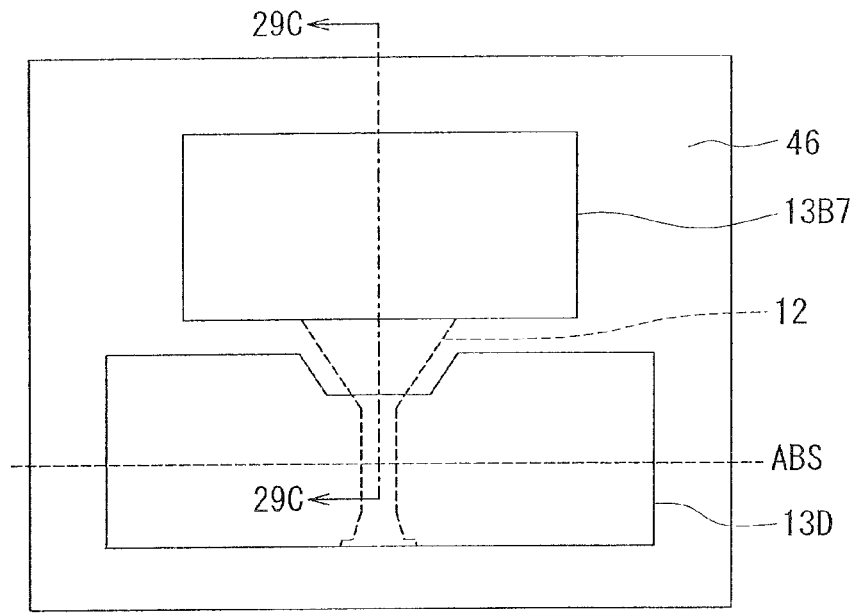
FIG. 29A to FIG. 29C are explanatory diagrams showing a step that follows the step of FIG. 28A to FIG. 28C.
Figure 29B:
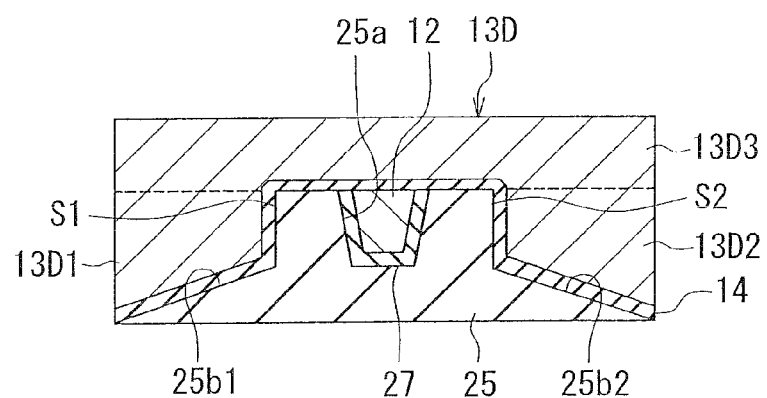
Figure 29C:
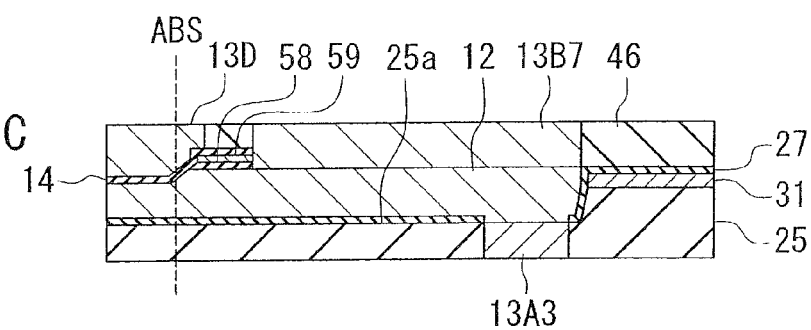

FIG. 29A to FIG. 29C show the next step. FIG. 29C shows a cross section of the stack taken along line 29C-29C of FIG. 29A. In this step, first, the photoresist mask 36 is removed. Next, the gap layer 14 is formed over the entire top surface of the stack by sputtering, for example. The gap layer 14 is formed also in the grooves 25b1 and 25b2. Next, the gap layer 14 and the mask layers 58P and 59P are selectively etched by, for example, ion milling, so as to expose the top surface of the connecting pole layer 12 in part and the top surface of the connecting layer 52. This makes the mask layers 58P and 59P into the insulating layer 58 and the nonmagnetic metal layer 59, respectively.

Next, the shield layer 13D, the top yoke layer 13B7 and the connecting layer 53 are formed by frame plating, for example. The shield layer 13D is formed to fill the grooves 25b1 and 25b2 and to have a top surface located at a higher level than the top surface of the portion of the gap layer 14 that lies above the nonmagnetic metal layer 59. The top yoke layer 13B7 is formed on the pole layer 12. The connecting layer 53 is formed on the connecting layer 52. Next, the nonmagnetic layer 46 is formed over the entire top surface of the stack. Next, the nonmagnetic layer 46 is polished by, for example, CMP, until the shield layer 13D, the top yoke layer 13B7 and the connecting layer 53 are exposed. The shield layer 13D, the top yoke layer 13B7, the connecting layer 53 and the nonmagnetic layer 46 are thereby flattened at the top. The subsequent steps are the same as those of the second embodiment.

In the present embodiment, the first and second side shields 13D1 and 13D2 and the top shield 13D3 are made of the same material. The step of forming the top shield 13D3 is performed simultaneously with the step of forming the first and second side shields 13D1 and 13D2.

The remainder of configuration, function and effects of the present embodiment are similar to those of the second embodiment.

Fourth Embodiment

Figure 30A:
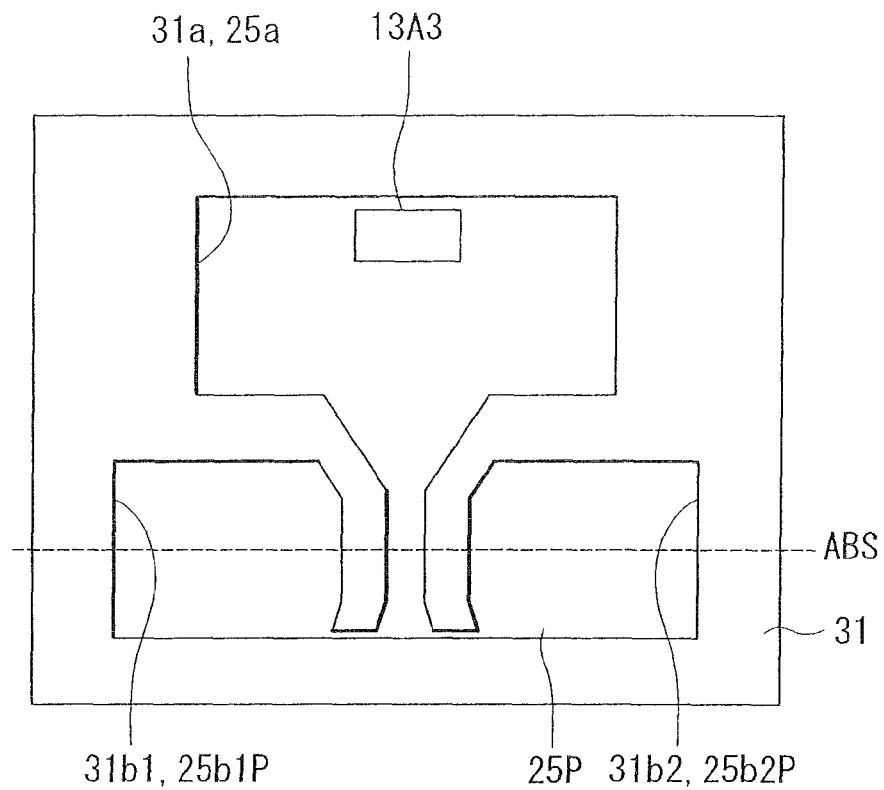
FIG. 30A and FIG. 30B are explanatory diagrams showing a step of a manufacturing method for a magnetic head according to a fourth embodiment of the invention.
Figure 30B:
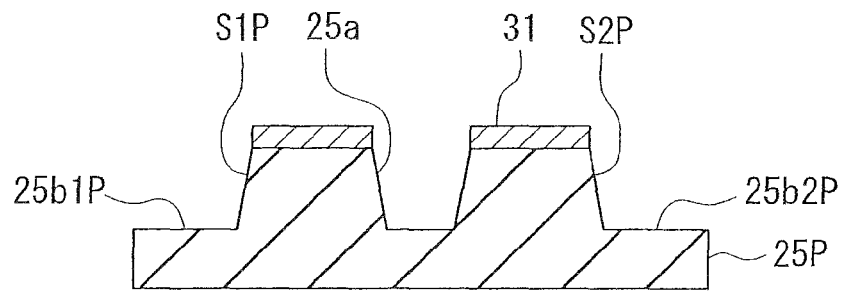

A fourth embodiment of the present invention will now be described. In the manufacturing method for the magnetic head according to the present embodiment, the step shown in FIG. 30A and FIG. 30B is performed instead of the steps shown in FIG. 10A to FIG. 13A and FIG. 10B to FIG. 13B of the manufacturing method for the magnetic head according to the first to third embodiments. FIG. 30A and FIG. 30B show a stack of layers formed in the process of manufacturing the magnetic head. FIG. 30A shows the top surface of part of the stack. FIG. 30B shows a cross section of the stack taken at the position where the medium facing surface 30 is to be formed. The parts closer to the substrate 1 than the nonmagnetic layer 25P are omitted in FIG. 30B. In FIG. 30A the symbol "ABS" indicates the position where the medium facing surface 30 is to be formed.

In the step shown in FIG. 30A and FIG. 30B, the nonmagnetic layer 25P is selectively etched by dry etching such as RIE using the openings 31a, 31b1 and 31b2 of the etching mask layer 31 and the not-shown opening of the etching mask layer 31 that corresponds to the groove 25c. The grooves 25a, 25b1P, 25b2P and 25c are thereby formed simultaneously in the nonmagnetic layer 25P. In the present embodiment, the step of forming the pole groove 25a and the step of forming the first and second initial side shield grooves 25b1P and 25b2P are thus performed simultaneously. The subsequent steps are the same as those of any of the first to third embodiments.

The remainder of configuration, function and effects of the present embodiment are similar to those of the first to third embodiments.

Fifth Embodiment

A fifth embodiment of the present invention will now be described. Initially, a description will be given of the differences of the magnetic head according to the present embodiment from the magnetic head according to the third embodiment. The magnetic head according to the present embodiment is without the insulating layer 58 and the nonmagnetic metal layer 59 of the magnetic head according to the third embodiment.

The magnetic head according to the present embodiment has a nonmagnetic metal layer 28 having portions disposed in the grooves 25a and 25c. The nonmagnetic metal layer 28 lies along the surface of the nonmagnetic layer 27. The nonmagnetic metal layer 28 has an opening for exposing the top surface of the third layer 13A3 and an opening for exposing the top surface of the connecting layer 51. The material of the nonmagnetic metal layer 28 is the same as in the first embodiment.

In the magnetic head according to the present embodiment, the pole layer 12 is accommodated in the groove 25a of the encasing layer 25 such that the nonmagnetic layer 27 and the nonmagnetic metal layer 28 are interposed between the pole layer 12 and the wall faces of the groove 25a.

In the magnetic head according to the present embodiment, the top surface of the pole layer 12 does not have the first and second portions 12T1 and 12T2 of the third embodiment. The top surface of the pole layer 12 of the present embodiment is thus a flat surface extending in a direction substantially perpendicular to the medium facing surface 30.

A manufacturing method for the magnetic head according to the present embodiment will now be described. The manufacturing method for the magnetic head according to the present embodiment is the same as that for the magnetic head according to the third embodiment up to the step of forming the grooves 25a and 25c in the nonmagnetic layer 25P and removing the photoresist mask 33 (FIG. 11A and FIG. 11B).

Reference is now made to FIG. 31A to 37A and FIG. 31B to FIG. 37B to describe a series of steps until the formation of the shield layer 13D, the top yoke layer 13B7, the connecting layer 53 and the insulating layer 46 after the foregoing step. FIG. 31A to 37A and FIG. 31B to FIG. 37B each show a stack of layers formed in the process of manufacturing the magnetic head. Each of FIG. 31A to FIG. 37A shows the top surface of part of the stack. Each of FIG. 31B to FIG. 37B shows a cross section of the stack taken at the position where the medium facing surface 30 is to be formed. The parts closer to the substrate 1 than the insulating layer 24 are omitted in FIG. 31B to FIG. 33B. The parts closer to the substrate 1 than the nonmagnetic layer 25P are omitted in FIG. 34B. The parts closer to the substrate 1 than the encasing layer 25 are omitted in FIG. 35B to FIG. 37B. In FIG. 31A to FIG. 37A, the symbol "ABS" indicates the position where the medium facing surface 30 is to be formed.

Figure 31A:
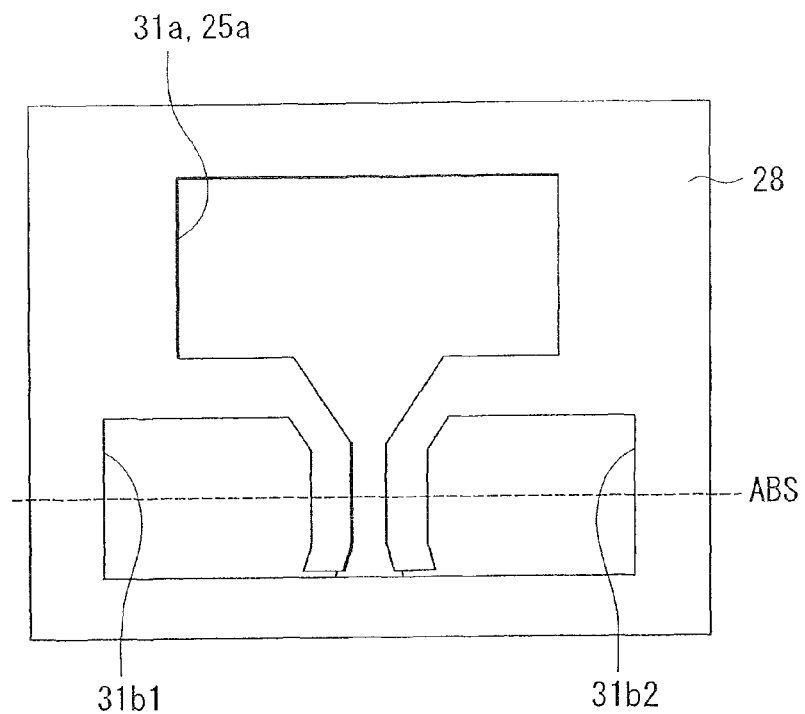
FIG. 31A and FIG. 31B are explanatory diagrams showing a step of a manufacturing method for a magnetic head according to a fifth embodiment of the invention.
Figure 31B:
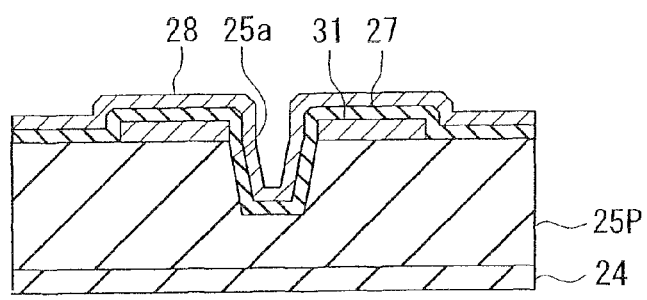

In the step shown in FIG. 31A and FIG. 31B, first, the nonmagnetic layer 27 is formed over the entire top surface of the stack. The nonmagnetic layer 27 is formed also in the grooves 25a and 25c. The nonmagnetic layer 27 is formed by sputtering, CVD or ALD, for example. Next, the nonmagnetic metal layer 28 is formed over the entire top surface of the stack by sputtering or ion beam deposition, for example. The nonmagnetic metal layer 28 is formed also in the grooves 25a and 25c.

Figure 32A:
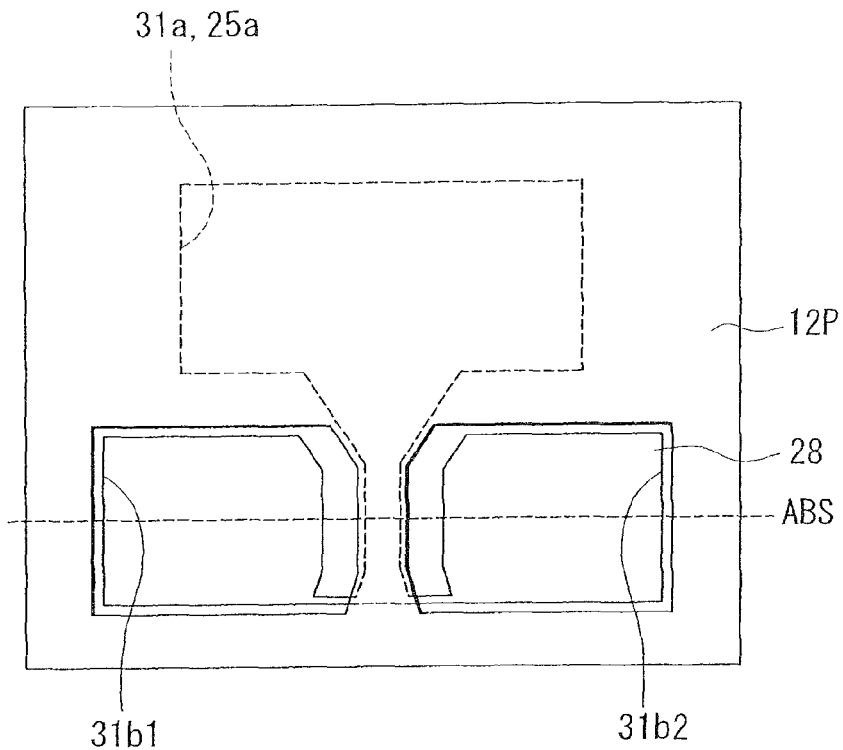
FIG. 32A and FIG. 32B are explanatory diagrams showing a step that follows the step of FIG. 31A and FIG. 31B.
Figure 32B:
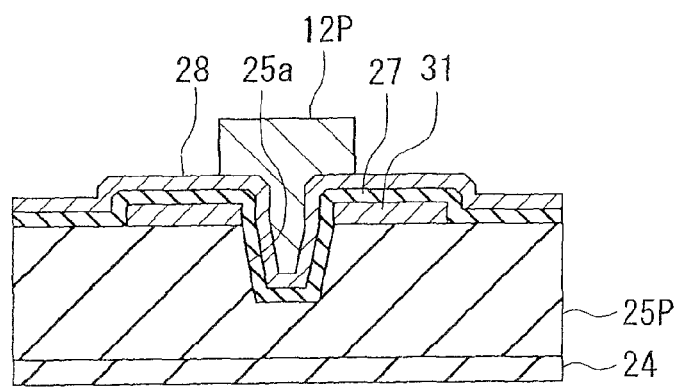

FIG. 32A and FIG. 32B show the next step. In this step, first, the nonmagnetic layer 27 and the nonmagnetic metal layer 28 are selectively etched to form therein the openings for exposing the top surface of the third layer 13A3 and the openings for exposing the top surface of the connecting layer 51. Next, a magnetic layer 12P, which is to be made into the pole layer 12 and the connecting layer 52 afterward, is formed by plating using the nonmagnetic metal layer 28 as an electrode and a seed layer. The magnetic layer 12P is formed to fill the grooves 25a and 25c and to have a top surface located at a higher level than the top surface of the portion of the nonmagnetic metal layer 28 that lies above the etching mask layer 31. The magnetic layer 12P is not formed in the openings 31b1 and 31b2.

Figure 33A:
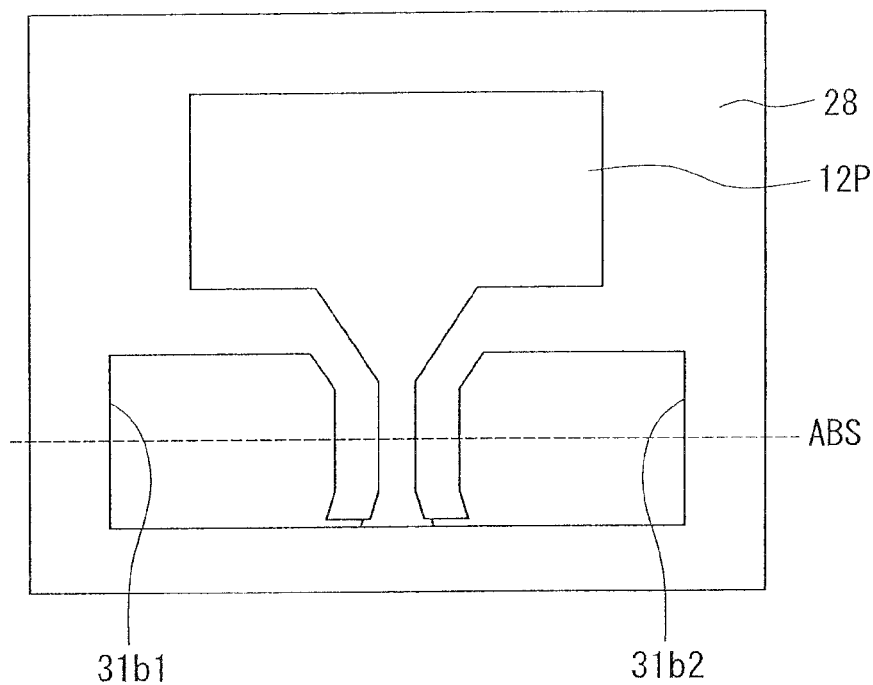
FIG. 33A and FIG. 33B are explanatory diagrams showing a step that follows the step of FIG. 32A and FIG. 32B.
Figure 33B:
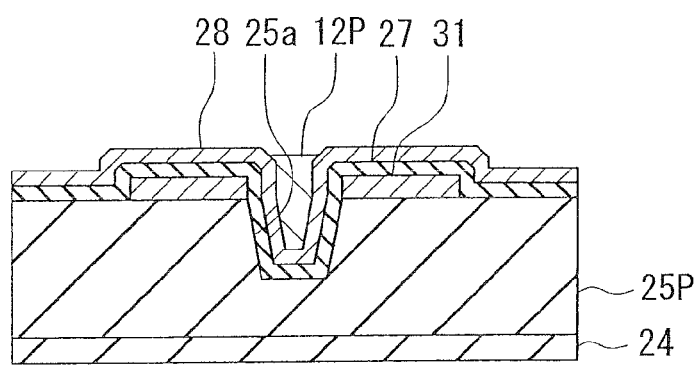

FIG. 33A and FIG. 33B show the next step. In this step, the magnetic layer 12P is polished by, for example, CMP, until the portion of the nonmagnetic metal layer 28 that lies above the etching mask layer 31 is exposed. It should be noted that a difference in level between the top surfaces of the magnetic layer 12P and the nonmagnetic metal layer 28 can develop due to a difference in polishing rate between the magnetic layer 12P and the nonmagnetic metal layer 28.

Figure 34A:
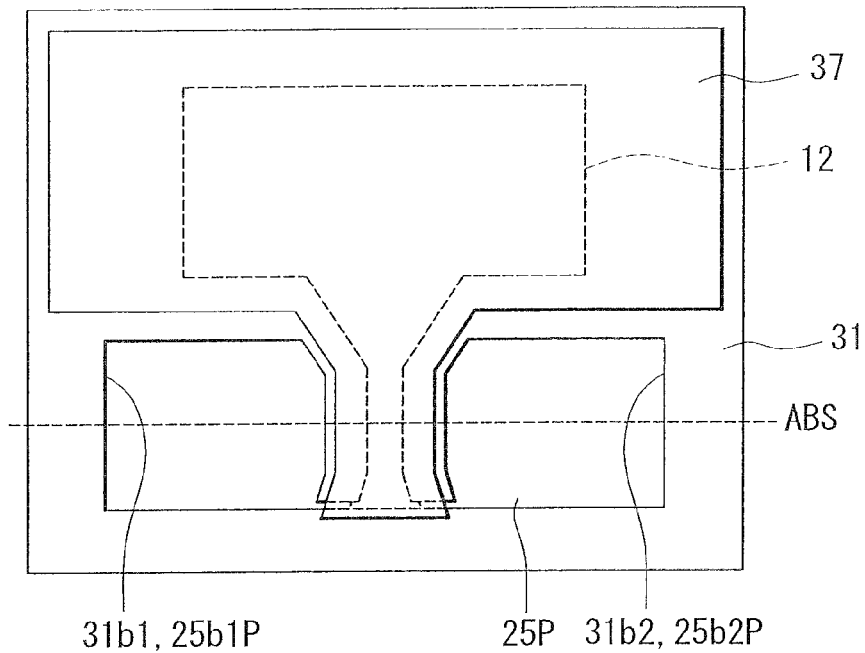
FIG. 34A and FIG. 34B are explanatory diagrams showing a step that follows the step of FIG. 33A and FIG. 33B.
Figure 34B:
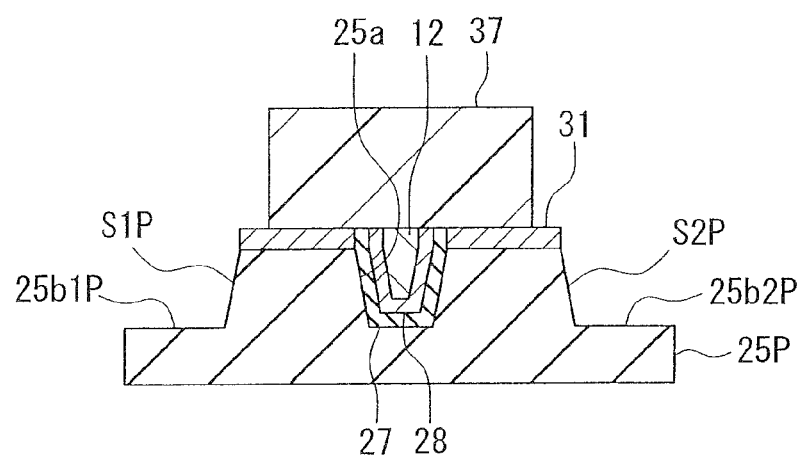

FIG. 34A and FIG. 34B show the next step. In this step, the portion of the nonmagnetic metal layer 28 exposed in the top surface of the stack is etched by ion milling, for example. Next, the magnetic layer 12P, the nonmagnetic layer 27 and the nonmagnetic metal layer 28 are polished by, for example, CMP, until the etching mask layer 31 is exposed. The portion of the magnetic layer 12P remaining in the groove 25a thereby makes the pole layer 12. The portion of the magnetic layer 12P remaining in the groove 25c makes the connecting layer 52.

Next, a photoresist layer is formed over the entire top surface of the stack and it is patterned to form a photoresist mask 37. The photoresist mask 37 covers the opening 31a, the not-shown opening that corresponds to the groove 25c, the pole layer 12, and the connecting layer 52, not covering the openings 31b1 and 31b2. Next, the nonmagnetic layer 25P, the nonmagnetic layer 27 and the nonmagnetic metal layer 28 are selectively etched by dry etching such as RIE using the openings 31b1 and 31b2 of the etching mask layer 31, with the opening 31a and the not-shown opening that corresponds to the groove 25c covered with the photoresist mask 37. The grooves 25b1P and 25b2P are thereby formed in the nonmagnetic layer 25P.

Figure 35A:
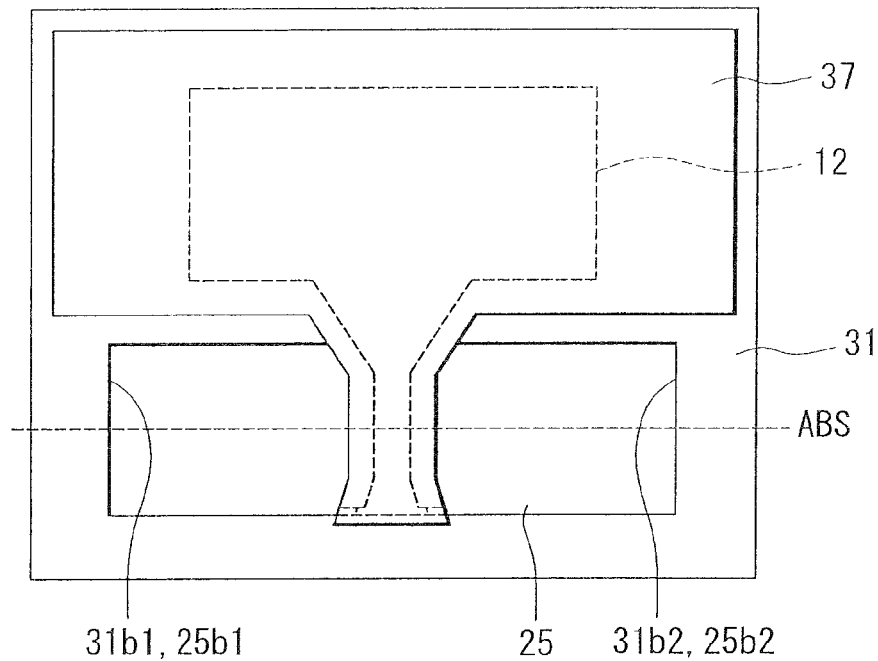
FIG. 35A and FIG. 35B are explanatory diagrams showing a step that follows the step of FIG. 34A and FIG. 34B.
Figure 35B:
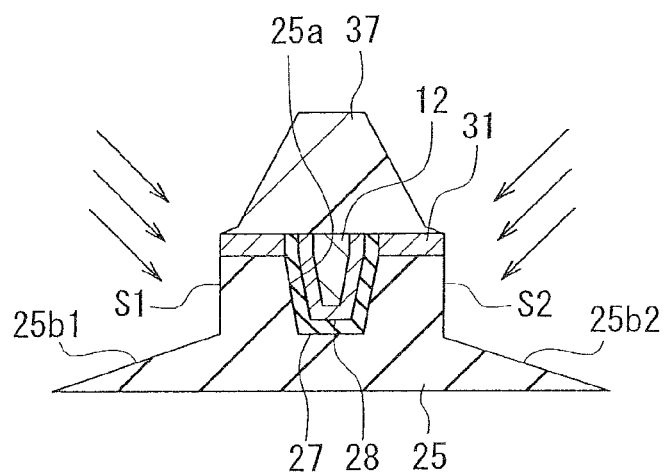

FIG. 35A and FIG. 35B show the next step. In this step, the wall face S1P of the groove 25b1P and the wall face S2P of the groove 25b2P are etched by dry etching such as ion milling, with the opening 31a, the not-shown opening that corresponds to the groove 25c, the pole layer 12 and the connecting layer 52 covered with the photoresist mask 37, so that the groove 25b1P is made into the groove 25b1 while the groove 25b2P is made into the groove 25b2. Specifically, the nonmagnetic layer 25P, the etching mask layer 31 and the photoresist mask 37 are partially removed by, for example, ion milling, so that the portions of the nonmagnetic layer 25P and the etching mask layer 31 that define SG shown in FIG. 6 become smaller in width than in FIG. 34B. This step makes the grooves 25b1P and 25b2P into the grooves 25b1 and 25b2, respectively. The formation of the grooves 25b1 and 25b2 in the nonmagnetic layer 25P makes the nonmagnetic layer 25P into the encasing layer 25.

Figure 36A:
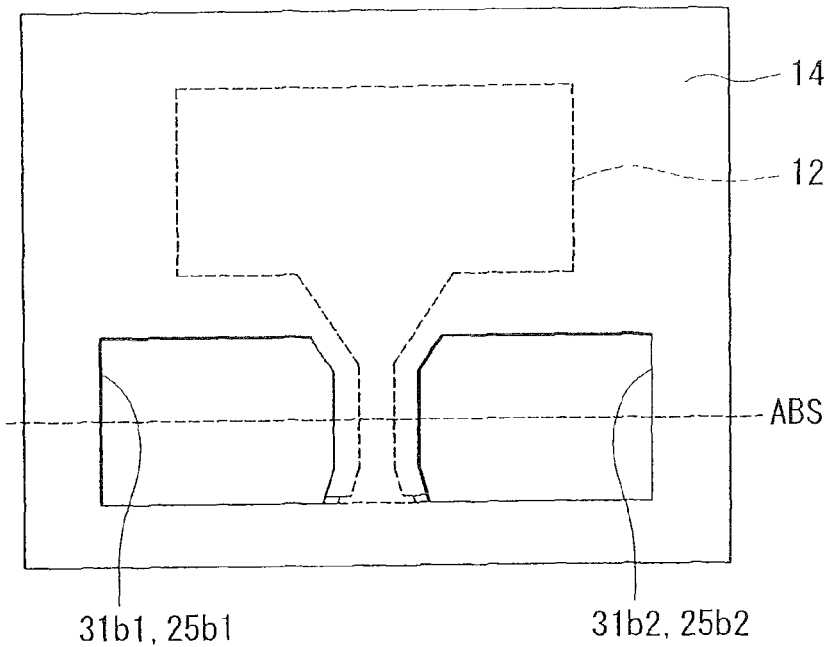
FIG. 36A and FIG. 36B are explanatory diagrams showing a step that follows the step of FIG. 35A and FIG. 35B.
Figure 36B:
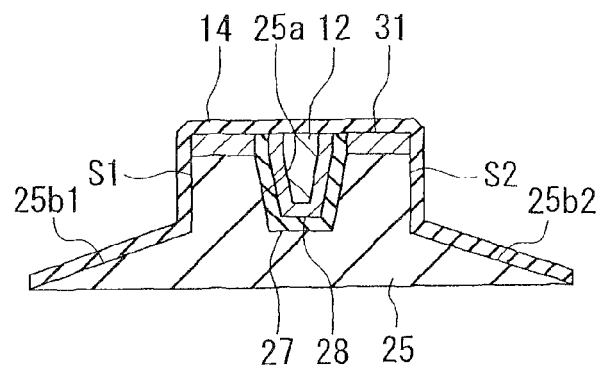

FIG. 36A and FIG. 36B show the next step. In this step, first, the photoresist mask 37 is removed. Next, the gap layer 14 is formed over the entire top surface of the stack by sputtering, for example. The gap layer 14 is formed also in the grooves 25b1 and 25b2. Next, the gap layer 14 is selectively etched by, for example, ion milling, so as to expose the top surface of the pole layer 12 in part and the top surface of the connecting layer 52.

Figure 37A:
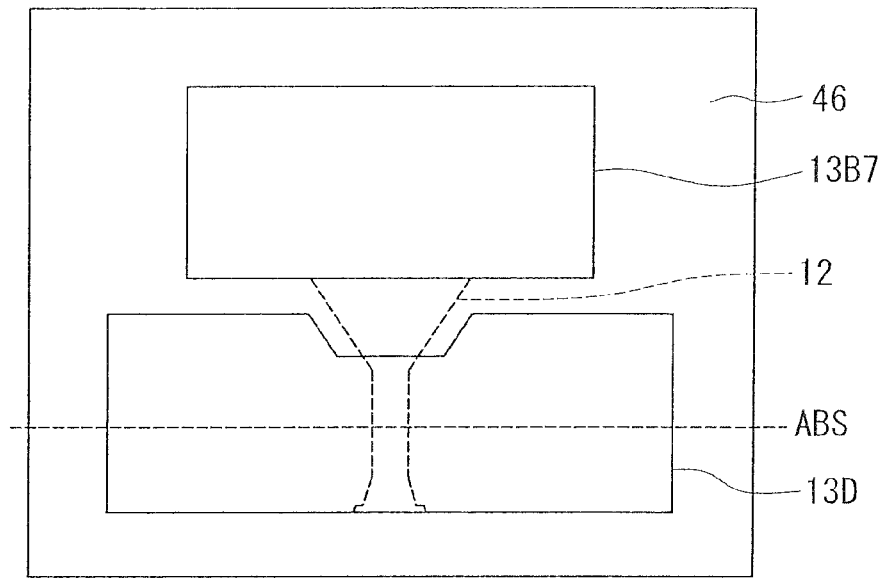
FIG. 37A and FIG. 37B are explanatory diagrams showing a step that follows the step of FIG. 36A and FIG. 36B.
Figure 37B:
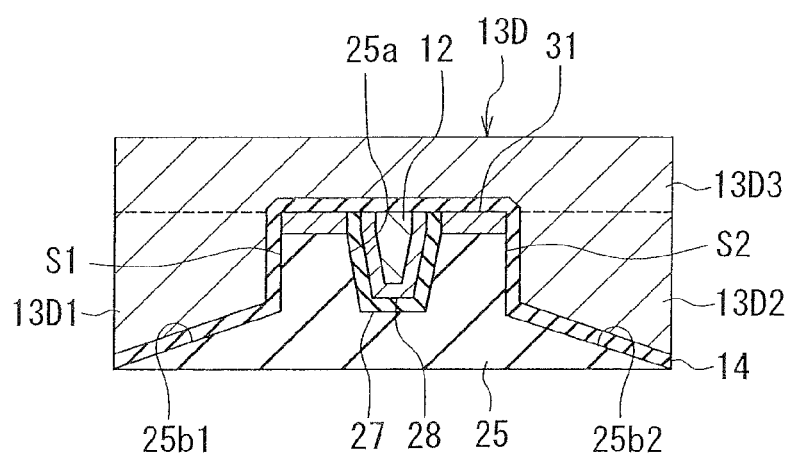

FIG. 37A and FIG. 37B show the next step. In this step, first, the shield layer 13D, the top yoke layer 13B7 and the connecting layer 53 are formed by frame plating, for example. The shield layer 13D is formed to fill the grooves 25b1 and 25b2 and to have a top surface located at a higher level than the top surface of the portion of the gap layer 14 that lies above the etching mask layer 31. The top yoke layer 13B7 is formed on the pole layer 12. The connecting layer 53 is formed on the connecting layer 52. Next, the nonmagnetic layer 46 is formed over the entire top surface of the stack. Next, the nonmagnetic layer 46 is polished by, for example, CMP, until the shield layer 13D, the top yoke layer 13B7 and the connecting layer 53 are exposed. The shield layer 13D, the top yoke layer 13B7, the connecting layer 53 and the nonmagnetic layer 46 are thereby flattened at the top. The subsequent steps are the same as those of the third embodiment.

In the present embodiment, the step of completing the first and second side shield grooves 25b1 and 25b2 is performed with the pole layer 12 covered with the photoresist mask 37, after the step of forming the pole layer 12.

The remainder of configuration, function and effects of the present embodiment are similar to those of the third embodiment except the function and effects resulting from the feature of the third embodiment that the top surface of the pole layer 12 has the first and second portions 12T1 and 12T2.

The present invention is not limited to the foregoing embodiments but can be carried out in various modifications. For example, in the first to fourth embodiments, the top surface of the pole layer 12 includes the first portion 12T1 and the second portion 12T2; however, the pole layer 12 may have a flat top surface extending in a direction substantially perpendicular to the medium facing surface 30.

In the first to fifth embodiments, the first portion 13A of the shield 13 may include a bottom shield layer that is disposed on the first layer 13A1 and magnetically coupled to the first layer 13A1, the second layer 13A2 and the third layer 13A3. This bottom shield layer may be disposed between the medium facing surface 30 and the coil 11, and may have an end face located in the medium facing surface 30 at a position backward of the end face of the pole layer 12 along the direction of travel of the recording medium.

While the first to fifth embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A manufacturing method for a magnetic head for perpendicular magnetic recording, the magnetic head comprising:
    a medium facing surface that faces a recording medium;
    a coil that produces a magnetic field corresponding to data to be written on the recording medium;
    a pole layer that has an end face located in the medium facing surface, allows a magnetic flux corresponding to the magnetic field produced by the coil to pass and produces a write magnetic field for writing the data on the recording medium by means of a perpendicular magnetic recording system;
    a top shield that is made of a magnetic material and has an end face located in the medium facing surface at a position forward of the end face of the pole layer along a direction of travel of the recording medium;
    a gap layer that is made of a nonmagnetic material, disposed between the pole layer and the top shield and has an end face located in the medium facing surface;
    a first side shield and a second side shield disposed on both sides of the pole layer that are opposite to each other in a track width direction, each of the side shields being made of a magnetic material and having an end face located in the medium facing surface; and
    an encasing layer that is made of a nonmagnetic material and has a pole groove accommodating the pole layer, a first side shield groove accommodating the first side shield, and a second side shield groove accommodating the second side shield,
    the manufacturing method comprising the steps of:
    forming a nonmagnetic layer that is to be made into the encasing layer by forming the pole groove and the first and second side shield grooves therein afterward;
    forming an etching mask layer on the nonmagnetic layer, the etching mask layer having a first opening, a second opening and a third opening that have shapes respectively corresponding to the pole groove, a first initial side shield groove and a second initial side shield groove to be formed afterward;
    forming the pole groove in the nonmagnetic layer by etching using the etching mask layer;
    forming the first and second initial side shield grooves in the nonmagnetic layer by etching using the etching mask layer;
    completing the first and second side shield grooves by etching a wall face of the first initial side shield groove that is closer to the pole groove and a wall face of the second initial side shield groove that is closer to the pole groove by employing dry etching so that the first initial side shield groove is made into the first side shield groove while the second initial side shield groove is made into the second side shield groove;
    forming the pole layer;
    forming the first and second side shields;
    forming the gap layer;
    forming the top shield; and
    forming the coil.

2. The manufacturing method for a magnetic head for perpendicular magnetic recording according to claim 1, wherein the dry etching is ion milling.

3. The manufacturing method for a magnetic head for perpendicular magnetic recording according to claim 1, wherein the step of completing the first and second side shield grooves is performed with the pole groove covered with a mask, after the step of forming the pole groove and before the step of forming the pole layer.

4. The manufacturing method for a magnetic head for perpendicular magnetic recording according to claim 1, further comprising the step of forming a magnetic layer to fill the pole groove, the magnetic layer being intended to be made into the pole layer afterward,
    wherein the step of completing the first and second side shield grooves is performed after the step of forming the magnetic layer.

5. The manufacturing method for a magnetic head for perpendicular magnetic recording according to claim 1, wherein the step of completing the first and second side shield grooves is performed with the pole layer covered with a mask, after the step of forming the pole layer.

6. The manufacturing method for a magnetic head for perpendicular magnetic recording according to claim 1, wherein:
    the step of forming the pole groove is performed with the second and third openings covered with a first mask; and
    the step of forming the first and second initial side shield grooves is performed with the first opening covered with a second mask.

7. The manufacturing method for a magnetic head for perpendicular magnetic recording according to claim 1, wherein the step of forming the pole groove and the step of forming the first and second initial side shield grooves are performed simultaneously.

8. The manufacturing method for a magnetic head for perpendicular magnetic recording according to claim 1, wherein:

the magnetic head for perpendicular magnetic recording further comprises a substrate on which the coil, the encasing layer, the pole layer, the first and second side shields, the gap layer and the top shield are stacked, the substrate having a top surface; and the end face of the pole layer located in the medium facing surface decreases in width in the track width direction with decreasing distance to the top surface of the substrate.

9. The manufacturing method for a magnetic head for perpendicular magnetic recording according to claim 1, wherein:

the magnetic head for perpendicular magnetic recording further comprises a substrate on which the coil, the encasing layer, the pole layer, the first and second side shields, the gap layer and the top shield are stacked, the substrate having a top surface; and the pole layer has a top surface including a first portion and a second portion, the first portion having a first edge located in the medium facing surface and a second edge opposite to the first edge, the second portion being located farther from the medium facing surface than is the first portion and connected to the first portion at the second edge, and a distance from the top surface of the substrate to an arbitrary point on the first portion decreases with decreasing distance from the arbitrary point to the medium facing surface; and the step of forming the pole layer includes the steps of forming a magnetic layer to fill the pole groove, the magnetic layer being intended to be made into the pole layer afterward; and etching a part of the magnetic layer so that the first portion of the top surface of the pole layer is formed and the magnetic layer is thereby made into the pole layer.

10. The manufacturing method for a magnetic head for perpendicular magnetic recording according to claim 1, wherein the first and second side shields and the top shield are made of the same material, and the step of forming the top shield is performed simultaneously with the step of forming the first and second side shields.

11. The manufacturing method for a magnetic head for perpendicular magnetic recording according to claim 1, wherein the step of forming the etching mask layer includes the steps of:

forming a nonmagnetic metal layer made of a nonmagnetic metal material on the nonmagnetic layer, the nonmagnetic metal layer being intended to be made into the etching mask layer by forming the first to third openings therein afterward;

forming a photoresist mask on the nonmagnetic metal layer, the photoresist mask being intended to be used in etching the nonmagnetic metal layer afterward; and forming the first to third openings in the nonmagnetic metal layer by etching using the photoresist mask so that the nonmagnetic metal layer is made into the etching mask layer.

12. The manufacturing method for a magnetic head for perpendicular magnetic recording according to claim 11, wherein, in the step of forming the photoresist mask, the photoresist mask is formed by performing photolithography with optical proximity correction.

\* \* \* \* \*